US008416908B2

(12) United States Patent
Mann

(10) Patent No.: US 8,416,908 B2
(45) Date of Patent: Apr. 9, 2013

(54) NUCLEAR REACTOR CONTROL METHOD AND APPARATUS

(76) Inventor: Neal Lawrence Mann, Washington, DC (US)

( * ) Notice: Subject to any disclaimer, the term of this patent is extended or adjusted under 35 U.S.C. 154(b) by 0 days.

(21) Appl. No.: 13/468,467

(22) Filed: May 10, 2012

(65) Prior Publication Data

US 2012/0288048 A1 Nov. 15, 2012

Related U.S. Application Data

(60) Provisional application No. 61/485,656, filed on May 13, 2011.

(51) Int. Cl.
*G21C 7/06* (2006.01)
(52) U.S. Cl.
USPC .......................... 376/220; 376/207; 376/219
(58) Field of Classification Search .................. 376/207, 376/219, 220
See application file for complete search history.

(56) References Cited

U.S. PATENT DOCUMENTS

| 2,825,688 | A |  | 3/1958 | Vernon |
| 5,185,120 | A | * | 2/1993 | Fennern ........................ 376/219 |
| 7,973,285 | B2 |  | 7/2011 | Han et al. |
| 2004/0076255 | A1 |  | 4/2004 | Masumi |
| 2007/0297555 | A1 |  | 12/2007 | D'Auvergne |
| 2010/0067644 | A1 |  | 3/2010 | D'Auvergne |
| 2010/0296620 | A1 |  | 11/2010 | Peterson |

OTHER PUBLICATIONS

International Search Report and Written Opinion issued on Aug. 31, 2012 for PCT/US12/37314.
"Nuclear Power Demonstration Reactor" 1962-1987.

* cited by examiner

*Primary Examiner* — Jack W Keith
*Assistant Examiner* — Marshall O'Connor
(74) *Attorney, Agent, or Firm* — Rabin & Berdo, P.C.

(57) ABSTRACT

A method for controlling a nuclear reactor is disclosed. The method includes providing a moderator zone in a core of the nuclear reactor, providing a fuel in the moderator zone, and providing one or more housings, each having a cavity, adjacent to the fuel. The method also includes allowing movement of a moderator between the moderator zone and the cavity of the one or more housings at a lower portion of the one or more housings. The method further includes confining moderator in the cavity of the one or more housings at an upper portion of the one or more housings.

20 Claims, 39 Drawing Sheets

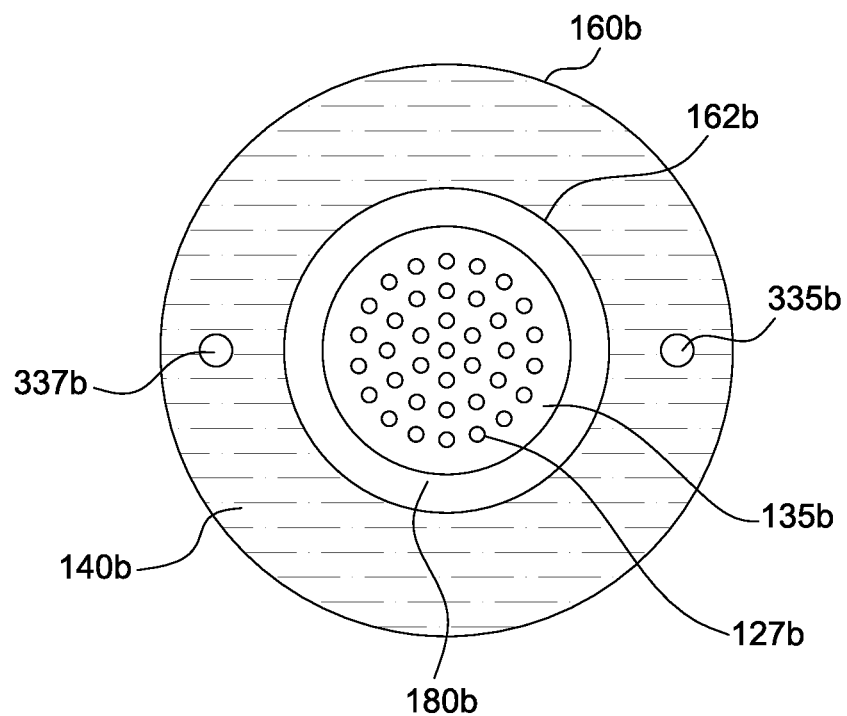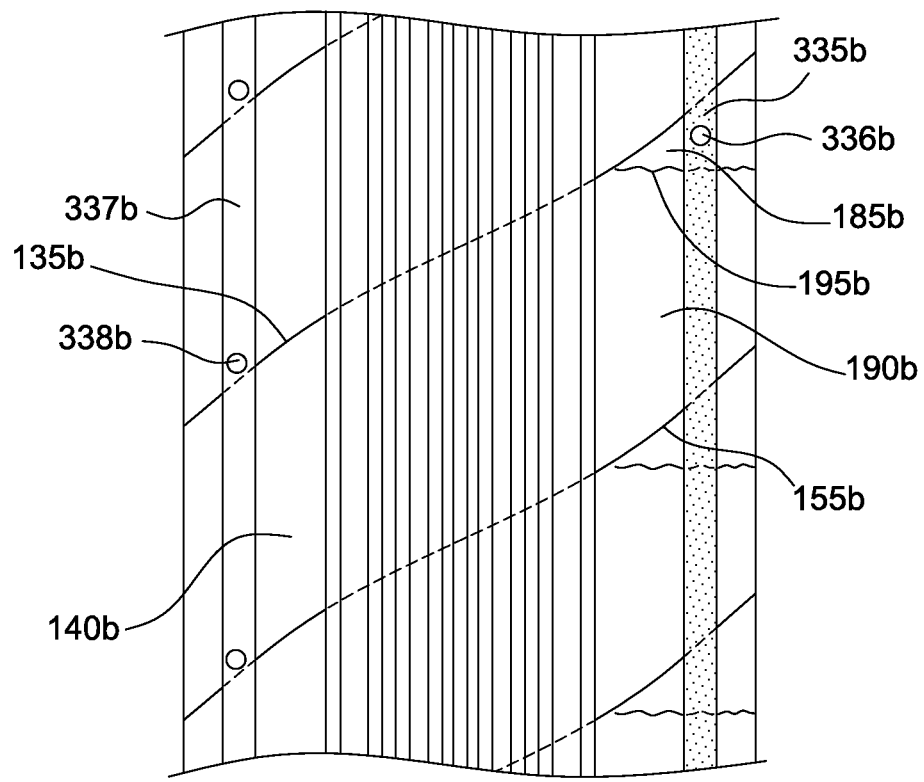
FIG. 12J

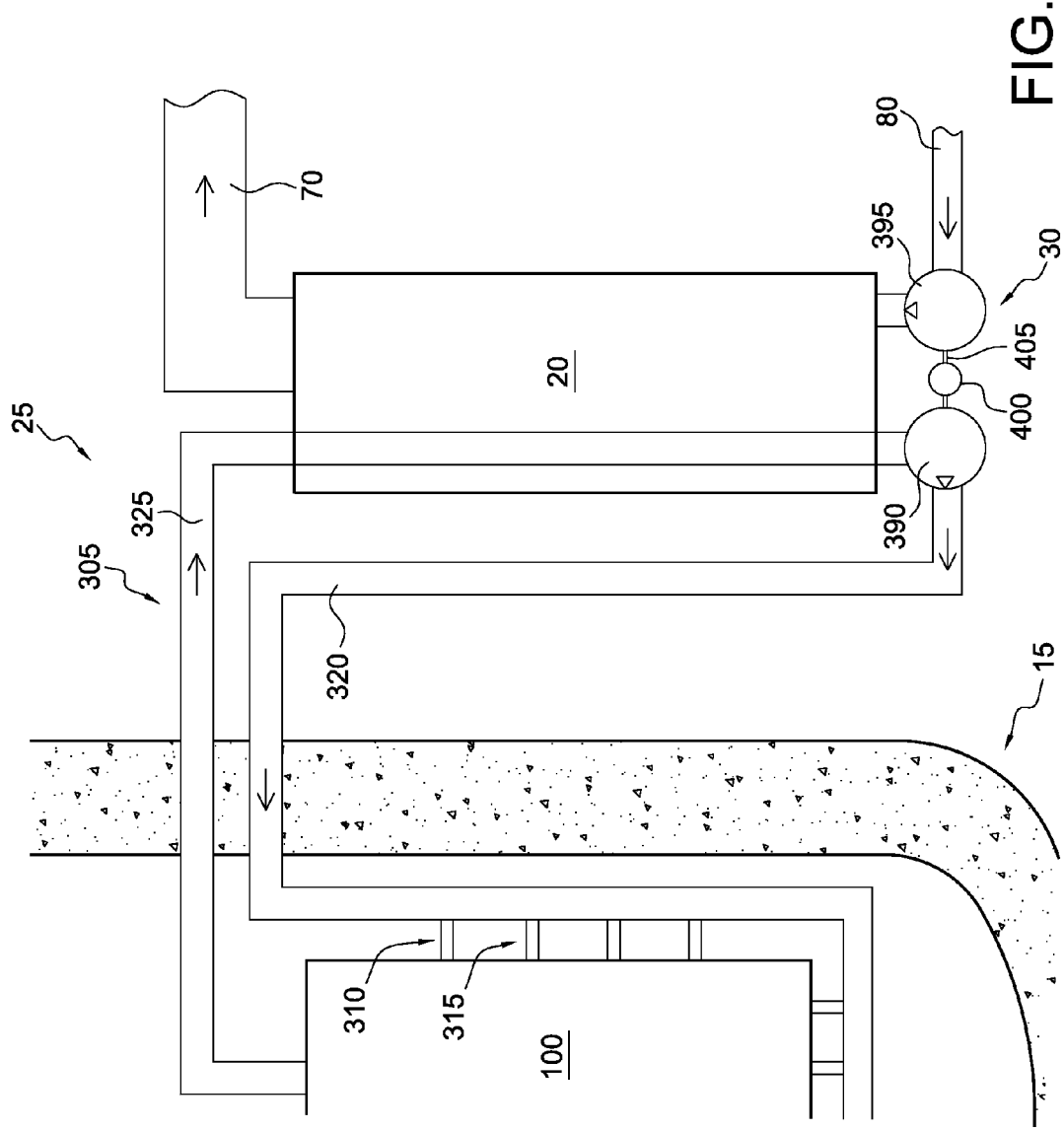

NUCLEAR REACTOR CONTROL METHOD AND APPARATUS

RELATED APPLICATIONS

This application claims the benefit of U.S. Provisional Patent Application No. 61/485,656, filed May 13, 2011, which is hereby incorporated by reference.

TECHNICAL FIELD

The present disclosure is directed to a nuclear reactor control method and apparatus, and more particularly, to a control method and apparatus for controlling a liquid moderated nuclear reactor.

BACKGROUND

Nuclear reactors using conventional reactor nuclear control systems have several deficiencies. Reactors using conventional control systems utilize constant adjustments to the quantity of neutron absorbing material in the reactor core, and have a reduced conversion ratio because they absorb an excessive amount of neutrons. Also, reactors using conventional control systems do not have a relatively large range of reactivity control and thus use fuel with a relatively narrow range of fissile content. Further, reactors using conventional control systems are frequently refueled, do not capture a large percentage of the potential energy in fuel, and leave a relatively high amount of radioactive waste per KWH of power generated.

The control method of the Canadian Deuterium Uranium reactors (CANDU) attempted to address some of these problems. However, the CANDU reactor used adjuster rods, which absorbed an excessive amount of neutrons, and thus did not provide a control system for adequately overcoming deficiencies in conventional technology.

The present disclosure is directed to overcoming one or more of the shortcomings set forth above and/or other deficiencies in the art.

SUMMARY OF THE DISCLOSURE

In accordance with one aspect, the present disclosure is directed toward a method for controlling a nuclear reactor. The method includes providing a moderator zone in a core of the nuclear reactor, providing a fuel in the moderator zone, and providing one or more housings, each having a cavity, adjacent to the fuel. The method also includes allowing movement of a moderator between the moderator zone and the cavity of the one or more housings at a lower portion of the one or more housings. The method further includes confining moderator in the cavity of the one or more housings at an upper portion of the one or more housings.

According to another aspect, the present disclosure is directed toward a nuclear reactor core. The nuclear reactor core has a moderator zone, a fuel disposed in the moderator zone, and one or more housings disposed adjacent to the fuel, each housing having a cavity. The lower portion of each housing is open for movement of the moderator between the moderator zone and the cavity, and an upper portion of each housing is closed for movement of the moderator between the moderator zone and the cavity.

BRIEF DESCRIPTION OF THE DRAWINGS

FIG. 12J includes both a plan schematic view and a sectional schematic view of the fourth exemplary embodiment of the reactor;

FIG. 13 is a schematic illustration of an exemplary reactor coolant subsystem;

DETAILED DESCRIPTION

Figure 1:
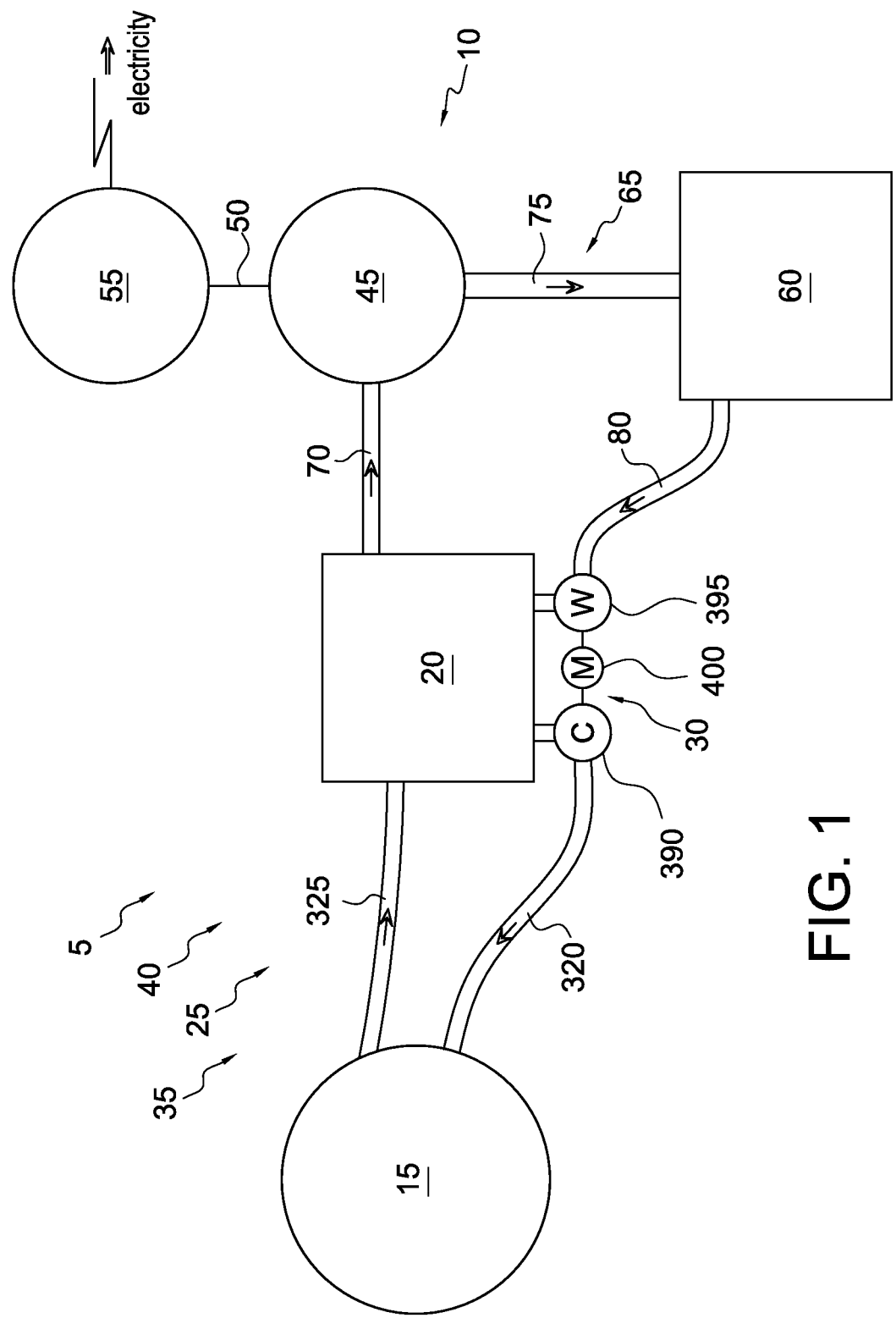
FIG. 1 is a schematic illustration of an exemplary disclosed nuclear reactor system.

FIG. 1 illustrates an exemplary nuclear reactor system 5 for generating power from a nuclear reaction. Nuclear reactor system 5 may include a power generation subsystem 10 and a reactor 15. Reactor 15 may provide energy from a nuclear reaction to power generation subsystem 10. Nuclear reactor system 5 may also include a heat exchanger 20, a reactor coolant subsystem 25, and a pump subsystem 30. Reactor coolant subsystem 25 may facilitate heat exchange between reactor 15 and heat exchanger 20, and pump subsystem 30 may pressurize reactor coolant subsystem 25. Nuclear reactor system 5 may further include an auxiliary coolant subsystem 35 and a reactor control subsystem 40. Auxiliary coolant subsystem 35 may provide for additional heat transfer from reactor 15, and reactor control subsystem 40 may control an operation of reactor 15.

Power generation subsystem 10 may include one or more turbines 45, one or more drive assemblies 50, one or more generators 55, a turbine cooling subsystem 60, and a turbine steam subsystem 65. Turbine 45 may drive generator 55 via drive assembly 50. Turbine steam subsystem 65 may transfer water ($H_2O$) and steam ($H_2O$) between turbine 45 and turbine cooling subsystem 60.

Turbine 45 may be any type of turbine that is suitable for use with a nuclear reactor such as, for example, a steam turbine. Turbine 45 may convert high pressure steam ($H_2O$) that is delivered by turbine steam subsystem 65 into mechanical energy. For example, turbine 45 may include a plurality of elements mounted on a rotatable shaft. The high pressure steam ($H_2O$) may enter turbine 45 and pass over the elements mounted on the shaft, the kinetic energy of the steam ($H_2O$) thereby forcing the plurality of elements to rotate the rotatable shaft. Turbine 45 may include a series of one or more high pressure cylinders followed by one or more low pressure cylinders. Each cylinder may admit steam ($H_2O$) at a central portion, and the steam ($H_2O$) may progressively expand through the series of cylinders, thereby moving the elements mounted on the shaft of turbine 45. Turbine 45 may include stationary elements that direct a steam ($H_2O$) flow within turbine 45. Turbine 45 may include additional systems such as, for example, a hydraulic control valve system having oil-operated valves to regulate steam ($H_2O$) flow, a lubricating system for lubricating bearings that support the cylinders, and a moisture separator for removing moisture from steam ($H_2O$) after leaving the high pressure cylinders and before entering the low pressure cylinders.

Drive assembly 50 may be any suitable assembly for transferring mechanical energy from turbine 45 to generator 55 such as, for example, a mechanical driveshaft assembly. Drive assembly 50 may operably connect a rotatable shaft of turbine 45 to generator 55 so that the kinetic energy from the steam ($H_2O$) hitting the elements mounted on the shaft of turbine 45 may be transferred as mechanical energy to generator 55 via drive assembly 50.

Generator 55 may be any type of generator that is suitable for use with a nuclear reactor such as, for example, an electrical generator. For example, generator 55 may include a magnet and wire arrangement for generating electricity from the mechanical energy transferred by drive assembly 50. For example, drive assembly 50 may rotate a magnetic element within generator 55 to generate electrical power. Generator 55 may produce AC electricity at any suitable frequency such as, for example, 50 Hz (50 cycle) or 60 Hz (60 cycle) power. Power generation subsystem 10 may be operated to maintain one or more generators 55 at a substantially constant frequency such as, for example, 50 or 60 cycle power.

Turbine cooling subsystem 60 may be any type of cooling system that is suitable for use with a nuclear reactor such as, for example, a cooling system using condensers, cooling towers, and/or forced airflow for heat exchange. Turbine cooling subsystem 60 may remove surplus steam ($H_2O$) from turbine 45 and condense the surplus steam ($H_2O$) into water ($H_2O$). In addition to using condensers, cooling towers, and/or forced airflow to condense steam ($H_2O$) into water ($H_2O$), turbine cooling subsystem 60 may also utilize nearby bodies of water ($H_2O$), if available and suitable, for, e.g., once-through cooling.

Turbine steam subsystem 65 may be any type of arrangement suitable for transferring water ($H_2O$) and steam ($H_2O$) between heat exchanger 20, turbine 45, and turbine cooling subsystem 60. Turbine steam subsystem 65 may include a passageway 70 that transfers hot steam ($H_2O$) from heat exchanger 20 to turbine 45, a passageway 75 that transfers surplus or dead steam ($H_2O$) from turbine 45 to turbine cooling subsystem 60, and a passageway 80 that transfers relatively cold water ($H_2O$) from turbine cooling subsystem 60 to heat exchanger 20. Passageways 70, 75, and 80 may be any suitable passageways for transferring steam ($H_2O$) and water ($H_2O$) such as, for example, steel pipe.

Nuclear reactor system 5 may also provide steam ($H_2O$) for any other suitable purpose for which steam ($H_2O$) may be useful, in addition to providing steam ($H_2O$) to turbines for power generation. For example, nuclear reactor system 5 may include configurations in which steam ($H_2O$) is not returned to the system after use, and/or in which input water ($H_2O$) comes from a source that is different from turbine steam subsystem 65. For example, nuclear reactor system 5 may provide steam ($H_2O$) for use in geothermal oil extraction.

Heat exchanger 20 may be any type of heat exchanger suitable for transferring thermal energy between power generation subsystem 10 and reactor 15. For example, heat exchanger 20 may include one or more steam generators having a plurality of tubes through which hot reactor coolant of reactor coolant subsystem 25 flows. Each steam generator may include, for example, thousands of tubes for receiving hot reactor coolant. For example, each steam generator may include between about 3,000 and about 16,000 tubes. The hot reactor coolant flowing through the steam generator tubes may boil water ($H_2O$) delivered to heat exchanger 20 by turbine steam subsystem 65. The steam ($H_2O$) generated by the steam generators of heat exchanger 20 may then be transferred to turbine 45 via turbine steam subsystem 65. While passing through heat exchanger 20, reactor coolant may be cooled and may subsequently be returned to reactor 15 via reactor coolant subsystem 25.

Water ($H_2O$) delivered to heat exchanger 20 by turbine steam subsystem 65 may enter heat exchanger 20 at an upper portion of heat exchanger 20. The relatively cold water ($H_2O$)

may be injected into an interior portion of heat exchanger 20 via a plurality of nozzles 83 (see FIG. 20) that may be disposed at a central and/or upper portion of heat exchanger 20, on interior walls of heat exchanger 20. The plurality of nozzles 83 may be oriented downward and may inject the water ($H_2O$) into boiling water ($H_2O$) already contained within heat exchanger 20. Therefore, the relatively cold water ($H_2O$) may be mixed with the boiling water ($H_2O$) already contained in heat exchanger 20, thereby helping to reduce a magnitude of a temperature gradient of $H_2O$ contained inside heat exchanger 20. Heat exchanger 20 may thereby be able to produce steam ($H_2O$) at higher temperatures, due to the lower temperature gradient. It is contemplated that the magnitude of the temperature gradient may also be further reduced by using a recirculation pump or by using a combination of convection currents, with entrainment of boiling water ($H_2O$) into the downward streams of relatively cold water ($H_2O$) from nozzles 83.

Figure 2:
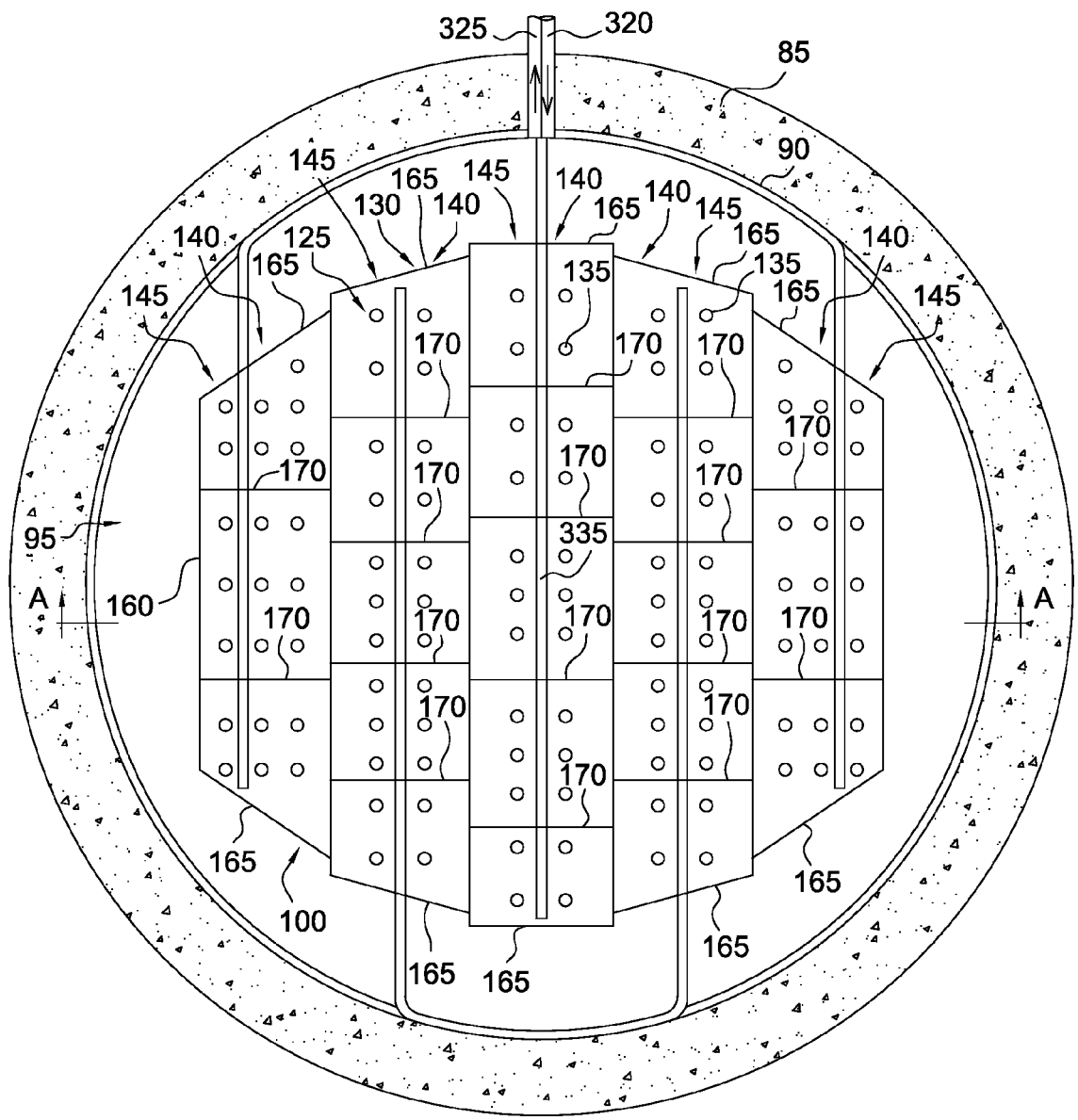
FIG. 2 is a plan view of a first exemplary reactor of the nuclear reactor system of FIG. 1.

Reactor 15 may be any type of nuclear reactor suitable for generating power from a nuclear reaction. Reactor 15 may be, for example, any nuclear reactor that uses liquid moderator. Also, for example, reactor 15 may be a heavy water moderated and/or heavy water cooled reactor. Reactor 15 may be, for example, a CANDU reactor. As illustrated in FIG. 2, reactor 15 may include a containment structure 85, a pressure vessel 90, a reflector zone 95, and a reactor core 100. Containment structure 85 and pressure vessel 90 may house reflector zone 95. Reactor core 100 may be disposed in reflector zone 95.

Containment structure 85 may be any type of structure suitable for housing reflector zone 95 and reactor core 100, and for shielding the environment outside of reactor 15 from radiation and neutrons emitted by reactor 15. For example, containment structure 85 may include reinforced concrete or prestressed concrete walls that surround reflector zone 95 and reactor core 100. Containment structure 85 may have walls having any suitable thickness for housing reflector zone 95 and reactor core 100 such as, for example, between about four feet and about ten feet. Containment structure 85 may include apertures for receiving various elements of reactor coolant subsystem 25, auxiliary coolant subsystem 35, or other elements of nuclear reactor system 5. Containment structure 85 may structurally support, insulate, and serve as a radiation barrier for reflector zone 95 and reactor core 100. A reflecting pool may, for example, simply fill the bottom of pressure vessel 90, or may be enclosed in separate containers as described further below.

Pressure vessel 90 may be any type of pressure vessel or structure suitable for pressurizing reflector zone 95 and reactor core 100. For example, pressure vessel 90 may be a steel vessel that seals and pressurizes reflector zone 95 and reactor core 100. Pressure vessel 90 may include one or more steel elements that are configured and/or connected to form a sealed vessel. Pressure vessel 90 may include any other suitable material with appropriate properties for use as a pressure vessel such as, for example, materials having resistance to fracture and embrittlement. Pressure vessel 90 may be used when reflector zone 95 and reactor core 100 include a "hot moderator" that is maintained at a relatively high temperature. Pressure vessel 90 may include apertures for receiving various elements of reactor coolant subsystem 25, auxiliary coolant subsystem 35, or other elements of nuclear reactor system 5. The apertures of pressure vessel 90 may be sealed to maintain a pressurization of reflector zone 95 and reactor core 100 within pressure vessel 90.

Figure 3:
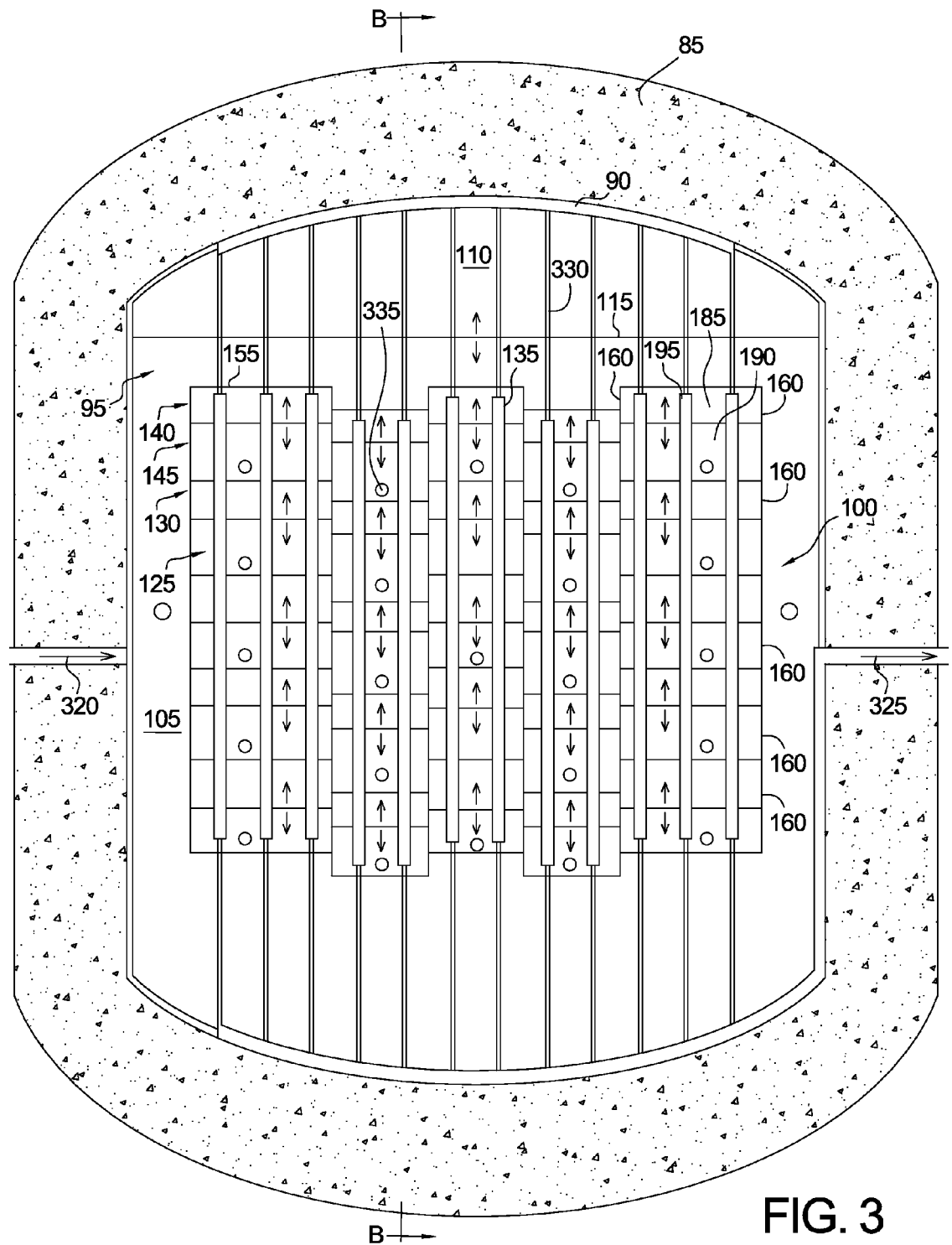
FIG. 3 is a sectional view taken through section A-A of the reactor shown in FIG. 2.

As illustrated in FIG. 3, reflector zone 95 may include a reflecting pool 105 and a steam area 110. A boundary 115 may separate reflecting pool 105 and steam area 110.

Reflecting pool 105 may include a moderator in a liquid state. For example, reflecting pool 105 may include $D_2O$ ("heavy water") in a liquid state. Reflecting pool 105 may include $D_2O$ manufactured to have any suitable properties for moderating a nuclear reaction. For example, the $D_2O$ of reflecting pool 105 may be reactor grade heavy water (99.75% pure). Reflecting pool 105 may also include $H_2O$ ("light water") moderator in a liquid state. Reflecting pool 105 may include a "hot moderator" (e.g., FIG. 2) or a "cold moderator" (e.g., FIG. 11).

Steam area 110 may include a moderator that is of the same material as reflecting pool 105. Steam area 110 may include moderator that is in a gaseous state. Heat from reactor core 100 may heat the moderator in reflector zone 95, causing some of the moderator to be held in a gaseous state in steam area 110. The temperature of the gaseous moderator of steam area 110 is about the same as a temperature of the liquid moderator of reflecting pool 105. Steam area 110 may fill substantially the entire reflector zone 95 if substantially all of the moderator is heated to a gaseous state. Also, reflecting pool 105 may fill substantially the entire the entire reflector zone 95 if substantially all of the moderator is cooled to a liquid state. A boundary 115 may separate reflecting pool 105 and steam area 110.

Four exemplary embodiments of a reactor core are disclosed below: reactor core 100, reactor core 100', reactor core 100a, and reactor core 100b. Wherever suitable, the various disclosed features of each exemplary embodiment (for example, the reference numerals having an "a" modifier for reactor core 100a) may be combined with features of the other embodiments. As disclosed further below, the disclosed exemplary embodiments illustrate the wide range of possible embodiments of the disclosed nuclear reactor system. For example, reactor core 100, 100', 100a, and 100b show that the disclosed nuclear reactor system may include both vertical and horizontal fuel tube arrangements, both hot and cold moderator in the reactor core, different nuclear fuels such as uranium, plutonium, and thorium in different compositions such as metal, oxide, or salts, different fuel tube arrangements such as hexagonal and square arrangements, different types of moderator (e.g., $D_2O$ and $H_2O$), different primary coolants (e.g. liquids such as $D_2O$, $H_2O$, and organic fluids; molten metals such as sodium and lead; molten salts, and gasses such as helium) and different moderator cooling techniques (e.g., heat exchange and direct fluid exchange). By considering the exemplary embodiments disclosed below, one of ordinary skill in the art would understand that the various disclosed features of each exemplary embodiment may be combined with features of any other exemplary embodiment, wherever appropriate.

Figure 4:
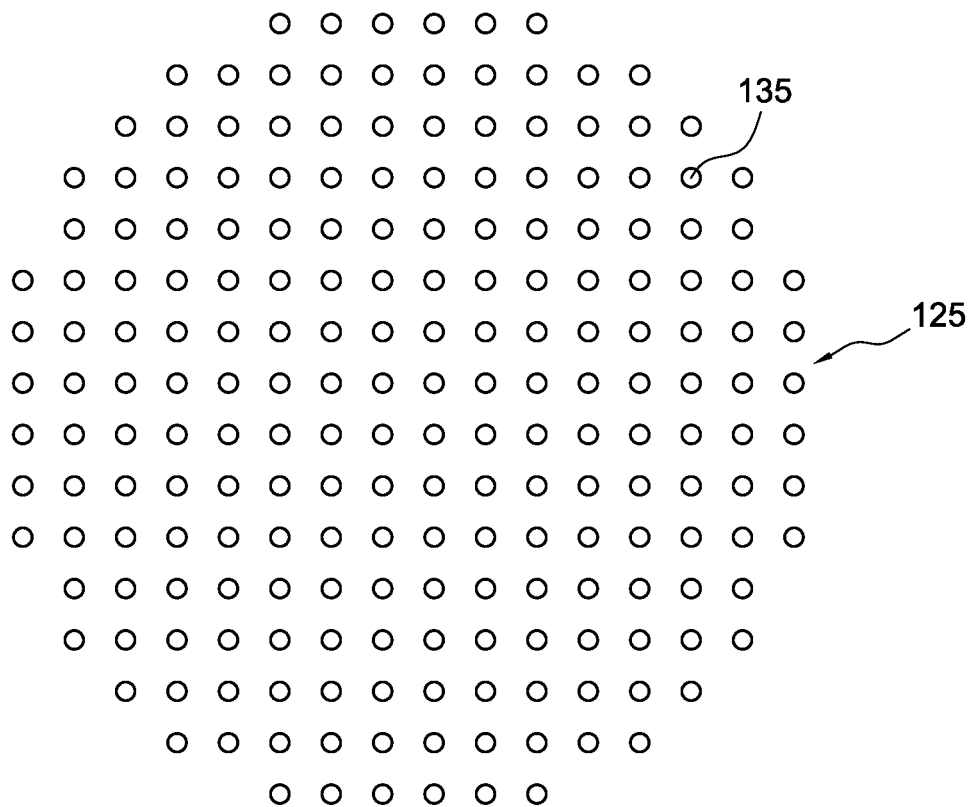
FIG. 4 is a schematic illustration of an exemplary fuel tube arrangement of the reactor.

As the first exemplary embodiment of the reactor core, reactor core 100 may include a fuel assembly 125 and a control cavity array 130. Control cavity array 130 may contain one or more pockets of moderator and/or moderator steam adjacent to fuel assembly 125. Fuel tubes 135 may be oriented vertically in a square array with truncated corners (as illustrated in FIG. 4), and the moderator and fuel coolant may be heavy water (e.g., $D_2O$). The moderator may be cooled by conduction from a portion of the primary coolant (fuel coolant) flow.

Fuel assembly 125 may be any type of nuclear fuel suitable for use in a nuclear reaction. For example, fuel assembly 125 may include bundles of fuel rods that are disposed in a plurality of fuel tubes 135. For example, fuel assembly 125 may include an arrangement of hundreds of fuel tubes 135. For example, fuel assembly 125 may include between about 100 and about 500 fuel tubes 135 that may be about four inches in diameter. Each fuel tube 135 may include any suitable number of fuel bundles such as, for example, 12 fuel bundles. Each fuel bundle may include any suitable number of fuel rods such as, for example, 37 fuel rods. Fuel assembly 125 may include any suitable fuel for a nuclear reaction such as, for example, natural uranium, enriched uranium, mixed oxide fuel (MOX), plutonium, thorium, and/or various mixtures of these and other materials. For example, fuel assembly 125 may include a mixed uranium/plutonium fuel or a mixed uranium/thorium fuel.

Figure 5:
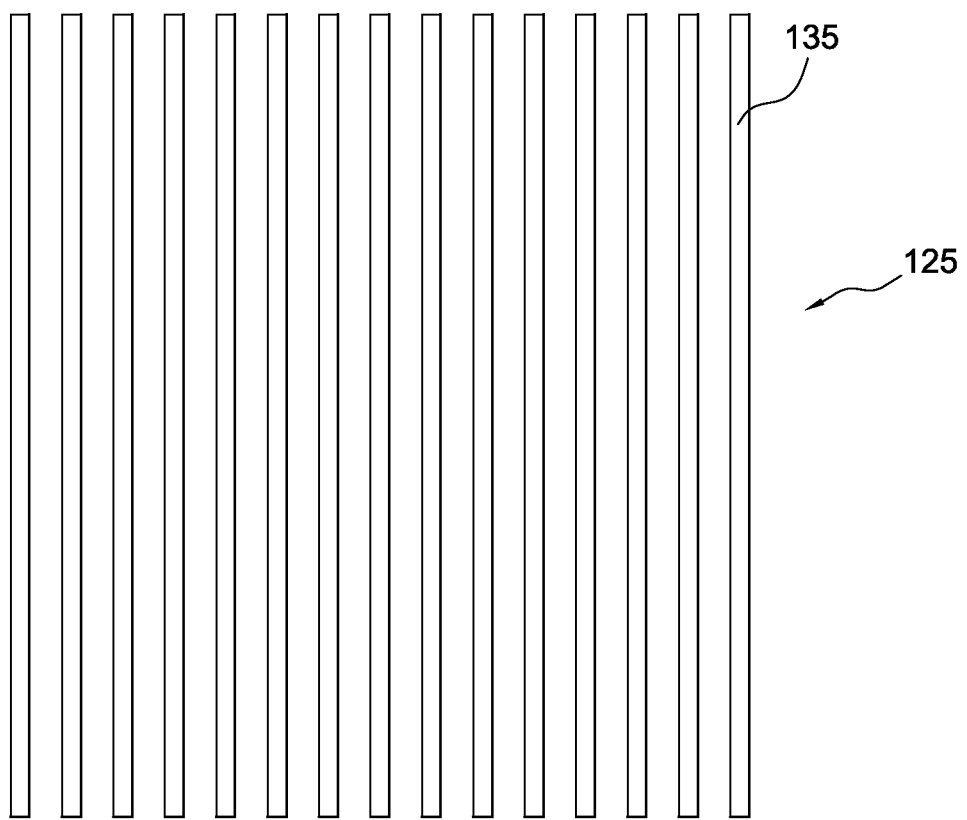
FIG. 5 is a side view of the fuel tube arrangement of FIG. 4.

Fuel assembly 125 may include fuel tubes 135 that are vertically disposed (e.g., as illustrated in FIG. 2). Fuel assembly 125 may include fuel tubes 135 arranged in any suitable configuration such as, for example, a right angle array as illustrated in FIGS. 4 and 5.

Figure 7:
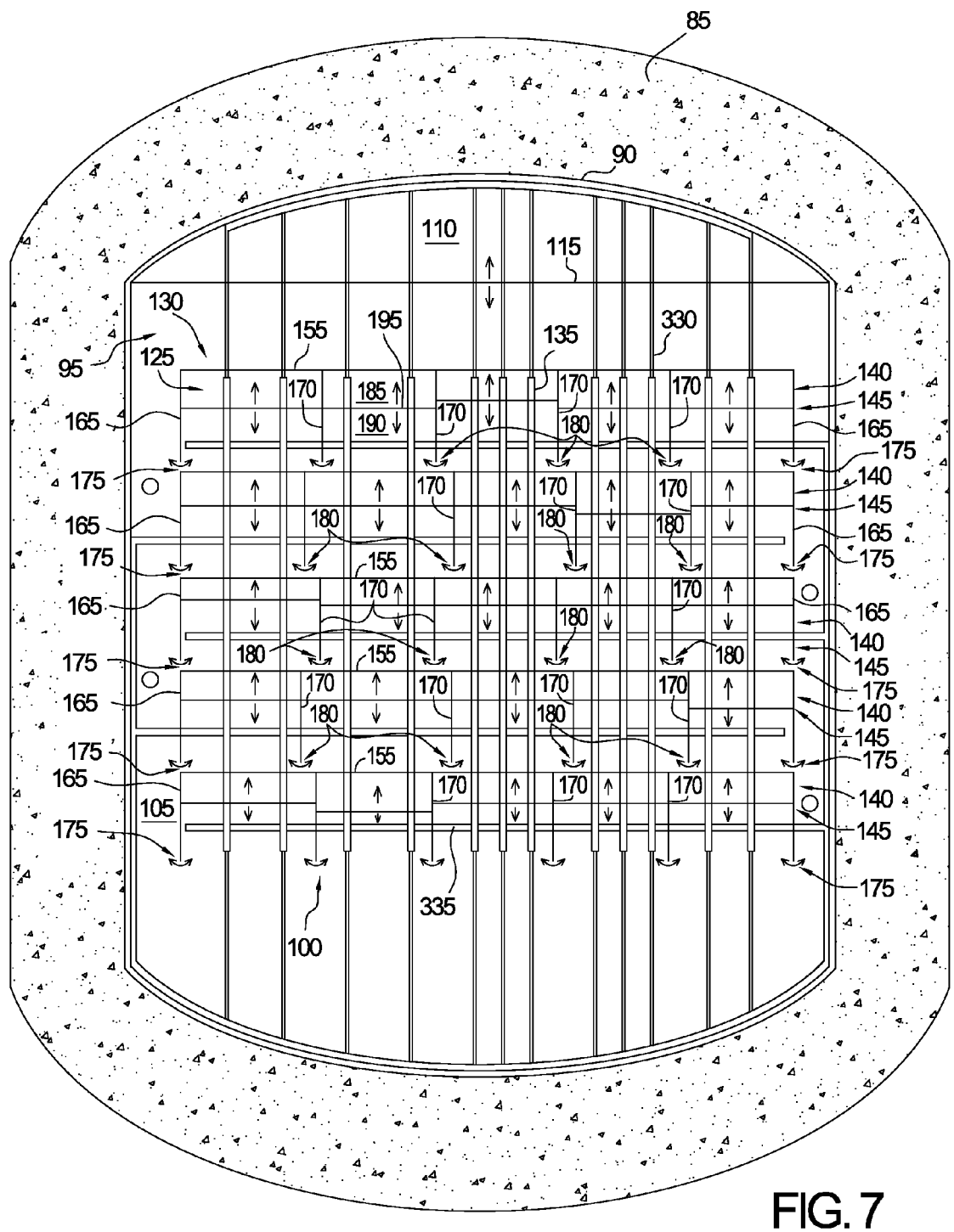
FIG. 7 is a sectional view taken through section B-B of the reactor shown in FIG. 3.

Referring back to FIG. 2, control cavity array 130 may include a three-dimensional array of control cavities 140. For example, the three-dimensional array of control cavities 140 may serve as a housing to confine moderator adjacent to fuel tubes 135 of fuel assembly 125. As depicted in FIGS. 2, 3, and 7, the plurality of control cavities 140 may be disposed horizontally to each other, as well as being stacked vertically. Control cavities 140 may be staggered vertically and/or horizontally within control cavity array 130. For example, vertical staggering of control cavities 140 is depicted in FIG. 3. Control cavities 140 may be arranged in any suitable configuration for confining a moderator adjacent to fuel tubes 135.

Figure 2A:
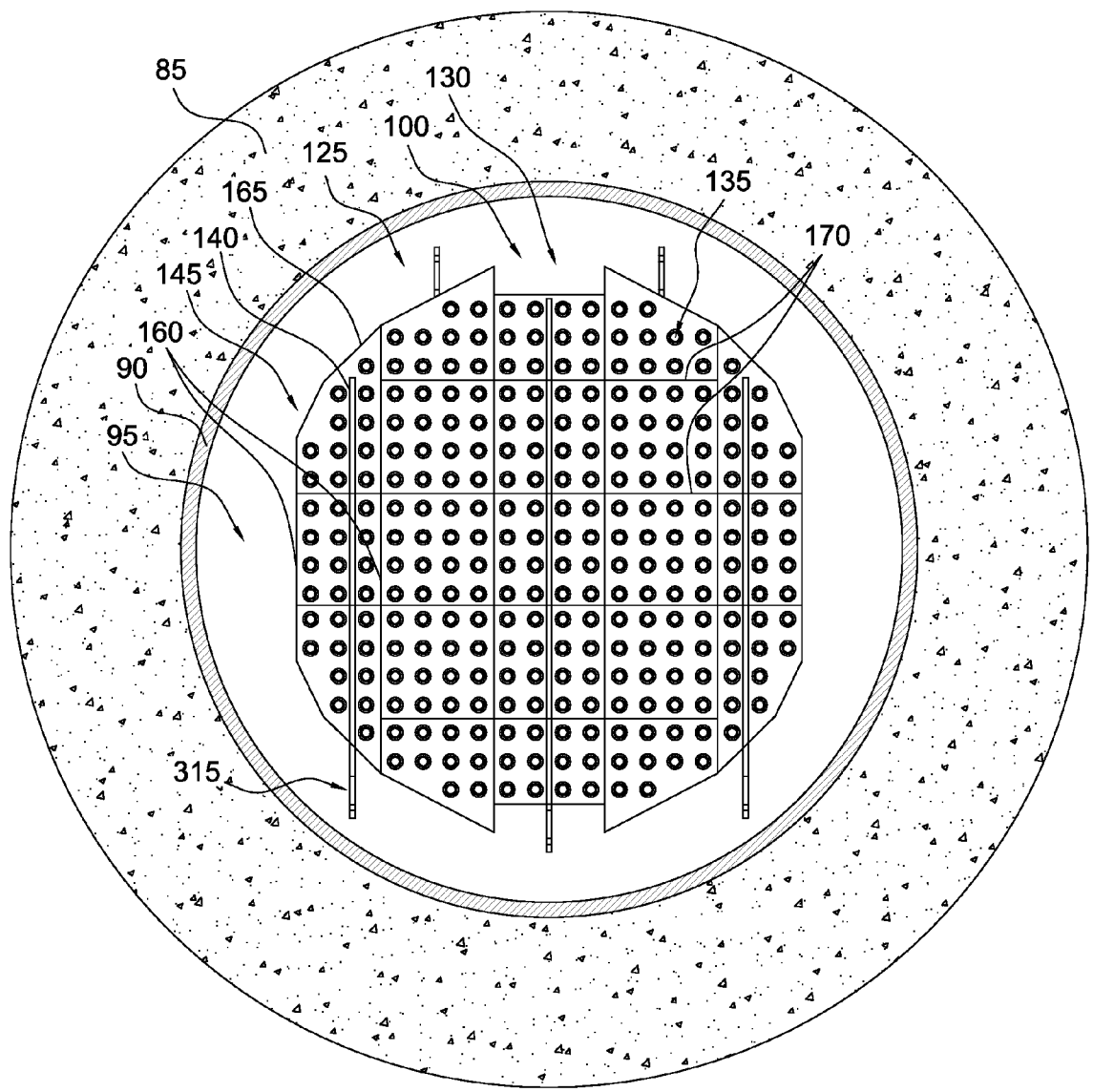
FIG. 2A is a plan scaled view of the arrangement of the nuclear reactor system of FIG. 1.
Figure 3A:
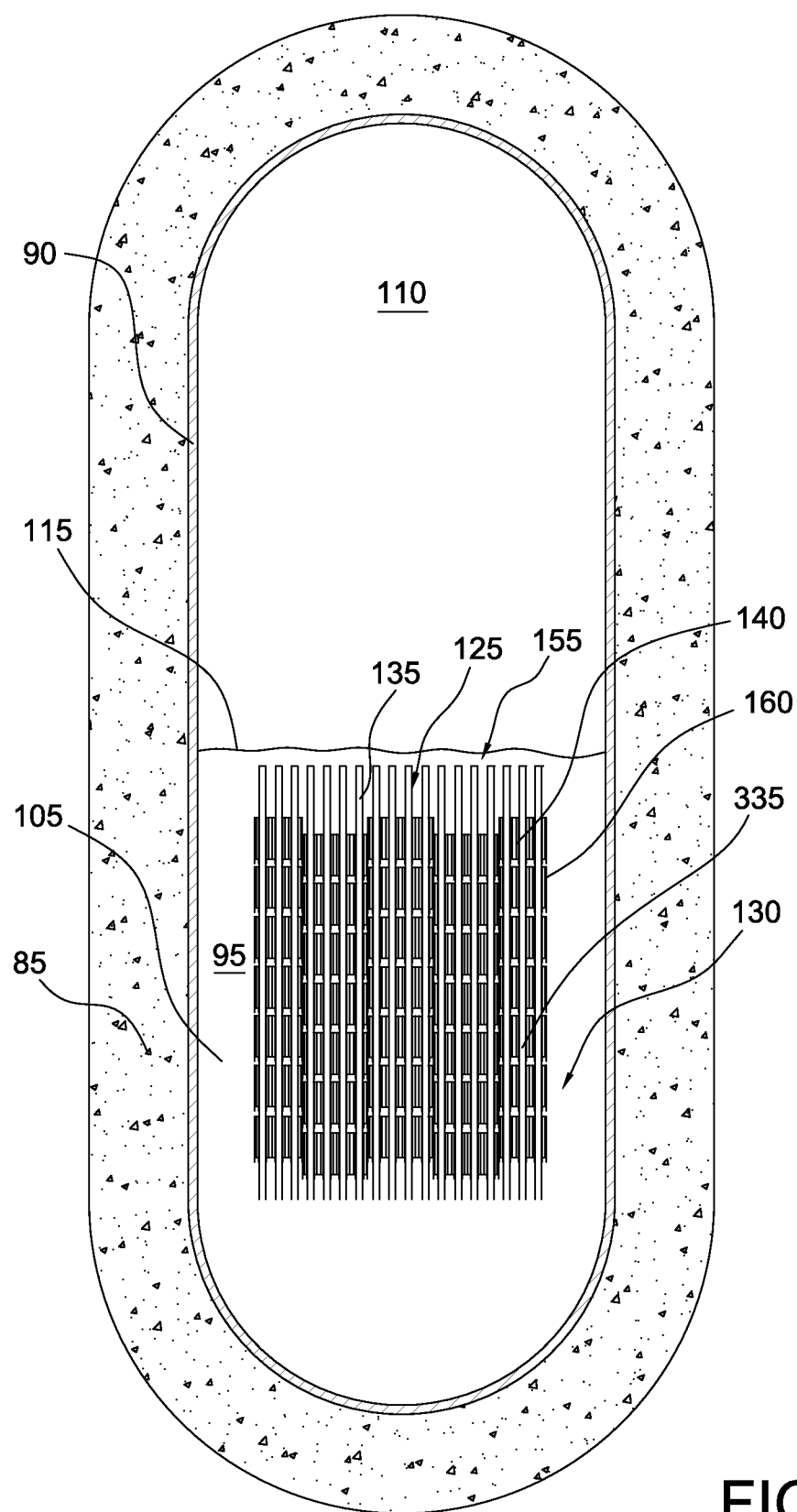
FIG. 3A is a scaled sectional view taken through section A-A of the reactor shown in FIG. 2.

FIGS. 2A and 3A illustrate different views of the arrangements of reactor 15. FIG. 2A and FIG. 3A provide views of exemplary scaled arrangements of reactor 15.

Figure 8:
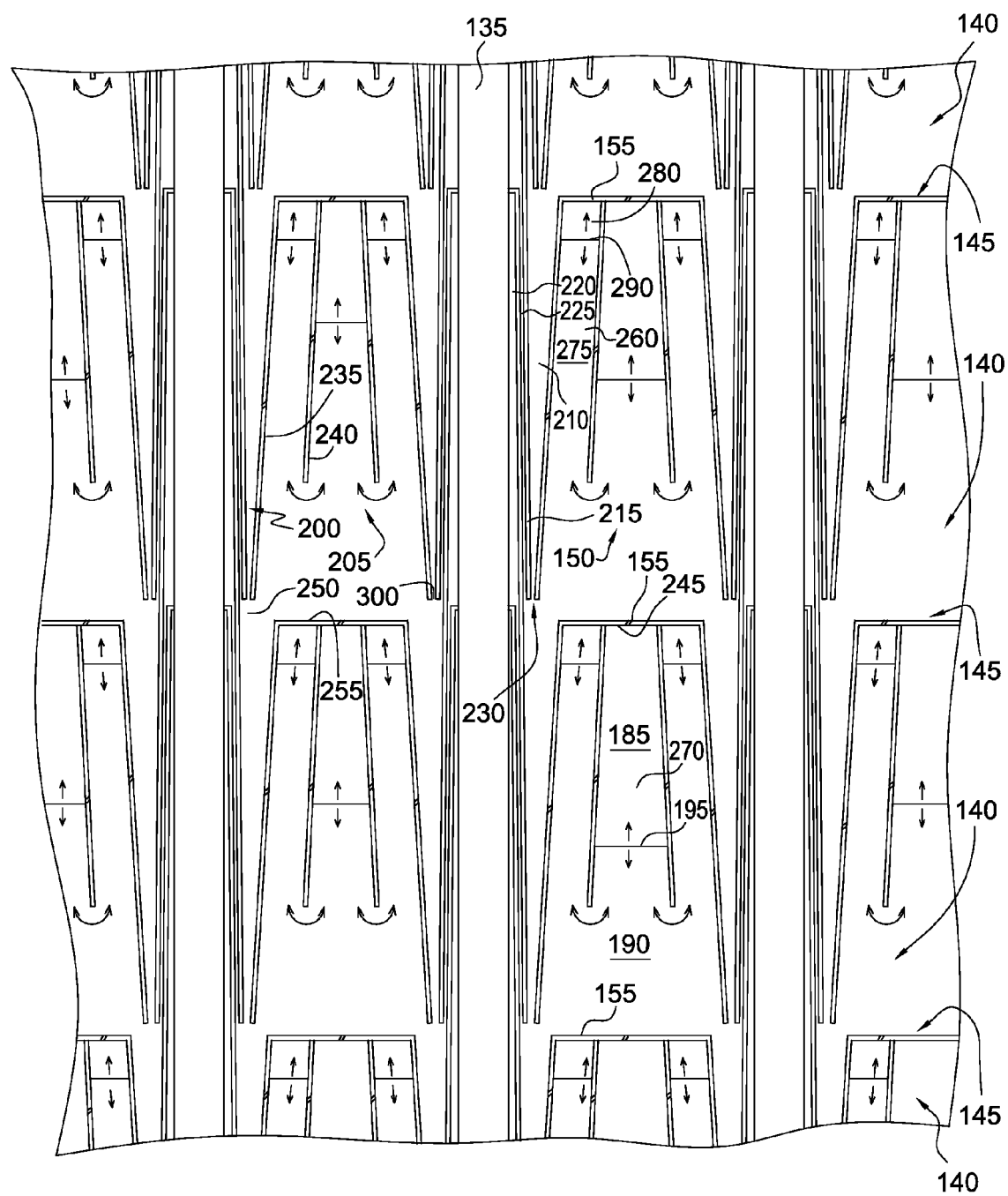
FIG. 8 is a detailed view of an exemplary control cavity array of the reactor.
Figure 8A:
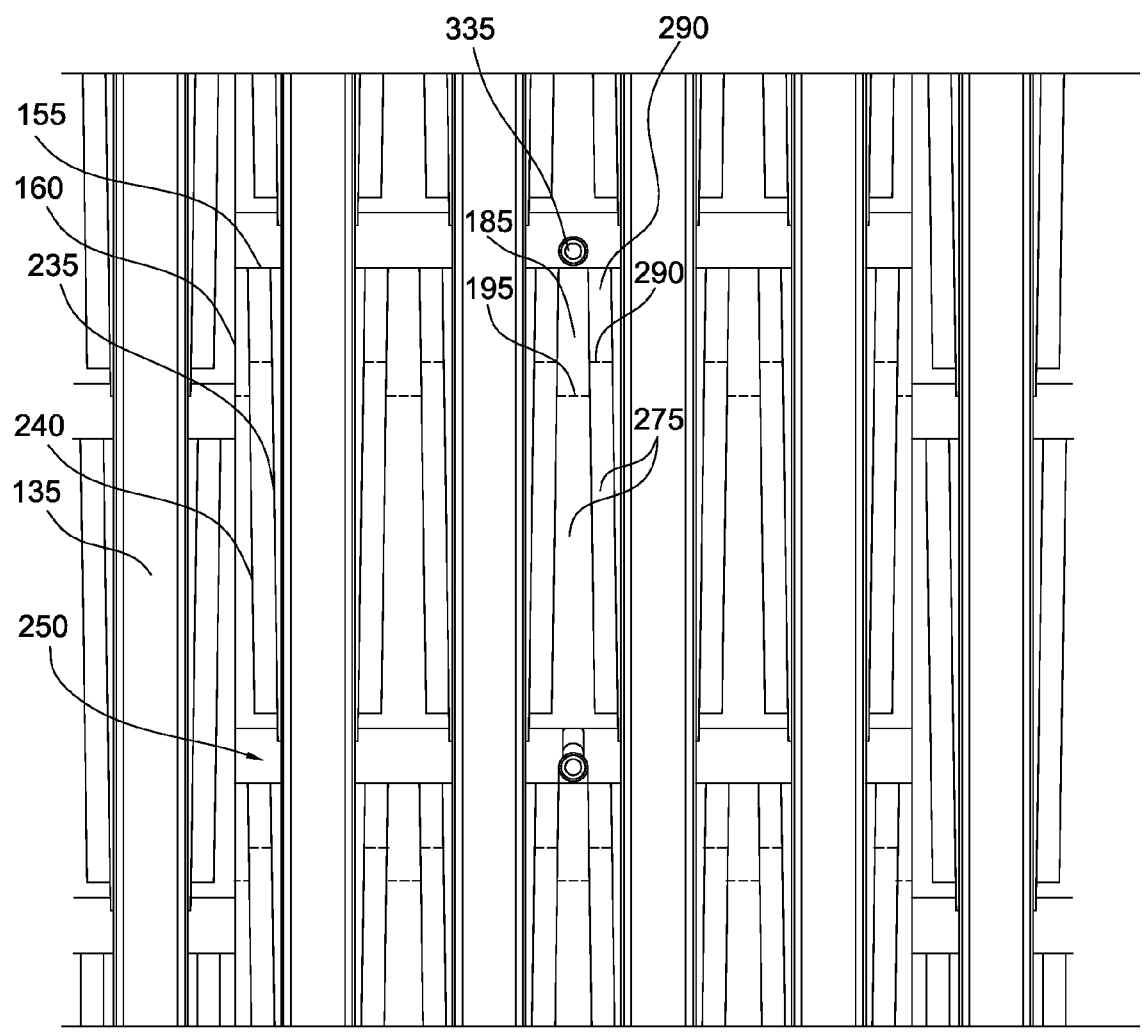
FIG. 8A is another detailed view of an exemplary control cavity array of the reactor.
Figure 8B:
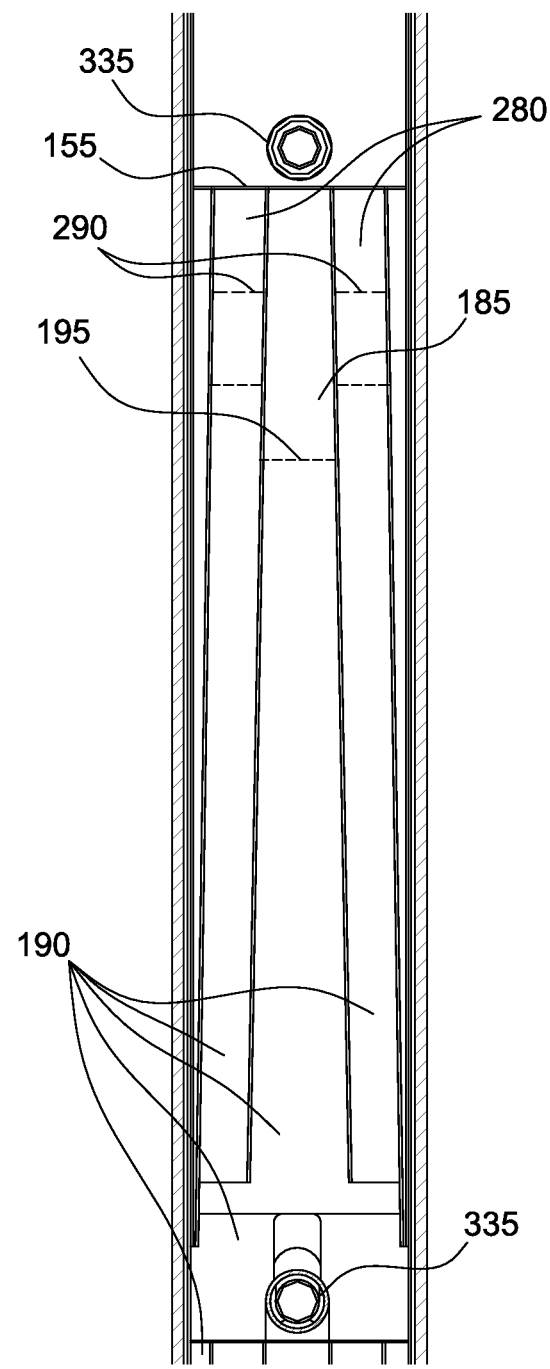
FIG. 8B is another detailed view of an exemplary control cavity array of the reactor.
Figure 8C:
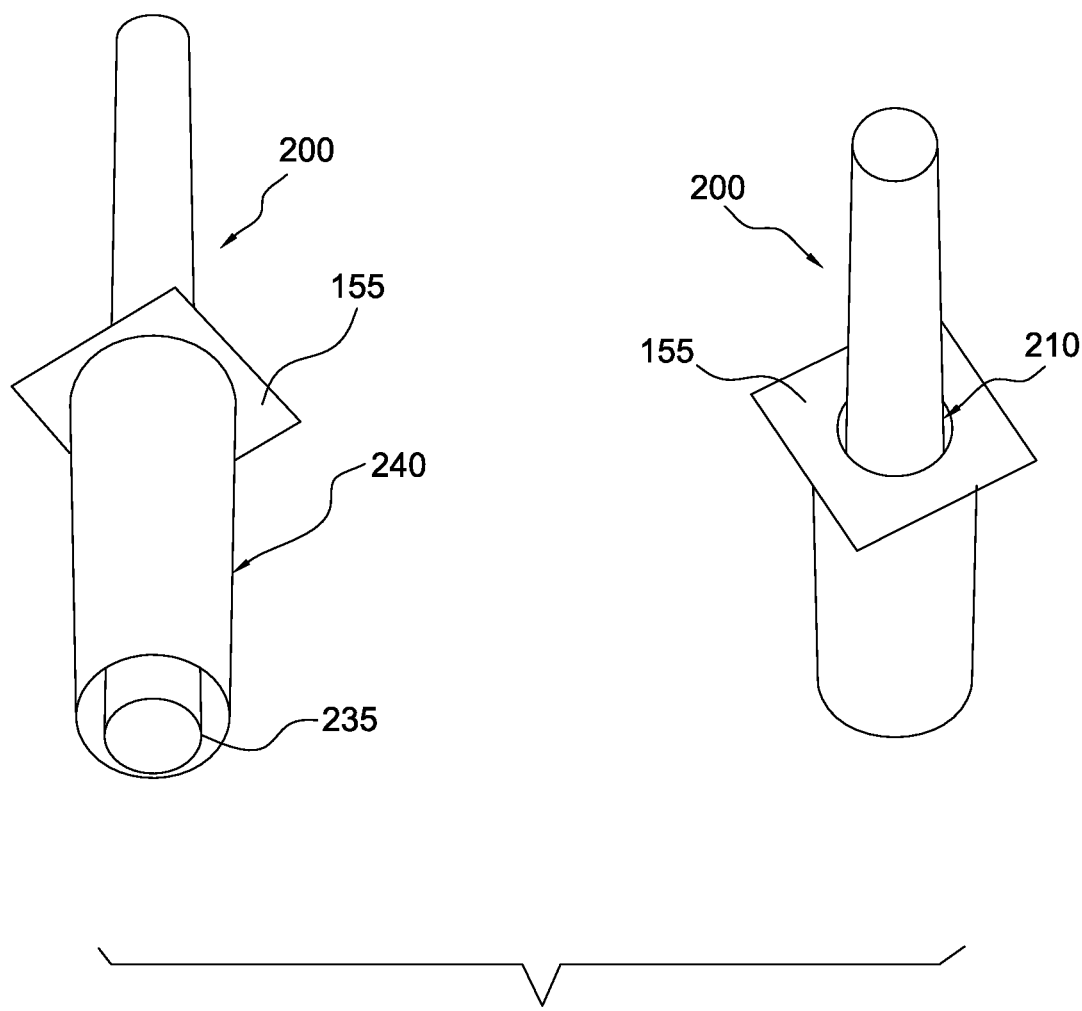
FIG. 8C is a schematic illustration of an exemplary control cavity array of the reactor.
Figure 8D:
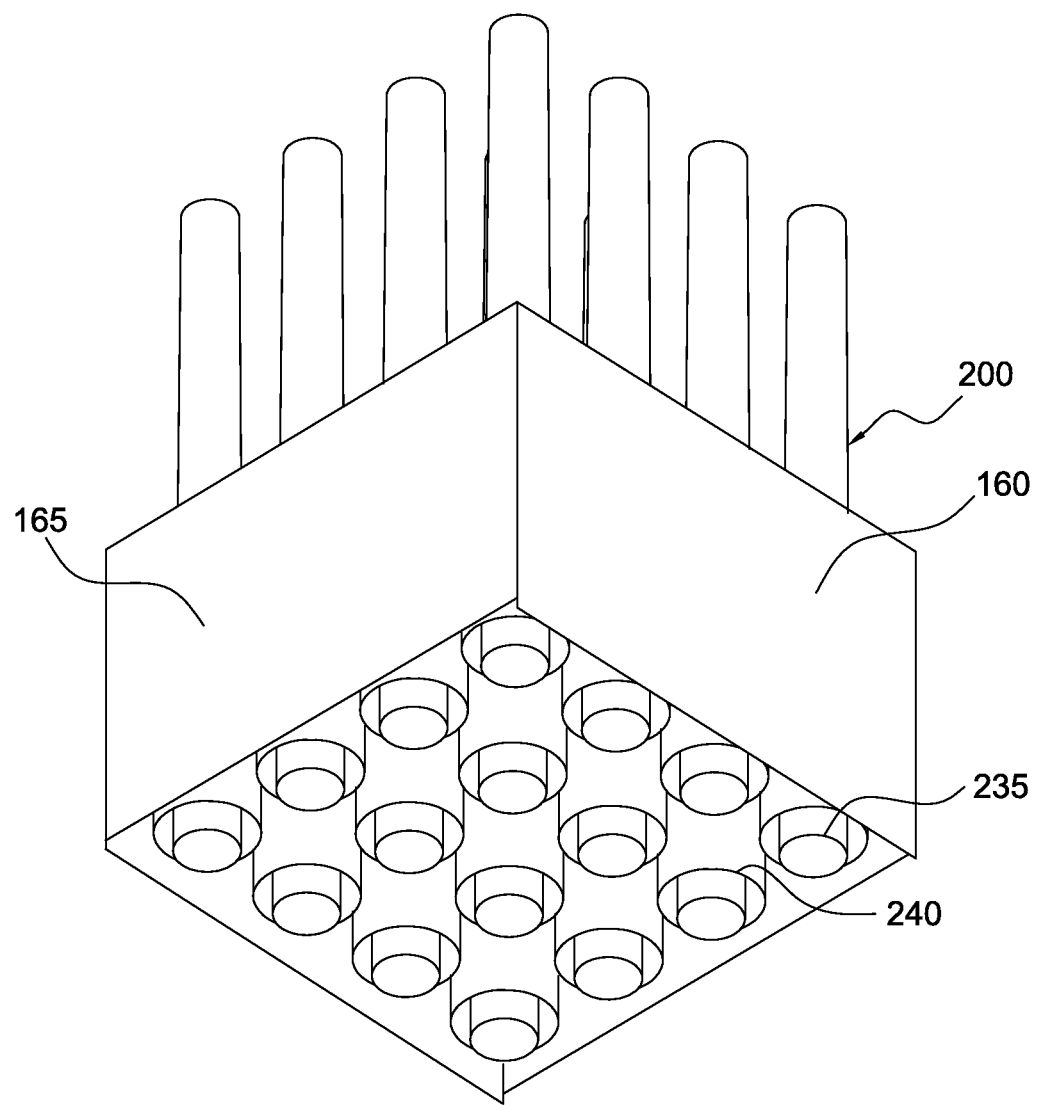
FIG. 8D is another schematic illustration of an exemplary control cavity array of the reactor.

As depicted in FIGS. 2 and 8, each control cavity 140 may include a structural assembly 145 and a cone assembly 150. Cone assembly 150 may confine moderator within structural assembly 145. Structural assembly 145 may serve as a housing to confine moderator.

As depicted in FIGS. 2, 3, and 7, structural assembly 145 may include one or more upper members 155, one or more side members 160, one or more end members 165, and one or more intermediate members 170. Upper member 155, side members 160, end member 165, and intermediate member 170 may be formed from any suitable structural materials for confining moderator such as, for example, zirconium alloy. Upper member 155, side members 160, end member 165, and intermediate member 170 may be attached to each other by any suitable technique such as, for example, welding. Upper member 155, side members 160, end member 165, and intermediate member 170 may also be integrally formed with each other. Upper member 155, side members 160, end member 165, and intermediate member 170 may be any suitable structural member for confining moderator such as, for example, substantially flat and/or plate-like members. Upper member 155 may be, for example, a flat member disposed substantially horizontally at an upper portion of control cavity 140, and may be attached to substantially flat side members 160. End members 165 may be attached to end portions of upper member 155 and side members 160. Upper member 155, side members 160, and end members 165 may be attached to form, for example, a cavity having a closed upper portion and an open bottom portion. Thus, upper member 155, side members 160, and end members 165 may substantially prevent moderator movement in and out of an upper portion of control cavity 140, while allowing moderator to move in and out of a lower portion of control cavity 140. The upper portion of control cavity 140 may include upper member 155, upper portions of side members 160, and upper portions of end members 165. The lower portion of control cavity 140 may include lower portions of side members 160 and lower portions of end members 165.

One or more intermediate members 170 may be disposed between and attached to side members 160 and upper member 155. Intermediate members 170 may be disposed at any interval along control cavity 140. Intermediate members 170 may substantially prevent movement of moderator through control cavity 140 at an upper portion of control cavity 140. End members 165 and intermediate members 170 may have a height that is less than a height of side members 160. Side members 160 of a given control cavity 140 may be attached to upper member 155 of another control cavity 140 disposed below, for example, in the case that control cavities 140 are vertically stacked. Because the height of end members 165 and intermediate members 170 may be less than the height of side members 160, moderator may be free to move under end members 165 and intermediate members 170 via gaps 175 and gaps 180, respectively, as depicted in FIG. 7. Thus, end members 165 and intermediate members 170 may serve as baffles to block movement of moderator in an upper portion of control cavity 140 and allow movement of moderator in a lower portion of control cavity 140. Gaps 180 may allow movement of moderator through a lower portion of control cavity 140, and gaps 175 may allow movement of moderator between reflector zone 95 and control cavity 140. Moderator may not move under side members 160, which may be attached to upper member 155 of the control cavity 140 disposed below. However, it also contemplated that gaps may be provided between side members 160 and the upper member 155 of control cavity 140 disposed below, to also allow movement of moderator under some or all of side members 160. Thus, it is also contemplated that moderator may be free to move between reflector zone 95 and control cavities 140, under side members 160.

As depicted in FIGS. 3 and 7, control cavities 140 may include the same moderator as reflector zone 95, because moderator may be free to move between reflector zone 95 and control cavities 140 via gaps 175 and 180. As moderator confined in control cavity 140 is heated by neutrons, gamma radiation, and/or thermal conduction from fuel tubes 135, some or all of the moderator in control cavity 140 may be heated into a gaseous state in a gaseous zone 185. Some or all of the moderator in control cavity 140 may also be in a liquid state in a liquid zone 190. Gaseous zone 185 and liquid zone 190 may be separated by a boundary 195. The size of gaseous zone 185 and liquid zone 190 may vary between control cavities 140, and between different intermediate members 170 within a single control cavity 140. Thus, the location of boundary 195 may vary between control cavities 140 and between different intermediate members 170 within a single control cavity 140. For example, a given control cavity 140 may have both a gaseous zone 185 and a liquid zone 190, substantially only a gaseous zone 185, or substantially only a liquid zone 190.

Heat imparted via neutrons, gamma radiation, and/or conduction from fuel tubes 135 may cause the liquid moderator of liquid zone 190 to be maintained at a temperature at or just below the boiling point of the moderator. For example, the moderator of liquid zone 190 may be maintained in a simmering state. As the moderator in liquid zone 190 simmers, some moderator may evaporate and rise into gaseous zone 185. Also, moderator in gaseous zone 185 that is near components of reactor coolant subsystem 25 (e.g., as described below) may condense and drip back to liquid zone 190 along inner surfaces of control cavity 140. The size of gaseous zone 185 may therefore remain substantially constant, and boundary 195 may remain relatively stationary, when the amount of heat imparted by fuel tubes 135 and the amount of heat removed by reactor coolant subsystem 25 are substantially equal. As described further below, the size of gaseous zone 185 and a position of boundary 195 may vary slightly over short periods of time (e.g., over a period of days) based on xenon and samarium absorption of neutrons, and may vary significantly over long periods of time (e.g., over a period of years), based on, for example, an age (e.g., burnout) of the fuel. The size of gaseous zone 185 and the position of boundary 195 may vary slightly during and shortly after periods of change in the rate of cooling by reactor coolant subsystem 25.

As depicted in greater detail in FIG. 8, cone assembly 150 may include an inner cone assembly 200, an outer cone assembly 205, and a passageway 210. Cone assemblies 150 may provide a structural interface between fuel tubes 135, which may pass through control cavities 140, and may help to more evenly distribute heat from fuel tubes 135 within control cavities 140. Inner cone assembly 200 may encircle a portion of fuel tube 135, outer cone assembly 205 may encircle inner cone assembly 200, and passageway 210 may be disposed between inner cone assembly 200 and outer cone assembly 205.

Inner cone assembly 200 may include a cone 215 that may encircle a portion of fuel tube 135. Cone 215 may be formed from any suitable material for confining liquid moderator or steam moderator within control cavity 140 such as, for example, zirconium alloy. Cone 215 may be formed from separate elements or may be integrally formed as a single element. Cone 215 may also have any suitable height for confining moderator. For example, cone 215 may have a height that is about twice the height of control cavity 140. Cone 215 may pass through an aperture that is formed in upper member 155 of structural assembly 145. Cone 215 may be disposed at each control cavity 140. Because cone 215 may have a height that is greater than a height of control cavity 140, cone 215 may overlap with other cones 215 encircling the same fuel tube 135. Cone 215 may form a passageway 220 with fuel tube 135, and overlapping cones 215 may form a passageway 225 between each other. Passageway 220 may be a continuation of passageway 225. Passageways 220 and 225 may encircle fuel tubes 135, and may be any suitable shape such as, for example, conical-shaped passageways. Cone 215 may be sealed to fuel tube 135 at the top of cone 215 so that passageway 220 may be a dead end, with passageway 220 being sealed at the top. Because fuel tube 135 may usually be hotter than the boiling point of the moderator, any moderator in passageway 220 may boil and the resulting steam moderator will force the liquid moderator down out of the bottom of passageways 220 and 225 via a gap 250 and into the lower portion of control cavity 140. Because steam may conduct heat less effectively than liquid moderator, the resulting double steam gap formed by passageways 220 and 225 and the overlapping cones 215 may reduce the transfer of heat from fuel tubes 135 to the moderator in control cavity 140. Thus, cones 215 may effectively encircle fuel tubes 135 with a thin layer of steam moderator in passageways 220 and 225, the steam moderator being in fluid communication with reflector zone 95.

Outer cone assembly 205 may include an interior cone 235 and an exterior cone 240. Interior cone 235 and exterior cone 240 may be of a material similar to cone 215, and may encircle fuel tube 135 and cone 215. Interior cone 235 may be attached to a bottom surface 245 of upper member 155 and may be intermittently attached at the bottom of interior cone 235 to the bottom of cone 215 for structural integrity, while still leaving a gap 230 that may allow vertical flow of liquid moderator from the lower portion of a cavity 140 via passageway 210 to cavities 140 above and below. Interior cone 235 may have a height that is slightly less than a height of control cavity 140, and may form gap 250 with an upper surface 255 of an adjacent control cavity 140 that is disposed below. Exterior cone 240 may also be attached to bottom surface 245 of upper member 155, and may have a height that is less than a height of interior cone 235. A cavity 260 may be formed between interior cone 235 and exterior cone 240. Moderator may be free to move between liquid zone 190 of control cavity 140 and cavity 260. Moderator may also be free to move between liquid zone 190 and a portion 270 disposed between adjacent exterior cones 240 of adjacent fuel tubes 135. A liquid zone 275 including liquid moderator may be disposed in cavity 260. As fast neutrons and gamma radiation from fuel tubes 135 heat the moderator in control cavity 140, liquid moderator in liquid zone 275 may be heated into steam moderator and may form a gaseous zone 280. Also, as higher speed (e.g., fast) neutrons and gamma radiation from fuel tubes 135 heat the moderator in control cavity 140, liquid moderator in liquid zone 190 may be heated into steam moderator and may form a portion of gaseous zone 185 within portion 270 disposed between adjacent exterior cones 240. Depending on the amount of heat imparted by higher speed (e.g., fast) neutrons and gamma radiation from fuel tubes 135, cavity 260 and portion 270 may be substantially entirely filled by gaseous zone 280 and 185, respectively, or may be substantially entirely filled by liquid zones 275 and 190, respectively.

A boundary 290 may separate liquid zone 275 and gaseous zone 280, and boundary 195 may separate liquid zone 190 and gaseous zone 185. Liquid zone 275, gaseous zone 280, and boundary 290 may have characteristics similar to the characteristics of liquid zone 190, gaseous zone 185, and boundary 195, respectively, discussed above. For example, the size of gaseous zones 280 and 185 may remain substantially constant, and boundaries 290 and 195 may remain relatively stationary, when the amount of heat imparted by higher speed (e.g., fast) neutrons and gamma radiation from fuel tubes 135 and the amount of heat removed by reactor coolant subsystem 25 are substantially equal.

Passageway 210 may be formed between cone 215 and interior cone 235. A gap 300 may be formed between a bottom portion of cone 215 and a bottom portion of interior cone 235. Moderator may be free to move between passageway 210 and a lower portion of control cavity 140 via gap 300, which may be similar to gap 230. Thus, because control cavity 140 may be in fluid communication with reflector zone 95, moderator may be free to move between passageway 210 and reflector zone 95 via control cavity 140. Because passageway 210 may not be closed at the top, passageway 210 may be substantially filled with liquid moderator and moderator steam bubbles may rise rapidly through it.

FIGS. 8A, 8B, 8C, and 8D illustrate alternative views of cone assembly 150.

Figure 9:
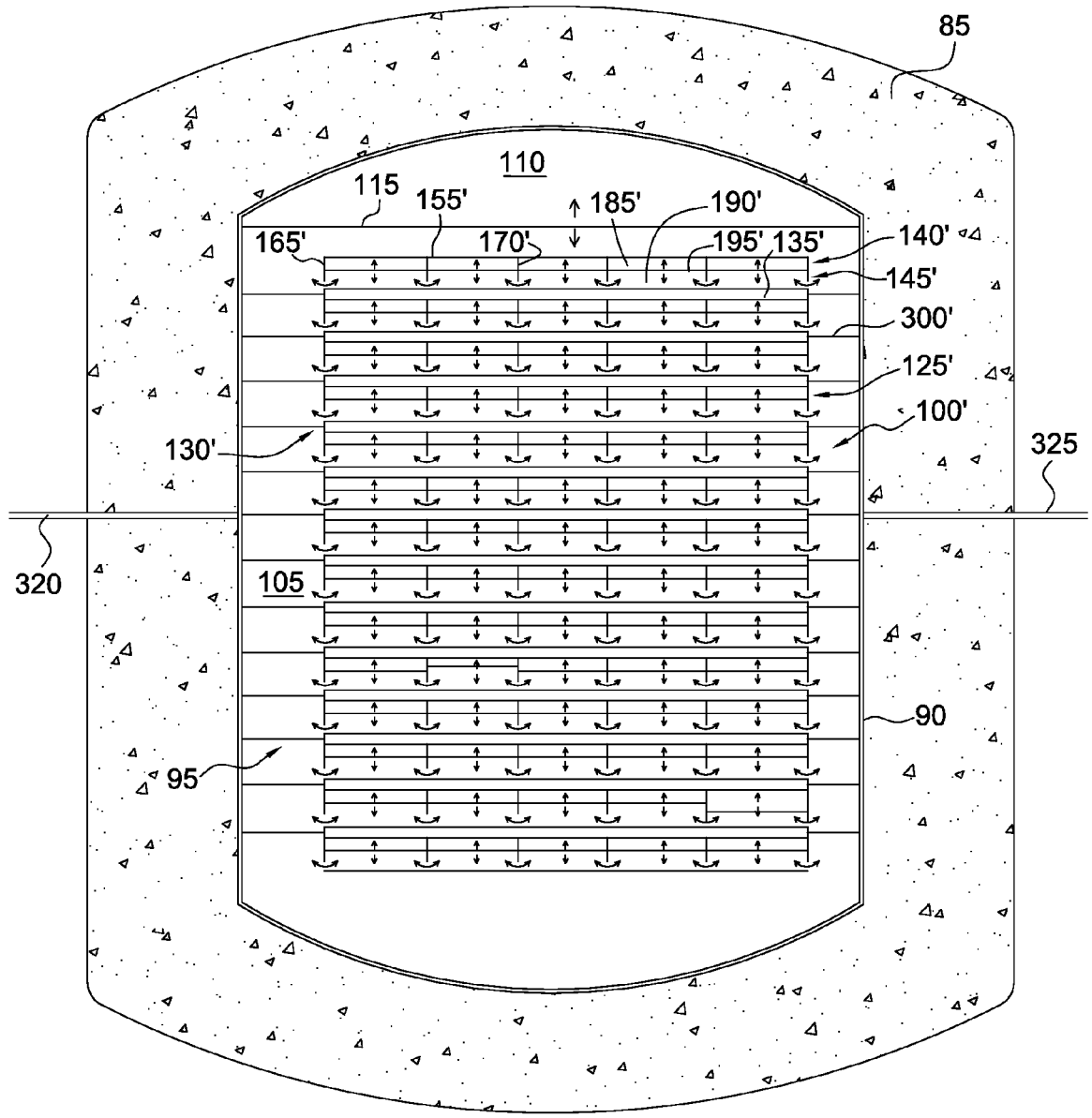
FIG. 9 is a sectional view of a second exemplary embodiment of the reactor.
Figure 10:
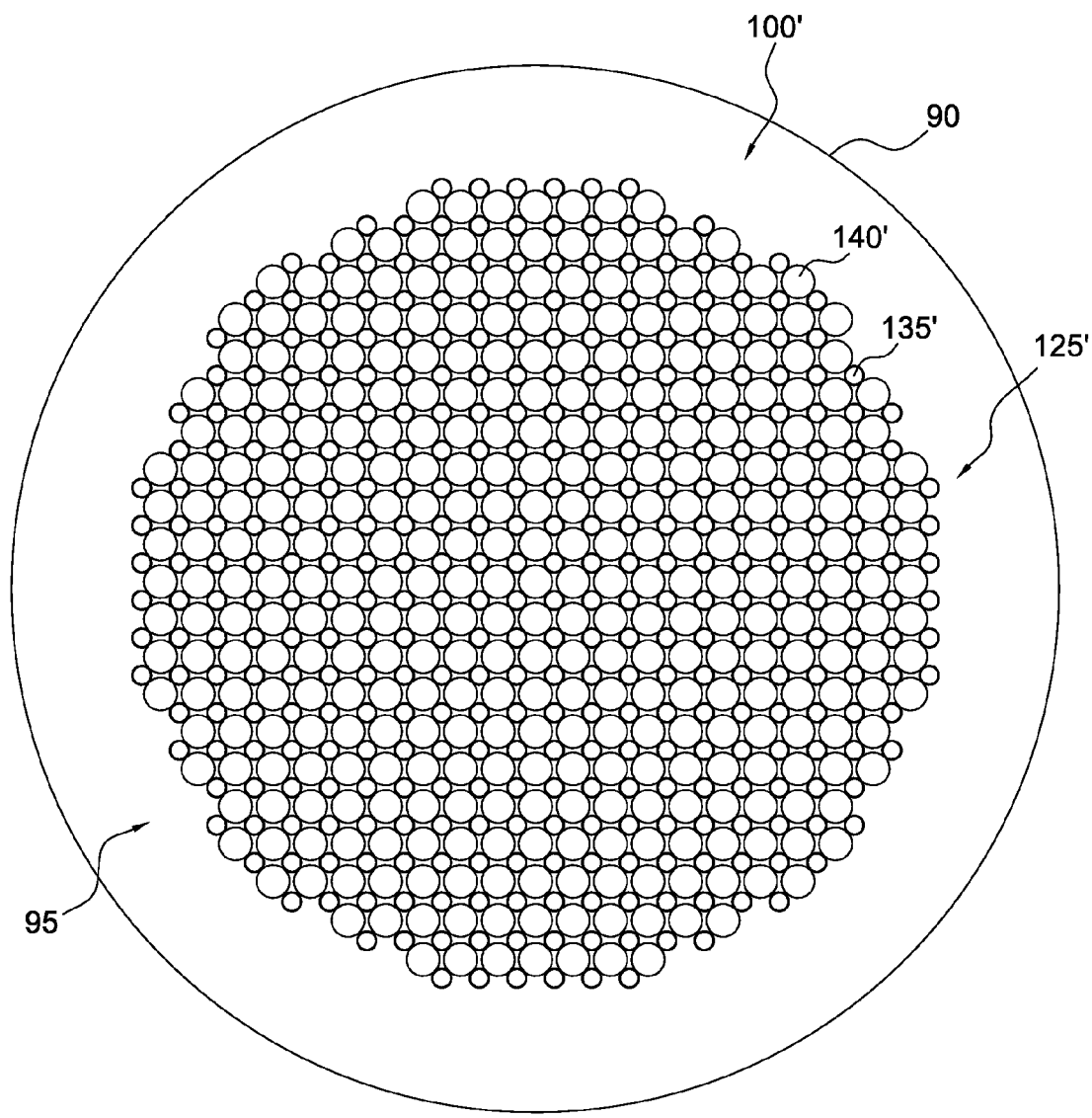
FIG. 10 is a side view of the reactor of FIG. 9.
Figure 11:
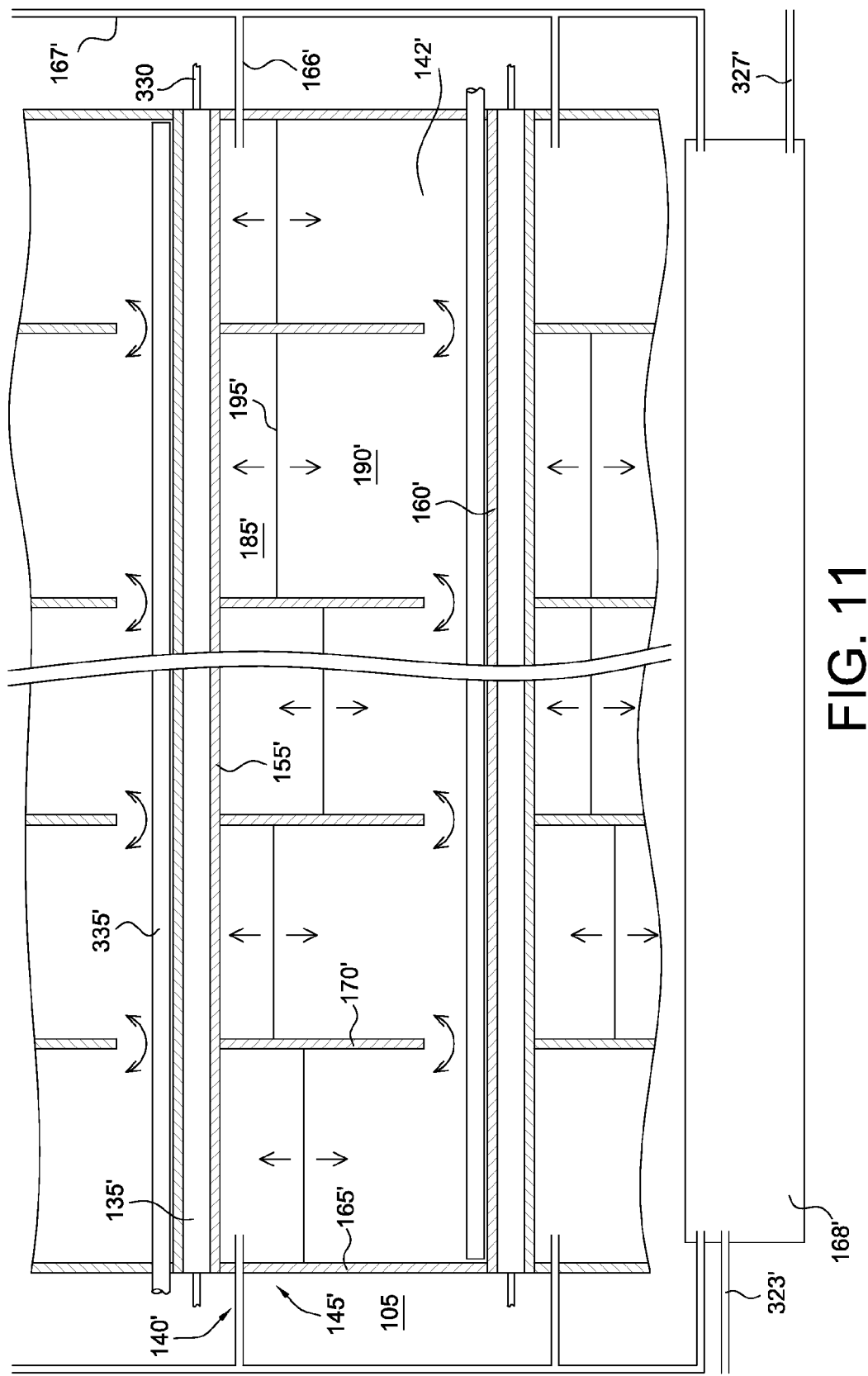
FIG. 11 is a detailed view of an exemplary control cavity array of the reactor of FIG. 9.

FIGS. 9, 10, and 11 illustrate a second exemplary embodiment of reactor 15. In this embodiment, reactor 15 may include a reactor core 100' disposed in reflector zone 95. Reactor core 100' may include a fuel assembly 125' and a control cavity array 130'. Control cavity array 130' may confine moderator adjacent to fuel assembly 125'. In this second embodiment, fuel tubes 135' may be disposed horizontally and arranged in a square array with truncated corners, as illustrated in FIG. 10. The moderator may be cold and may be cooled by pumping relatively cooler moderator into control cavities 140'. The moderator may be heavy water (D$_2$O), and the composition of the primary coolant may be any suitable coolant.

Fuel assembly 125' may include a plurality of fuel tubes 135'. Fuel tubes 135' may be similar to fuel tubes 135 of reactor core 100. Fuel tubes 135' may be, for example, substantially horizontally disposed.

Control cavity array 130' may include a plurality of control cavities 140'. As depicted in the end view of reactor core 100' illustrated in FIG. 10, control cavities 140' may be disposed between fuel tubes 135' of fuel assembly 125'. Each control cavity 140' may be included in a structural assembly 145' that may be a tube having a length greater than the length of fuel assembly 125', and may contain control cavities 140' that may serve as housings to confine moderator.

As depicted in FIGS. 9 and 11, structural assembly 145' may include one or more upper members 155', one or more end members 165', and one or more intermediate members 170', which may be formed from similar materials and attached by similar techniques as the members of structural assembly 145 of control cavity 140. Upper member 155' may have, for example, a curved shape that encloses an upper portion of control cavity 140'. For example, upper member 155' may have a semi-circular shape that encloses an upper portion of control cavity 140'. Also, for example, upper member 155' may have a substantially fully circular shape with a lower portion 160', so that upper member 155' that continues into lower portion 160' may fully enclose control cavity 140'. End members 165' may be attached to end portions of upper member 155' and lower portions 160' to fully enclose control cavities 140'. Structural assembly 145' may extend beyond the extent of fuel rods (that may be disposed in fuel tubes 135') to include end compartments 142'. End members 165' may have a passageway 166' that is in fluid communication with vertical standpipe 167', which may allow liquid moderator to flow out at a location near the top of end compartments 142', and may allow moderator steam to flow freely in either direction between end compartments 142' and standpipe 167'. The lower end of standpipe 167' may lead into moderator reservoir 168', which may contain both liquid moderator and moderator steam. When upper member 155' is, for example, a semi-circular shape, upper member 155' and intermediate members 170' may form a cavity having a closed upper portion and an open bottom portion. Thus, upper member 155' and intermediate members 170' may substantially prevent moderator movement in and out of an upper portion of control cavity 140', while allowing moderator to be free to move in and out of a lower portion of control cavity 140'. When upper member 155' is, for example, a substantially full circle, intermediate members 170' may only cover an upper portion of an open circular cross-section formed by upper member 155' that includes lower portion 160'. Thus, intermediate members 170' and upper member 155' having lower portion 160' may substantially prevent moderator movement in and out of an upper portion of control cavity 140', while allowing moderator to move in and out of a lower portion of control cavity 140'.

One or more intermediate members 170' may be disposed between and attached to an interior surface of upper member 155'. Intermediate members 170' may be disposed at any interval along control cavity 140'. Intermediate members 170' may substantially prevent movement of moderator through control cavity 140' at an upper portion of control cavity 140'. Intermediate members 170' may have a height that is less than a height of control cavity 140'. Thus, intermediate members 170' may serve as baffles to block movement of moderator in an upper portion of control cavity 140' and allow movement of moderator in a lower portion of control cavity 140'. Moderator may be free to move through a lower portion of control cavity 140' by moving under intermediate members 170', and may move between reflector zone 95, end compartments 142', and control cavity 140' by moving under intermediate members 170'.

As depicted in FIGS. 9 and 11, control cavities 140' may include the same moderator as the moderator in end compartments 142', because moderator may move between reflector zone 95 and control cavities 140'. As moderator confined in control cavity 140' is heated by neutrons, gamma radiation, and thermal conduction from fuel tubes 135', some or all of the moderator in control cavity 140' may be heated into a gaseous state in a gaseous zone 185'. Some or all of the moderator in control cavity 140 may also be in a liquid state in a liquid zone 190'. Gaseous zone 185' and liquid zone 190' may be separated by a boundary 195'. The size of gaseous zone 185' and liquid zone 190' may vary between control cavities 140', and between different intermediate members 170' within a single structural assembly 145'. Thus, the location of boundary 195' may vary between control cavities 140' and between different intermediate members 170' within a single structural assembly 145'. For example, a given control cavity 140' may have both a gaseous zone 185' and a liquid zone 190', substantially only a gaseous zone 185', or substantially only a liquid zone 190'.

Liquid zone 190', gaseous zone 185', and boundary 195' may have characteristics similar to the characteristics of liquid zone 190, gaseous zone 185, and boundary 195, respectively, discussed above with reference to control cavity 140. For example, the size of gaseous zone 185' may remain substantially constant, and boundary 195' may remain relatively stationary, when the amount of heat imparted by fast neutrons, gamma radiation, and conduction from fuel tubes 135' and the amount of heat removed by reactor coolant subsystem 25 are substantially equal.

Figure 6:
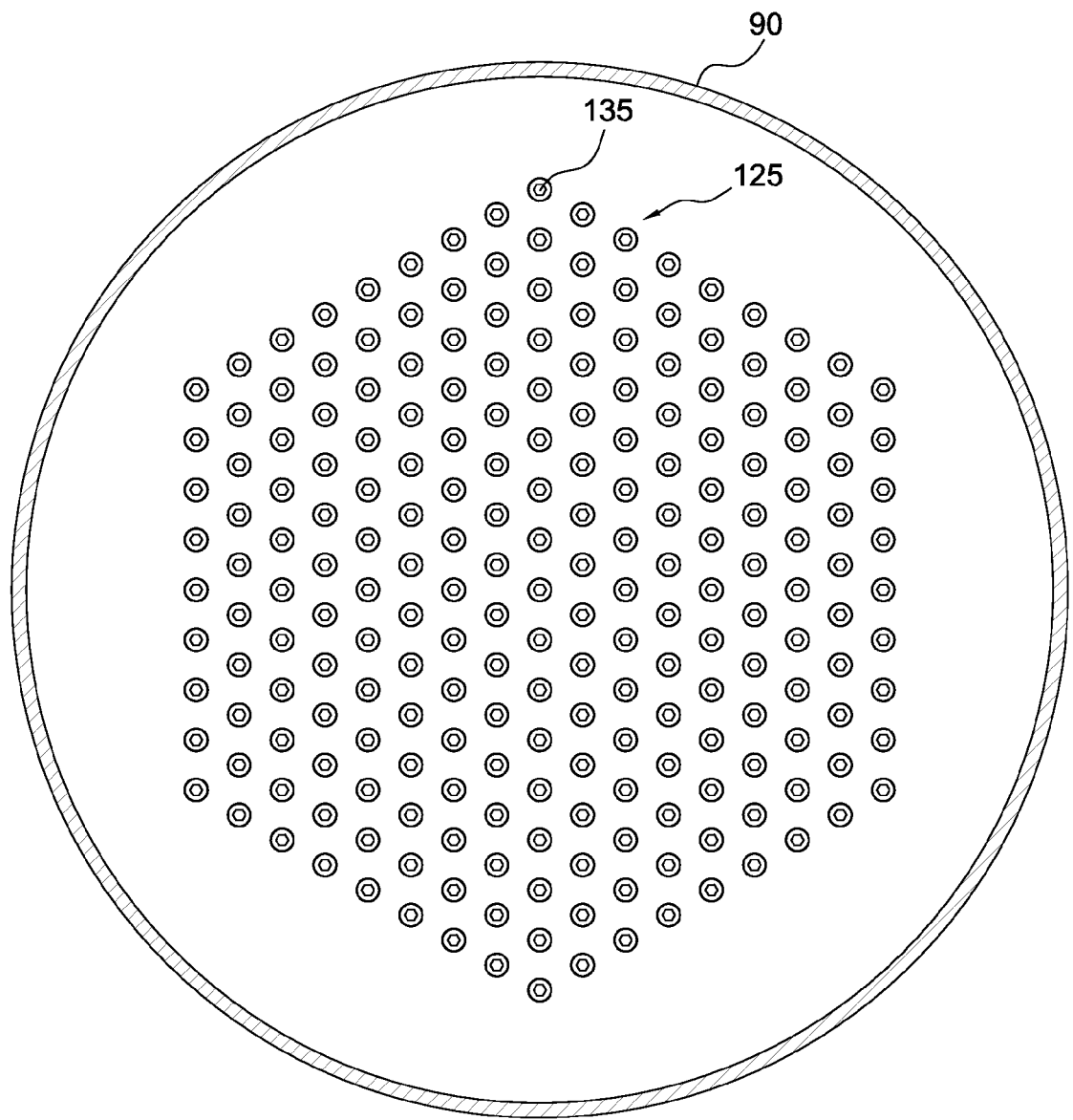
FIG. 6 is a schematic illustration of another exemplary fuel tube arrangement of the reactor.
Figure 12A:
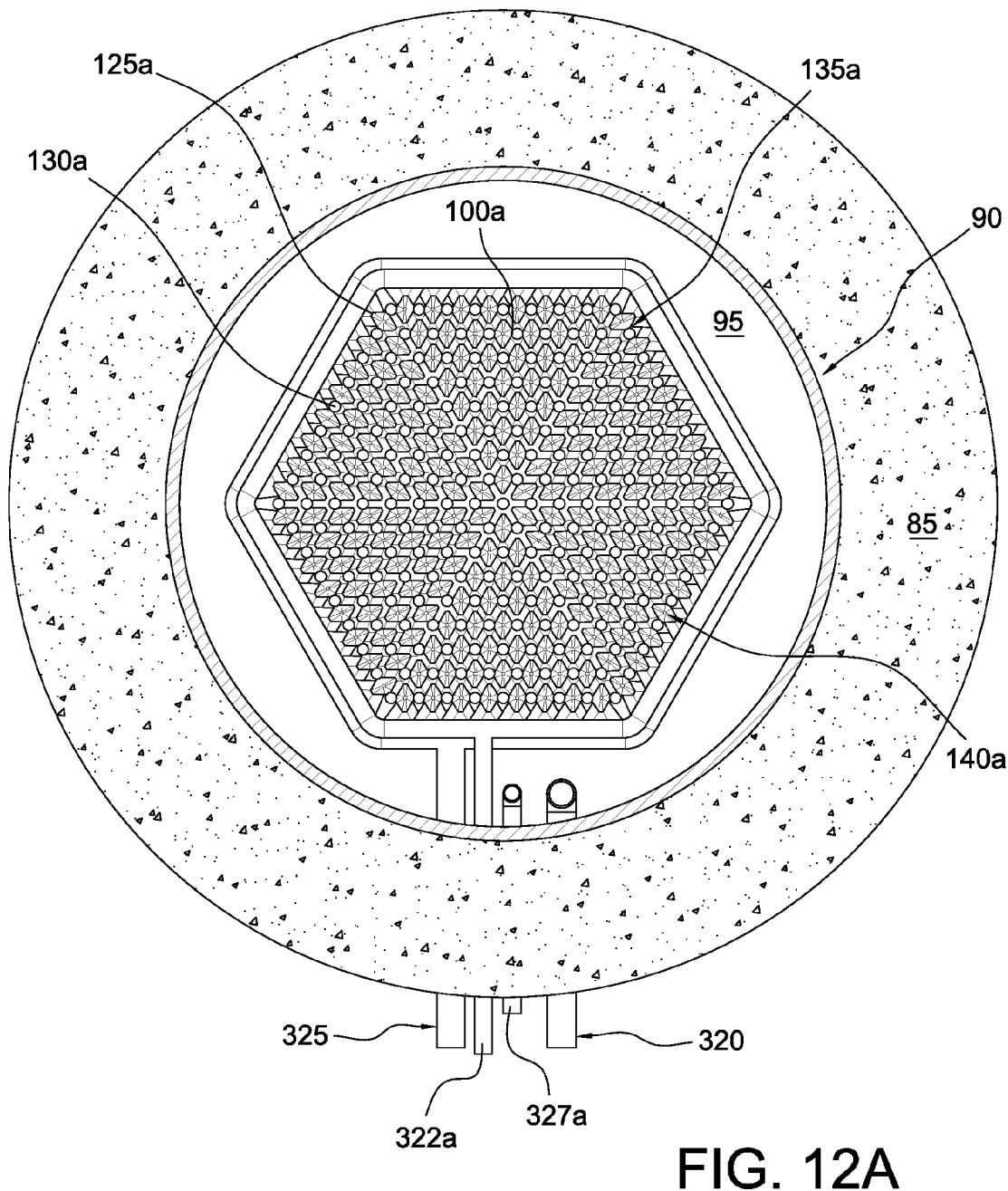
FIG. 12A is a plan view of a third exemplary embodiment of the reactor.
Figure 12B:
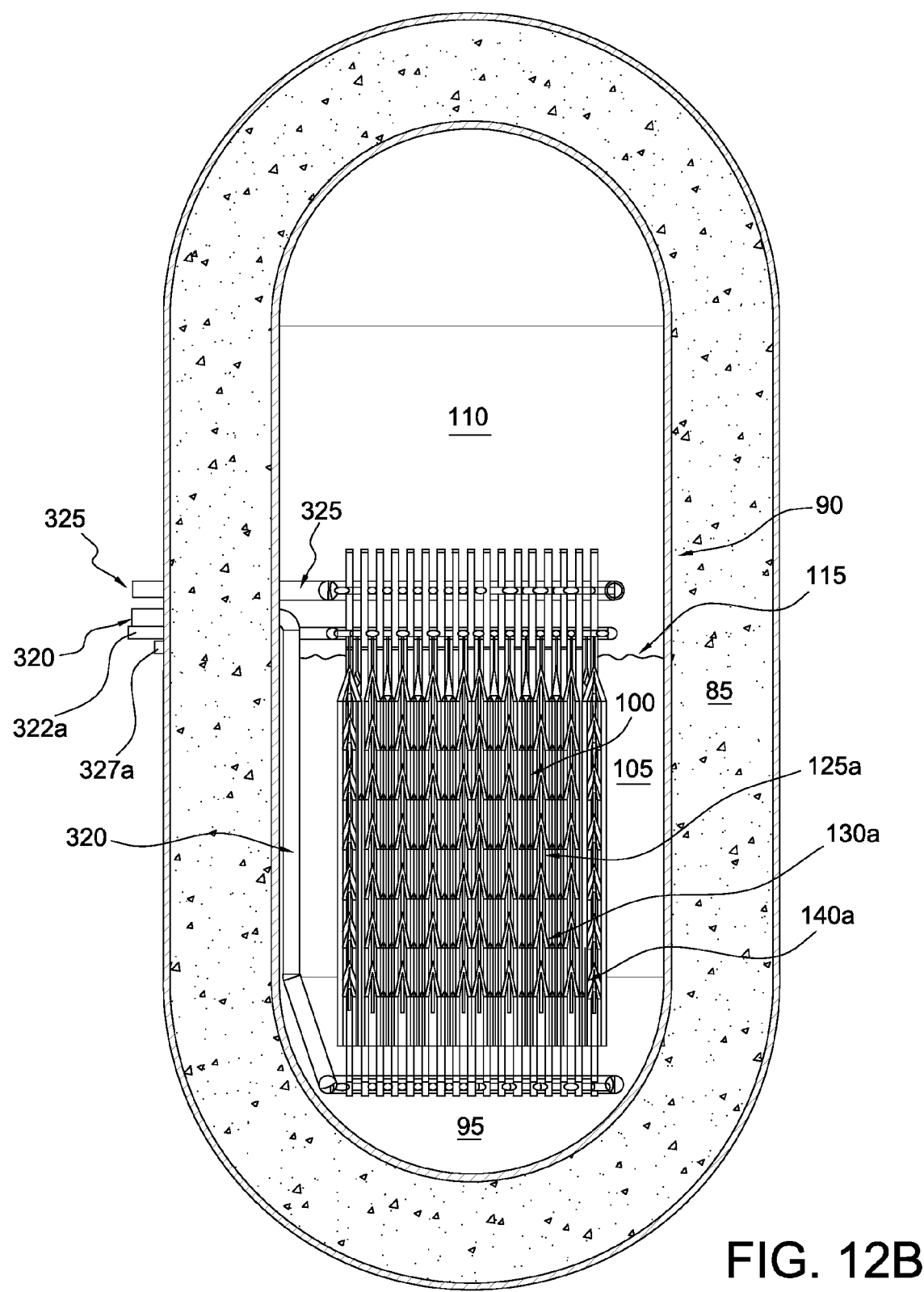
FIG. 12B is a sectional view of the third exemplary embodiment of the reactor.
Figure 12C:
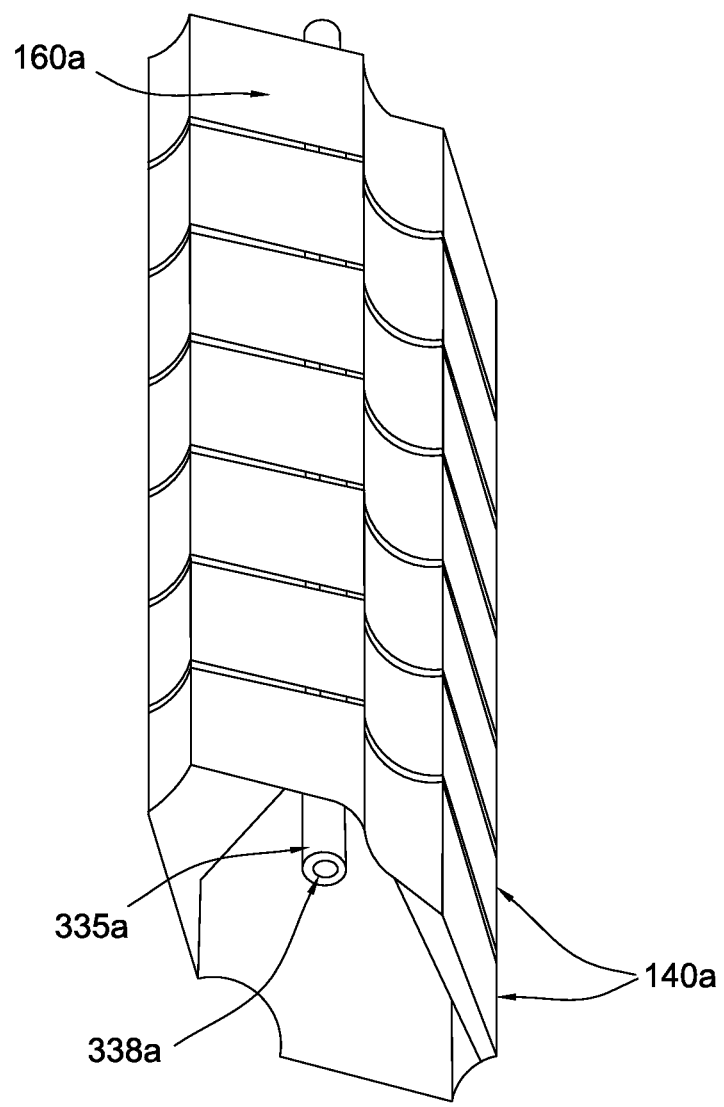
FIG. 12C is a perspective view of the third exemplary embodiment of the reactor.
Figure 12D:
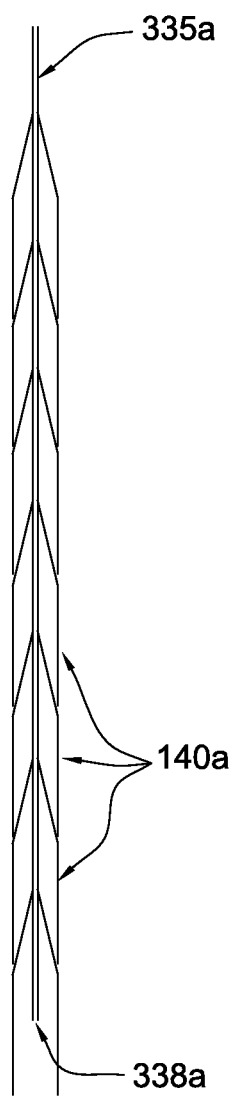
FIG. 12D is a schematic illustration of the third exemplary embodiment of the reactor.
Figure 12E:
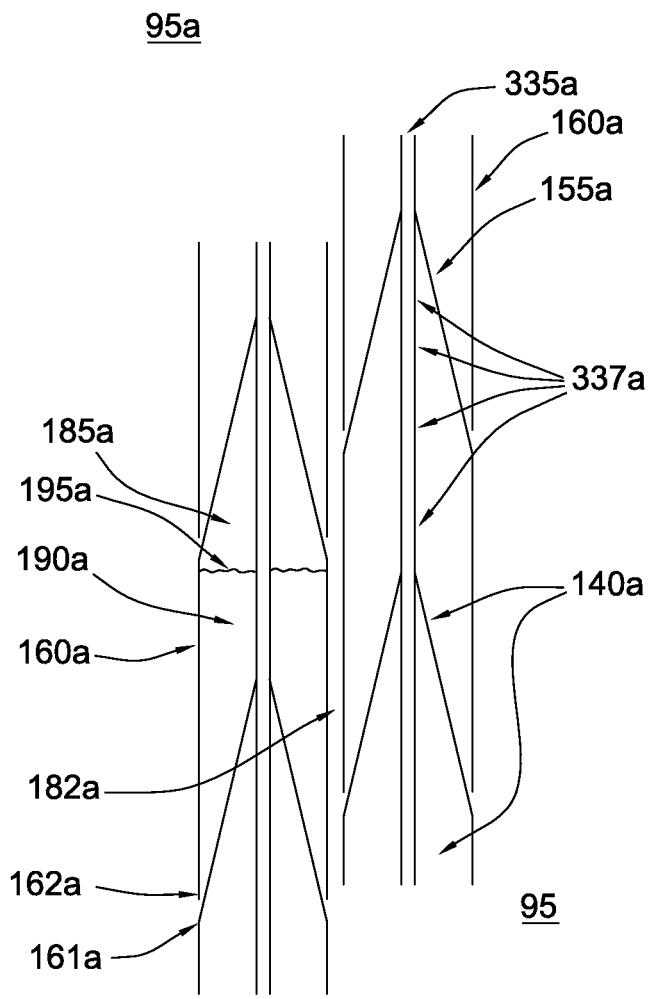
FIG. 12E is another schematic illustration of the third exemplary embodiment of the reactor.
Figure 12F:
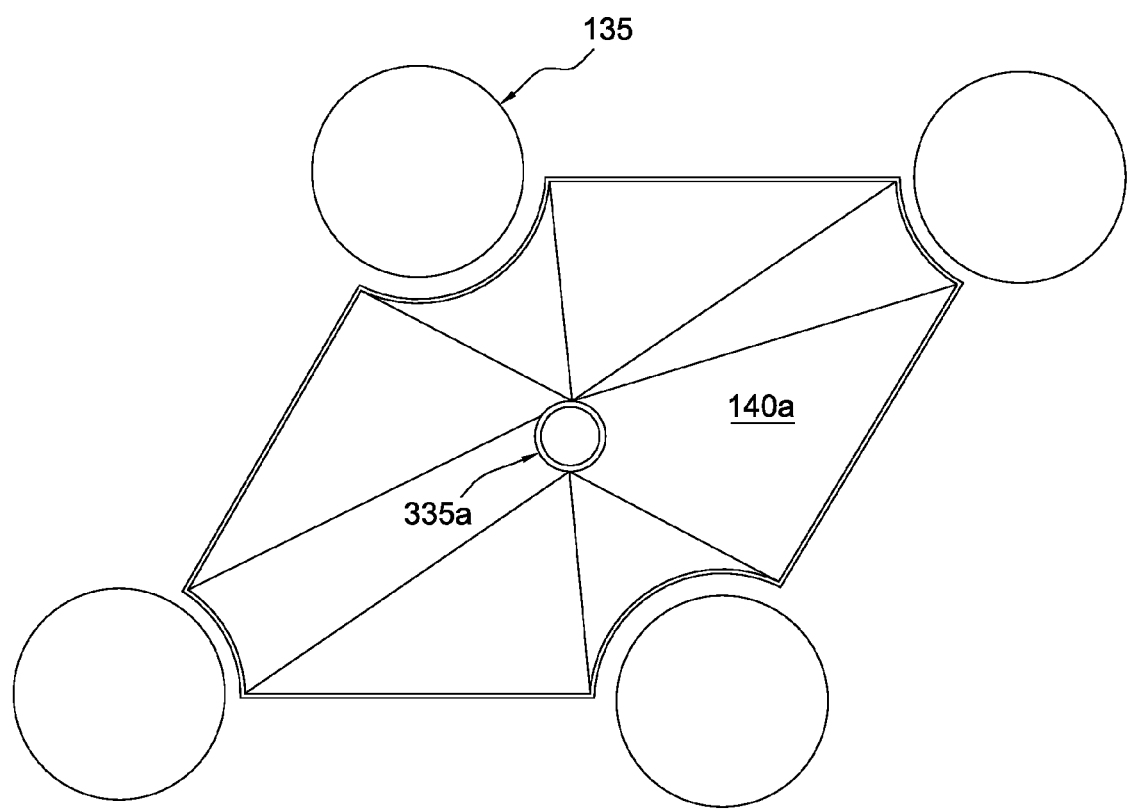
FIG. 12F is another schematic illustration of the third exemplary embodiment of the reactor.

FIGS. 12A through 12F illustrate a third alternative exemplary embodiment of reactor 15. This embodiment includes a hexagonal array of vertical fuel tubes (for example, as illustrated in FIGS. 12A and 6) and a hot moderator that may be cooled by pumping hot moderator out of a reflecting pool, cooling the hot moderator, and pumping the moderator back into the reactor core and control cavities via reactor coolant subsystem 25. In this embodiment (as illustrated in FIG. 12F), each assembly of control cavities may fit vertically into the space bounded by four vertical fuel tubes. As illustrated in FIG. 12B, this embodiment may include a reactor core 100*a*.

Reactor core 100*a* may include a fuel assembly 125*a* that is similar to fuel assembly 125, and a control cavity array 130*a*. Control cavity array 130*a* may contain a pocket of moderator and/or moderator steam adjacent to fuel assembly 125*a*. In this embodiment, as described more fully below, a moderator coolant tube 335*a* may have small holes 337*a* disposed in the sides and extending along a length of moderator coolant tube 335*a*, and control cavities 140*a* may be cooled by a fine spray of relatively cooler moderator sprayed from the moderator coolant tube 335*a*.

Control cavity array 130*a* may include a three-dimensional array of control cavities 140*a*. For example, the three-dimensional array of control cavities 140*a* may serve as a housing to compartmentalize and/or confine pockets of moderator adjacent to fuel tubes 135*a* of fuel assembly 125*a*. As depicted in FIGS. 12A through 12F, the plurality of control cavities 140*a* may be disposed in vertical stacks with the stacks disposed horizontally to each other as well as being stacked vertically. As depicted in FIG. 12E, control cavities 140*a* may be staggered vertically within control cavity array 130*a*. Control cavities 140a may be arranged in any suitable configuration for confining pockets of moderator and/or moderator steam adjacent to fuel tubes 135a.

As depicted in FIGS. 12C through 12F, each control cavity 140a may include moderator coolant tube 335a, a roughly conical upper member 155a and a side member 160a. As illustrated, side member 160a may be roughly trapezoidal (for example, in the illustrated hexagonal fuel tube array) with indented corners 161a for fuel tubes 135a or roughly square (not illustrated) for a square fuel tube array. Upper member 155a may be joined without gaps to side member 160a and moderator coolant tube 335a to confine a pocket of moderator and/or moderator steam adjacent to fuel tubes 135a. Moderator may be free to move into or out of control cavity 140a via the open bottom of control cavity 140a and through a gap 162a between the bottom of a given side member 160a and the top of side member 160a of the cavity below.

Upper member 155a, side member 160a, and moderator coolant tube 335a may be formed from any suitable structural materials for directing moderator movement and/or confining moderator such as, for example, zirconium alloy. Upper member 155a, side member 160a, and moderator coolant tube 335a may be attached to each other by any suitable technique such as, for example, welding. Upper member 155a, side member 160a, and moderator coolant tube 335a may also be integrally formed with each other. Upper member 155a, side member 160a, and moderator coolant tube 335a may be attached to form, for example, a cavity having a closed upper portion and an open bottom portion. Thus, upper member 155a, side member 160a, and moderator coolant tube 335a may substantially prevent moderator movement in and out of an upper portion of control cavity 140a, while allowing moderator to be free to move in and out of a lower portion of control cavity 140a. The upper portion of control cavity 140a may include upper member 155a, upper portions of side member 160a, and portions of moderator coolant tube 335a. The lower portion of control cavity 140a may include lower portions of side member 160a, and portions of moderator coolant tube 335a.

Gap 162a may allow movement of moderator between reflector zone 95 and control cavity 140a, either directly or via a gap 182a formed between adjacent, horizontally disposed control cavities 140a or between control cavities 140a and fuel tubes 135a.

As depicted in FIGS. 12B and 12E, control cavities 140a may include the same moderator as reflector zone 95, because moderator may be free to move between reflector zone 95 and control cavities 140a via gaps 162a and 182a. As moderator confined in control cavity 140a is heated by neutrons and gamma radiation emitted from fuel tubes 135a, and heat is conducted from fuel tubes 135a, some or all of the moderator in control cavity 140a may be heated into a gaseous state in a gaseous zone 185a. Some or all of the moderator in control cavity 140a may also be in a liquid state in a liquid zone 190a. Gaseous zone 185a and liquid zone 190a may be separated by a boundary 195a. The size of gaseous zone 185a and liquid zone 190a may vary between different control cavities 140a and within each control cavity 140a at different times during an operation of reactor 15.

Thus, the location of boundary 195a may vary between control cavities 140a. For example, a given control cavity 140a may have both a gaseous zone 185a and a liquid zone 190a, substantially only a gaseous zone 185a, or substantially only a liquid zone 190a.

Heat imparted via neutrons, gamma radiation, and/or conduction from fuel tubes 135a may cause the liquid moderator of liquid zone 190a to be maintained at a temperature very near the boiling point of the moderator. For example, the moderator of liquid zone 190a may be maintained in a simmering state. As the moderator in liquid zone 190a simmers, some moderator may evaporate and rise into gaseous zone 185a. Moderator in liquid zone 190a may be cooled by mixing with relatively cooler moderator passing into control cavity 140a through small holes 337a in moderator coolant tube 335a. Also, moderator in gaseous zone 185a may condense around droplets of a fine, relatively cooler moderator spray passing through small holes 337a in moderator coolant tube 335a, or may condense and drip back to liquid zone 190a along inner surfaces of control cavity 140a and/or an outer surface of moderator coolant tube 335a. The size of gaseous zone 185a may therefore remain substantially constant, and boundary 195a may remain relatively stationary, when the amount of heat imparted by neutrons and gamma radiation from fuel tubes 135a and the amount of heat removed by reactor coolant subsystem 25 are substantially equal. As described further below, the size of gaseous zone 185a and a position of boundary 195a may vary slightly over short periods of time (e.g., over a period of days) based on the xenon and samarium load of the fuel, and may vary significantly over long periods of time (e.g., over a period of years), based on, for example, the age (or burnout) of the fuel. The size of gaseous zone 185a and the position of boundary 195a may vary slightly during and shortly after periods of change in the rate of cooling by reactor coolant subsystem 25.

As illustrated in FIG. 12E, control cavities 140a may be cooled by movement of cooler moderator through moderator coolant tube 335a and into the control cavities 140a through one or more holes 337a located in the sides of moderator coolant tube 335a. Holes 337a may be any suitable size for moderator movement such as, for example, holes that are small in size. A substantially equal volume of warmer moderator may then move out of the control cavity 140a into the reflector zone 95 via gap 162a at the lower portion of control cavity 140a.

As depicted in FIGS. 12C and 12D, the lower part of reflector zone 95 may be cooled by movement of cooler moderator from moderator coolant tube 335a through one or more small holes 338a located in a cap on a lower end of moderator coolant tube 335a.

Figure 12G:
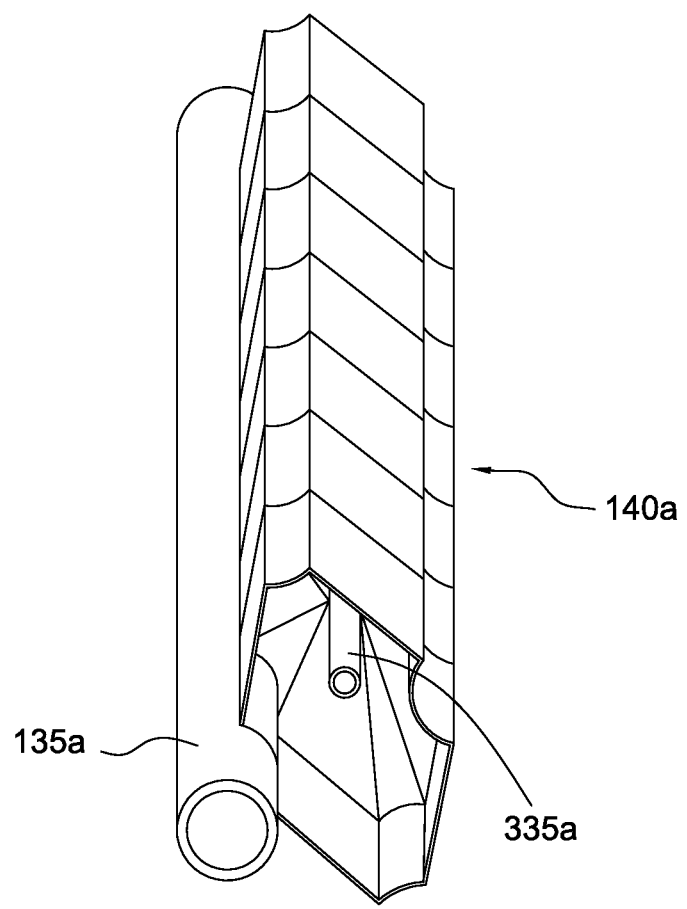
FIG. 12G is another perspective view of the third exemplary embodiment of the reactor.

FIG. 12G provides a perspective view of the arrangement of control cavities 140a of reactor core 100a. It is contemplated that the various disclosed elements of reactors 100, 100', 100a and/or 100b may be used in combination with each other.

Figure 12H:
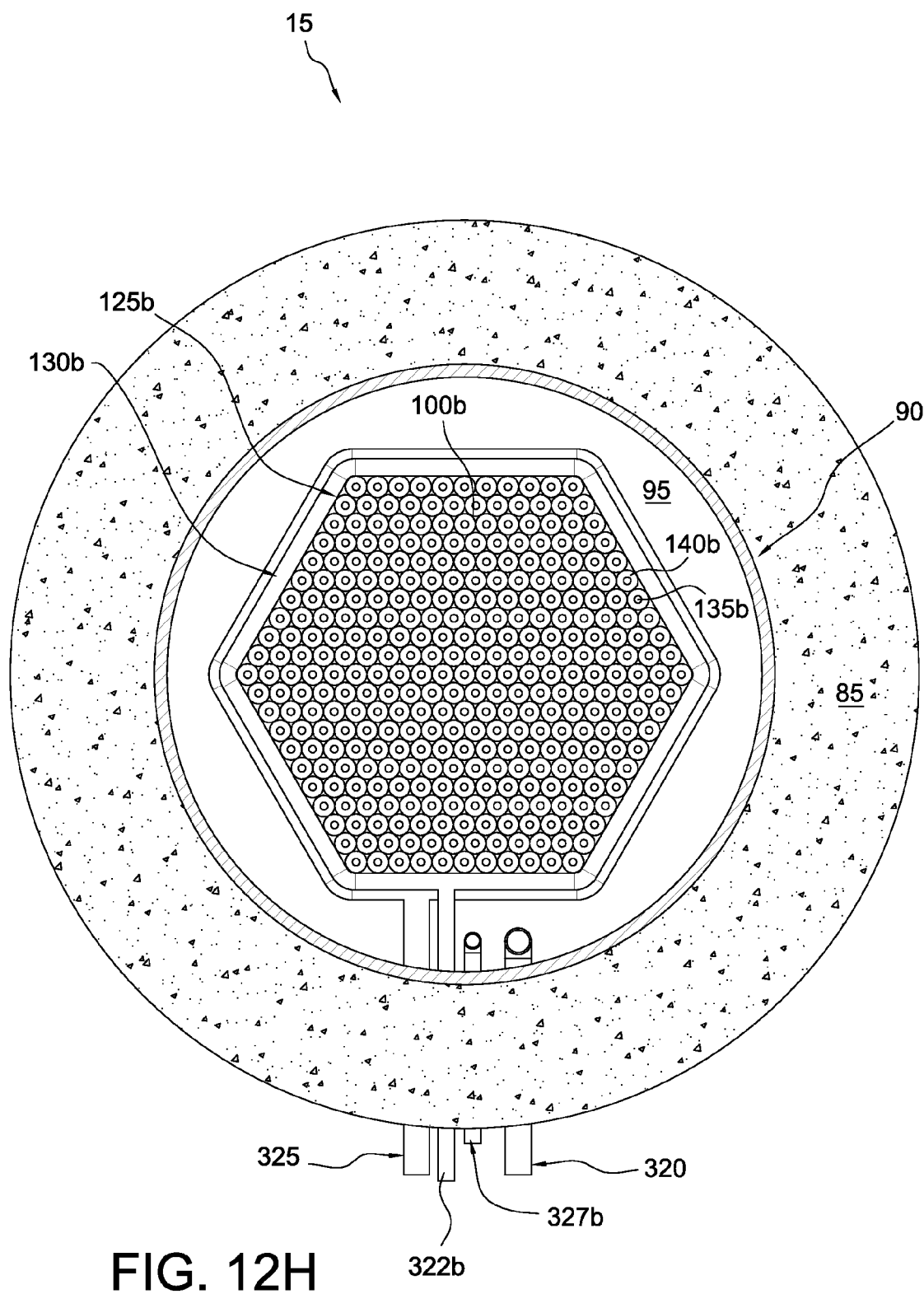
FIG. 12H is a plan view of a fourth exemplary embodiment of the reactor.

FIGS. 12H through 12M depict a fourth embodiment with an array of vertical fuel tubes and hot moderator cooled by pumping hot moderator out of reflecting pool 105 and control cavity array 130b, cooling it, and pumping the cooler moderator back into control cavity array 130b and reflecting pool 105. In this embodiment, each assembly of control cavities may be an annular stack of control cavities surrounding a single vertical fuel tube. As illustrated in FIG. 12H, this embodiment may include a reactor core 100b.

Reactor core 100b may include a fuel assembly 125b, which is similar to fuel assembly 125, and a control cavity array 130b. Control cavities 140b of control cavity array 130b may contain a pocket of moderator and/or moderator steam adjacent to fuel assembly 125b.

Fuel assembly 125b may be any type of nuclear fuel suitable for use in a nuclear reaction. For example, as illustrated in FIG. 12J, fuel assembly 125b may include bundles of fuel rods 127b that are disposed in a plurality of fuel tubes 135b. For example, fuel assembly 125b may include an arrangement of dozens to hundreds of fuel tubes 135b. For example, fuel assembly 125b may include between about 19 and about 500 fuel tubes 135b that are about three inches to about 18 inches in diameter. Each fuel tube 135b may include a single fuel bundle of relatively long fuel rods 127b or any suitable number of fuel bundles such as, for example, 12 fuel bundles of relatively short fuel rods 127b. Each fuel bundle may include any suitable number of fuel rods 127b between about 19 and about 1231 fuel rods such as, for example, 37 fuel rods. Fuel assembly 125b may include any suitable fuel for a nuclear reaction such as, for example, natural uranium, enriched uranium, plutonium, or thorium, individually or in various mixtures. Fuel rods 127b may be cast metallic fuel, or rods of fuel or fuel oxide pellets in a cladding tube (e.g., a zirconium alloy tube). For example, fuel assembly 125b may include a mixed uranium/plutonium fuel or a mixed fuel of used light water reactor fuel and thorium. Fuel tubes 135b may also contain fuel in forms other than rods such as, for example, spheres or pebbles. Fuel tubes 135b may also contain a molten salt in which the metallic ion of the salt is an ion of the fuel, and the molten salt functions both as the fuel and the coolant.

Each fuel tube 135b may contain primary coolant in addition to the fuel. The primary coolant may include any material in a suitable fluid state such as, for example, heavy water, light water, suitable liquid metal (e.g., lead or sodium), suitable molten salts, suitable organic fluids, and/or a suitable gas (e.g., helium).

Fuel assembly 125b may include fuel tubes 135b that are vertically disposed (e.g., as illustrated in FIG. 2). Fuel assembly 125b may include fuel tubes 135b arranged in any suitable configuration such as, for example, a right angle array as illustrated in FIGS. 4 and 5. Fuel assembly 125b may also include, for example, fuel tubes 135b that are arranged in a hexagonal array as illustrated in FIG. 6. Fuel tubes 135b may be, for example, disposed substantially vertically.

Referring back to FIGS. 12H through 12M, control cavity array 130b may include a three-dimensional array of control cavities 140b. For example, the three-dimensional array of control cavities 140b may serve as a housing to compartmentalize and/or confine pockets of moderator adjacent to fuel tubes 135b of fuel assembly 125b. As depicted in FIGS. 12H through 12M, the plurality of control cavities 140b may be disposed in vertical stacks with the stacks disposed horizontally to each other as well as being stacked vertically. Control cavities 140b may be staggered vertically within control cavity array 130b. Control cavities 140b may be arranged in any suitable configuration for confining pockets of moderator and/or moderator steam adjacent to fuel tubes 135b.

Figure 12I:
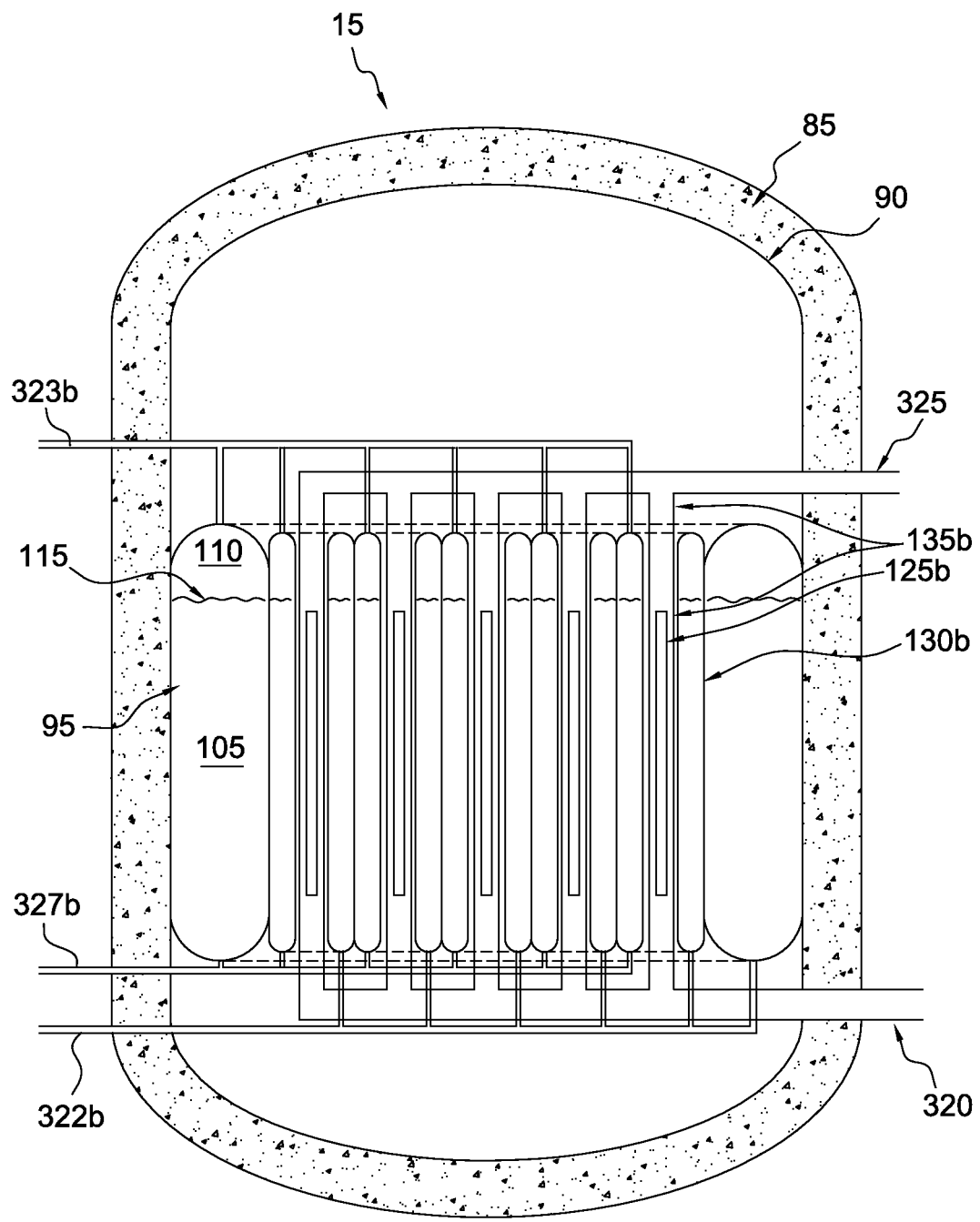
FIG. 12I is a sectional schematic view of the fourth exemplary embodiment of the reactor.
Figure 12K:
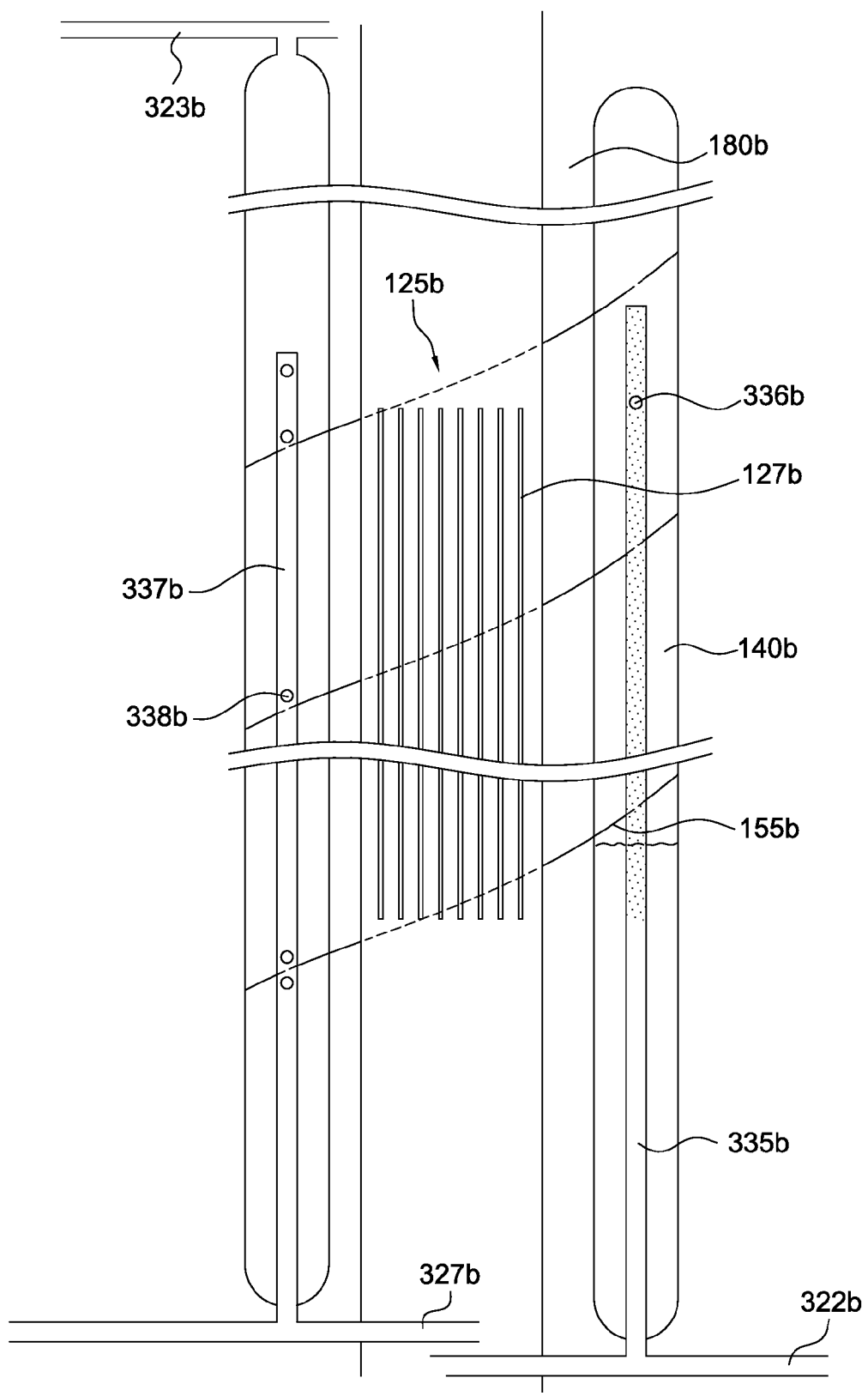
FIG. 12K is a sectional schematic view of the fourth exemplary embodiment of the reactor.
Figure 12L:
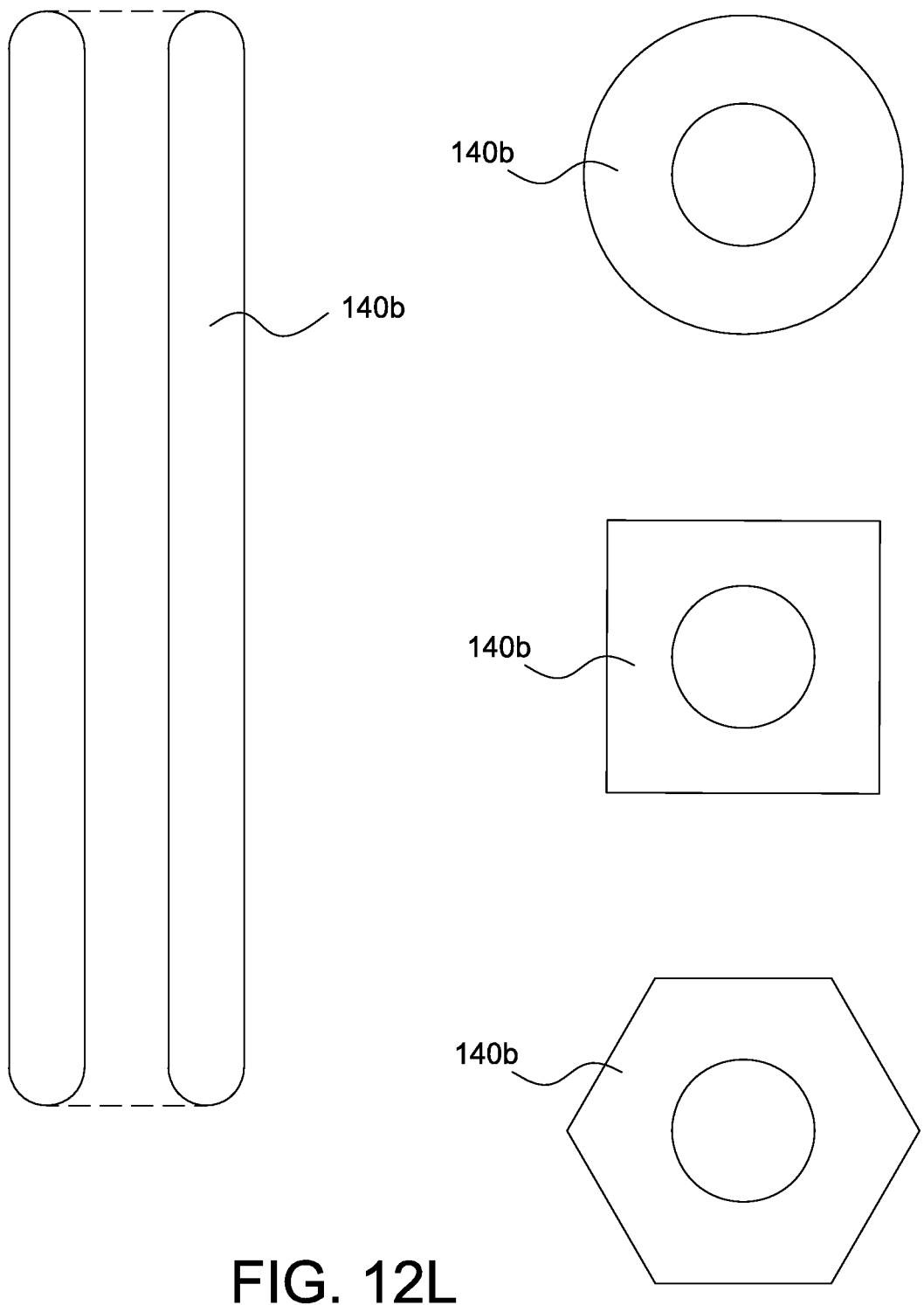
FIG. 12L includes both a schematic plan view and sectional schematic views of the fourth exemplary embodiment of the reactor.
Figure 12M:
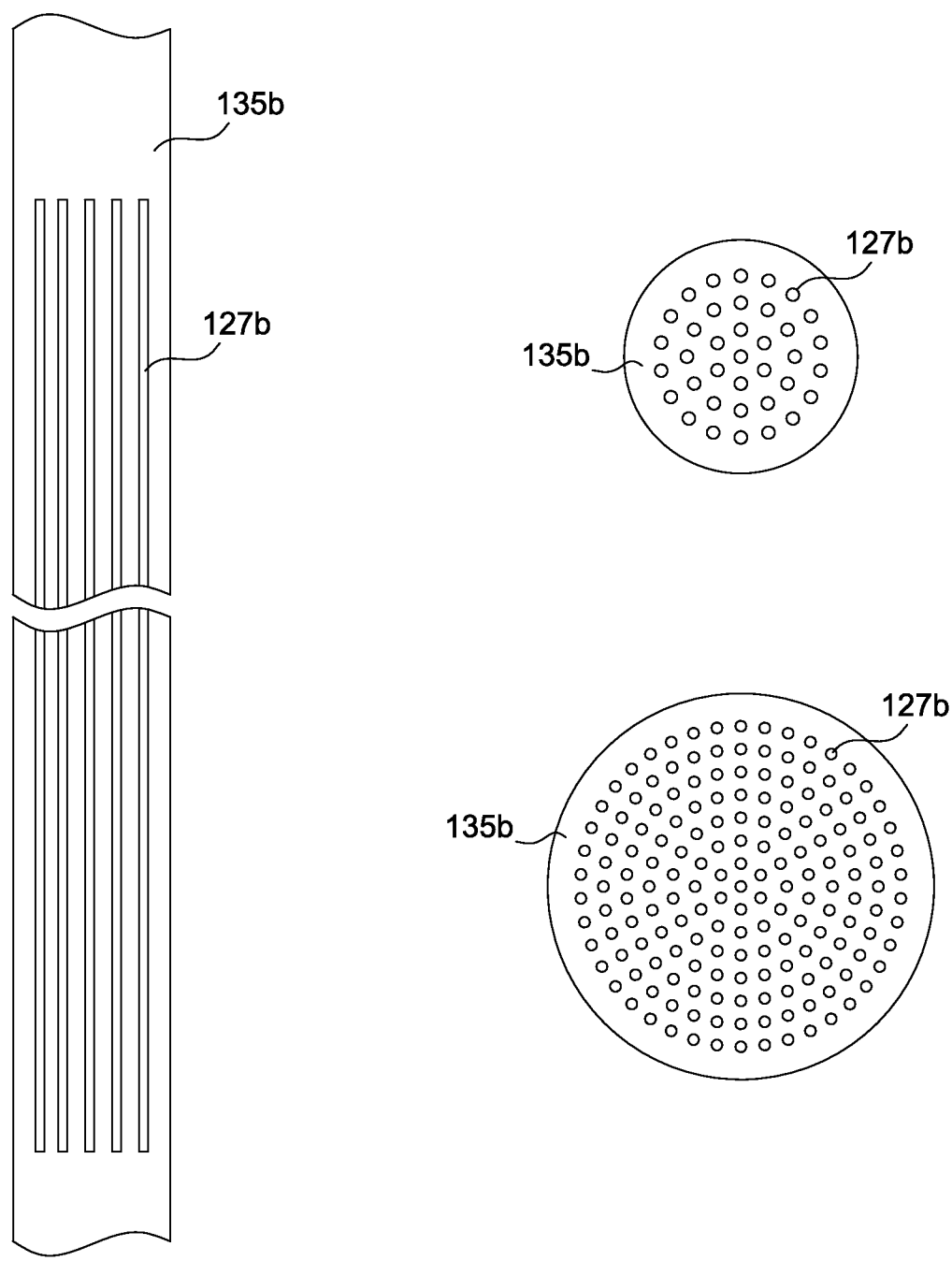
FIG. 12M includes both a schematic plan view and sectional schematic views of the fourth exemplary embodiment of the reactor.

As depicted in FIGS. 12J through 12M, each control cavity 140b may include a moderator coolant inflow tube 335b, a moderator outflow tube 337b, a slanted upper member 155b, and side members 160b and 162b. As depicted in FIG. 12L, side member 160b may be, for example, roughly circular or roughly hexagonal for a hexagonal fuel tube array, or roughly square for a square fuel tube array. Upper member 155b may be joined without gaps to side members 160b and 162b, moderator coolant inflow tube 335b, and/or moderator outflow tube 337b to confine a pocket of moderator and/or moderator steam adjacent to fuel tubes 135b. Moderator may be free to move between control cavity 140b and moderator coolant outflow tube 337b via a hole 338b located at the lower portion of each control cavity 140b.

Upper member 155b, side members 160b and 162b, and tubes 335b and 337b may be formed from any suitable structural materials for directing moderator movement or confining moderator such as, for example, zirconium alloy. Upper member 155b, side members 160b and 162b, and tubes 335b and 337b may be attached to each other by any suitable technique such as, for example, welding. Upper member 155b, side members 160b and 162b, and tubes 335b and 337b may also be integrally formed with each other. Upper member 155b, side members 160b and 162b, and tubes 335b and 337b may be attached to form, for example, a cavity having a closed upper portion and an open bottom portion. Thus, upper member 155b, side members 160b and 162b, and tubes 335b and 337b may substantially prevent moderator movement in and out of an upper portion of control cavity 140b, while allowing moderator to move in and out of a lower portion of control cavity 140b. The upper portion of control cavity 140b may include upper member 155b, upper portions of side members 160b and 162b, and portions of tubes 335b and 337b. The lower portion of control cavity 140b may include lower portions of side members 160b and 162b, and portions of tubes 335b and 337b. Hole 338b and moderator outflow tube 337b may allow movement of moderator between reflector zone 95 and control cavities 140b. Moderator coolant inflow tube 335b may be sealed at its top end (for example, in an uppermost control cavity 140b associated with a given fuel tube 135b, as illustrated in FIG. 12K). A gap 180b may be disposed between control cavities 140b and fuel tubes 135b, and may be filled with an inert gas or other suitable material, and may be closed at a top and/or a bottom portion to contain such material or to reduce convection circulation.

As depicted in FIGS. 12I and 12L, control cavities 140b may include substantially the same moderator as reflector zone 95, because moderator may move between reflector zone 95 and control cavities 140b via moderator outflow tube 337b and hole 338b. As moderator confined in control cavity 140b is heated by neutrons and gamma radiation emitted from fuel tubes 135b and by thermal conduction from fuel tube 135b, some or all of the moderator in control cavity 140b may be heated into a gaseous state in a gaseous zone 185b. Some or all of the moderator in control cavity 140b may also be in a liquid state in a liquid zone 190b. Gaseous zone 185b and liquid zone 190b may be separated by a boundary 195b. The size of gaseous zone 185b and liquid zone 190b may vary between different control cavities 140b. Thus, the location of boundary 195b may vary between control cavities 140b. For example, a given control cavity 140b may have both a gaseous zone 185b and a liquid zone 190b, substantially only a gaseous zone 185b, or substantially only a liquid zone 190b.

Heat imparted via neutrons, gamma radiation, and/or thermal conduction from fuel tubes 135b may cause the liquid moderator of liquid zone 190b to be maintained at a temperature very near the boiling point of the moderator. For example, the moderator of liquid zone 190b may be maintained in a simmering state. As the moderator in liquid zone 190b simmers, some moderator may evaporate and rise into gaseous zone 185b. Also, moderator in gaseous zone 185b that is near moderator coolant inflow tube 335b or that has cool moderator sprayed into it from moderator coolant inflow tube 335b via holes 336b may condense and drip back to liquid zone 190b of control cavity 140b. Holes 336b may be any suitable size for moderator movement such as, for example, holes that are small in size. The size of gaseous zone 185b may therefore remain substantially constant, and boundary 195b may remain relatively stationary, when the amount of heat imparted into each control cavity 140b by fuel tubes 135b (e.g., by heat transfer, neutron slowing, and/or gamma radiation) and the amount of heat removed by the inflow of cooler moderator are substantially equal. As described further below, the size of gaseous zone 185b and a position of boundary 195b may vary slightly over short periods of time (e.g., over a period of hours or days) based on the xenon and samarium load of the fuel, and may vary significantly over long periods of time (e.g., over a period of years), based on, for example, the age (or burnout) of the fuel. The size of gaseous zone 185b and the position of boundary 195b may vary slightly during and shortly after periods of change in the rate of cooling by reactor coolant subsystem 25.

As illustrated in FIG. 12J, control cavities 140b may be cooled by movement of cooler moderator through moderator coolant inflow tube 335b and into control cavities 140b through holes 336b in the sides of moderator coolant inflow tube 335b. A substantially equal volume of warmer moderator may move out of control cavity 140b into reflector zone 95 and to reactor coolant subsystem 25 via hole 338b and moderator outflow tube 337.

As depicted in FIGS. 12I, 12J, and 12K, the lower portion of reflector zone 95 may be cooled by flow of cooler moderator from moderator coolant inflow tube 335b through holes 336b in the lower portion of moderator coolant inflow tube 335b, with excess moderator flowing to moderator coolant subsystem 315 (described below) via moderator coolant outflow tube 337b.

As depicted in FIGS. 12I, 12J, and 12K, the upper portion of reflector zone 95 and control cavity array 130b may be cooled by evaporation occurring at boundary 115. During the evaporation, excess steam moderator may move into moderator coolant subsystem 315 (described below) via a transfer tube 323b.

Figure 12N:
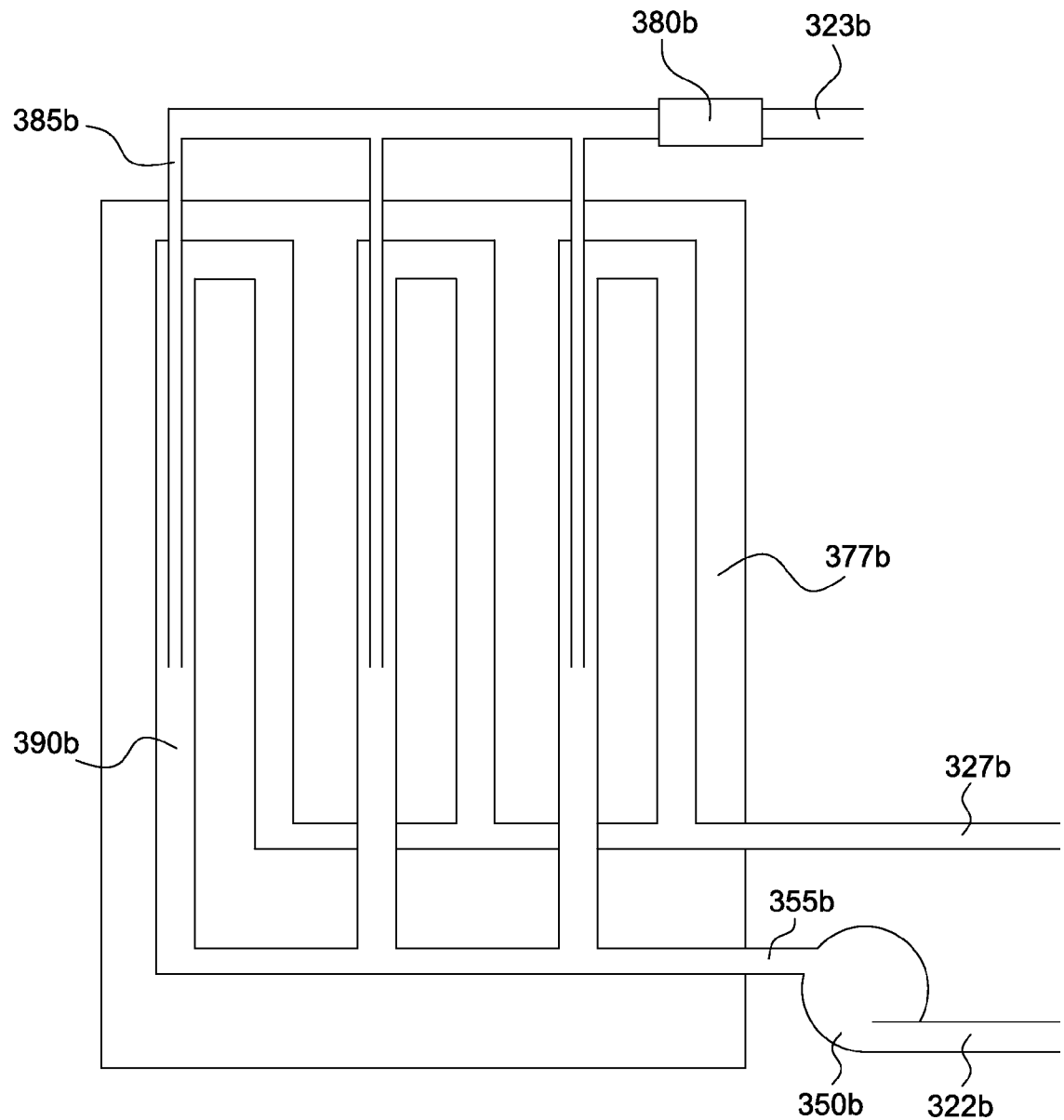
FIG. 12N includes a sectional schematic view of the fourth exemplary embodiment of the reactor.

As depicted in FIG. 12N, a tank 377b containing unpressurized water ($H_2O$) may include a plurality of moderator heat exchange tubes 390b that are fluidly connected to a moderator coolant tube 327b. Moderator heat exchange tubes 390b may extend through the unpressurized water ($H_2O$) contained in tank 377b, and may be fluidly connected via a passageway 355b with a moderator coolant pump 350b. A passageway 322b may fluidly connect moderator coolant pump 350b to moderator coolant inflow tube 335b that is disposed in control cavity array 130b. A steam pressure control valve 380b may allow the passage of some steam moderator from steam transfer tube 323b to a plurality of steam heat exchange tubes 385b when a pressure in steam transfer tube 323b is greater than a desired pressure. Moderator steam in steam heat exchange tubes 385b may condense on inside walls of steam heat exchange tubes 385b or may escape out of a bottom portion of steam heat exchange tubes 385b and condense in the cool moderator disposed in moderator heat exchange tube 390b.

Tank 377b may be any suitable tank for being substantially filled with unpressurized water ($H_2O$) so that the temperature may not exceed the boiling point of water ($H_2O$). In normal operation, tank 377b may be cooled by any suitable method to just below the boiling point of water ($H_2O$). In a situation where power to reactor 15 is disrupted, or another situation where normal cooling operates abnormally, tank 377b may be cooled by evaporation from the surface of the water ($H_2O$) disposed in tank 377b.

As illustrated in FIG. 13, reactor coolant subsystem 25 may include a transfer subsystem 305, a fuel coolant subsystem 310, and a moderator coolant subsystem 315. Transfer subsystem 305 may transfer reactor coolant between heat exchanger 20 and reactor core 100, 100', 100a, and/or 100b. Fuel coolant subsystem 310 may facilitate heat exchange from fuel tubes 135, 135', 135a, and 135b, and moderator coolant subsystem 315 may facilitate heat exchange from control cavities 140', 140a, 140b, and reflector zone 95.

The reactor coolant of reactor coolant subsystem 25 may be any suitable fluid material for facilitating heat exchange from reactor core 100, 100', 100a, and/or 100b. For example, the reactor coolant may include $D_2O$ ("heavy water"), $H_2O$ ("light water"), molten metal or salt, or a gas. A similar coolant may be used for fuel coolant subsystem 310 and moderator coolant subsystem 315, or a different coolant may be used for fuel coolant subsystem 310 and moderator coolant subsystem 315.

Transfer subsystem 305 may include a cold reactor coolant passageway 320 and a hot reactor coolant passageway 325. Passageways 320 and 325 may be formed from any suitable material for transferring reactor coolant such as, for example, steel and/or zirconium alloy. The same passageway 320 and passageway 325 may transfer reactor coolant for both fuel coolant subsystem 310 and moderator coolant subsystem 315 (as in, e.g., the first exemplary embodiment), or separate passageways 320 and 325 may be provided for fuel coolant subsystem 310 and passageways 322a, 327a, 322b, 327b, and similar passageways in reactor core 100' (not shown) for moderator coolant subsystem 315. Cold reactor coolant passageway 320 may transfer cold reactor coolant from heat exchanger 20 to reactor 15. The cold reactor coolant may be in a liquid state and may be any suitable temperature for facilitating heat exchange from reactor 15.

Referring back to FIG. 2, for example, cold reactor coolant passageway 320 may pass through apertures of containment structure 85 and into reflector zone 95. Cold reactor coolant passageway 320 may communicate with passageways of fuel coolant subsystem 310 and moderator coolant subsystem 315 inside of reflector zone 95, and may thereby supply fuel coolant subsystem 310 and moderator coolant subsystem 315 with cold reactor coolant for heat exchange. Hot reactor coolant passageway 325 may be in fluid communication with fuel coolant subsystem 310 and moderator coolant subsystem 315, and may receive hot reactor coolant (e.g., reactor coolant that has passed through reactor core 100, 100', 100a, and/or 100b in fuel tubes 135, 135', 135a, and/or 135b, thereby facilitating heat exchange with reactor core 100, 100', 100a, and/or 100b) from fuel coolant subsystem 310 and moderator coolant subsystem 315. Hot reactor coolant passageway 325 may transfer hot reactor coolant from reactor 15 back to heat exchanger 20.

As illustrated, for example, in FIG. 3, fuel coolant subsystem 310 may include a plurality of passageways 330 that may be in fluid communication with cold reactor passageway 320 and hot reactor coolant passageway 325 of transfer subsystem 305. Cold reactor coolant may flow from cold reactor passageway 320 to passageways 330. Passageways 330 may be disposed leading to and from fuel tubes 135, 135', 135a, and/or 135b. Cold reactor coolant may pass through passageways 330, thereby passing through fuel tubes 135, 135', 135a, and/or 135b to facilitate heat exchange with fuel tubes 135, 135', 135a, and/or 135b. The cold reactor coolant may be heated by fuel disposed in tubes 135, 135', 135a, and/or 135b, and may be transferred out of fuel tubes 135, 135', 135a, and 135b via passageways 330. Passageways 330 may then transfer the hot reactor coolant to hot reactor coolant passageway 325 of transfer subsystem 305. The hot reactor coolant may be in a substantially fully liquid state, may be in a partially liquid state and a partially gaseous state, or may be in a substantially fully gaseous state.

As illustrated, for example, in FIG. 2, moderator coolant subsystem 315 may include a plurality of passageways 335 that may be in fluid communication with cold reactor coolant passageway 320 and hot reactor coolant passageway 325 of transfer subsystem 305. Cold reactor coolant may flow from cold reactor coolant passageway 320 to passageways 335 and 330. The cold reactor coolant may be in a liquid state. Passageways 335 may be disposed within control cavities 140.

Cold reactor coolant may pass through passageways 335, thereby passing through control cavities 140 to facilitate heat exchange with control cavities 140. The cold reactor coolant may be heated by moderator confined within control cavities 140 into warm reactor coolant, and may be transferred out of control cavities 140 via passageways 335. Similar to the heat exchange performed by passageways 335 in the disclosed control cavities, passageways 330 may transfer cold reactor coolant from cold reactor coolant passageway 320 through reflecting pool 105. It is also contemplated that the cold reactor coolant may be heated by the moderator of reflecting pool 105 into warm reactor coolant. Passageways 335 and 330 may then transfer the warm reactor coolant to a lower portion of fuel tubes 135, through the fuel tubes 135 (where it is heated by the fuel to become hot reactor coolant), and then to hot reactor coolant passageway 325 of transfer subsystem 305. The hot reactor coolant may be in a substantially fully liquid state or may be in a partially liquid state and a partially gaseous state.

Figure 14:
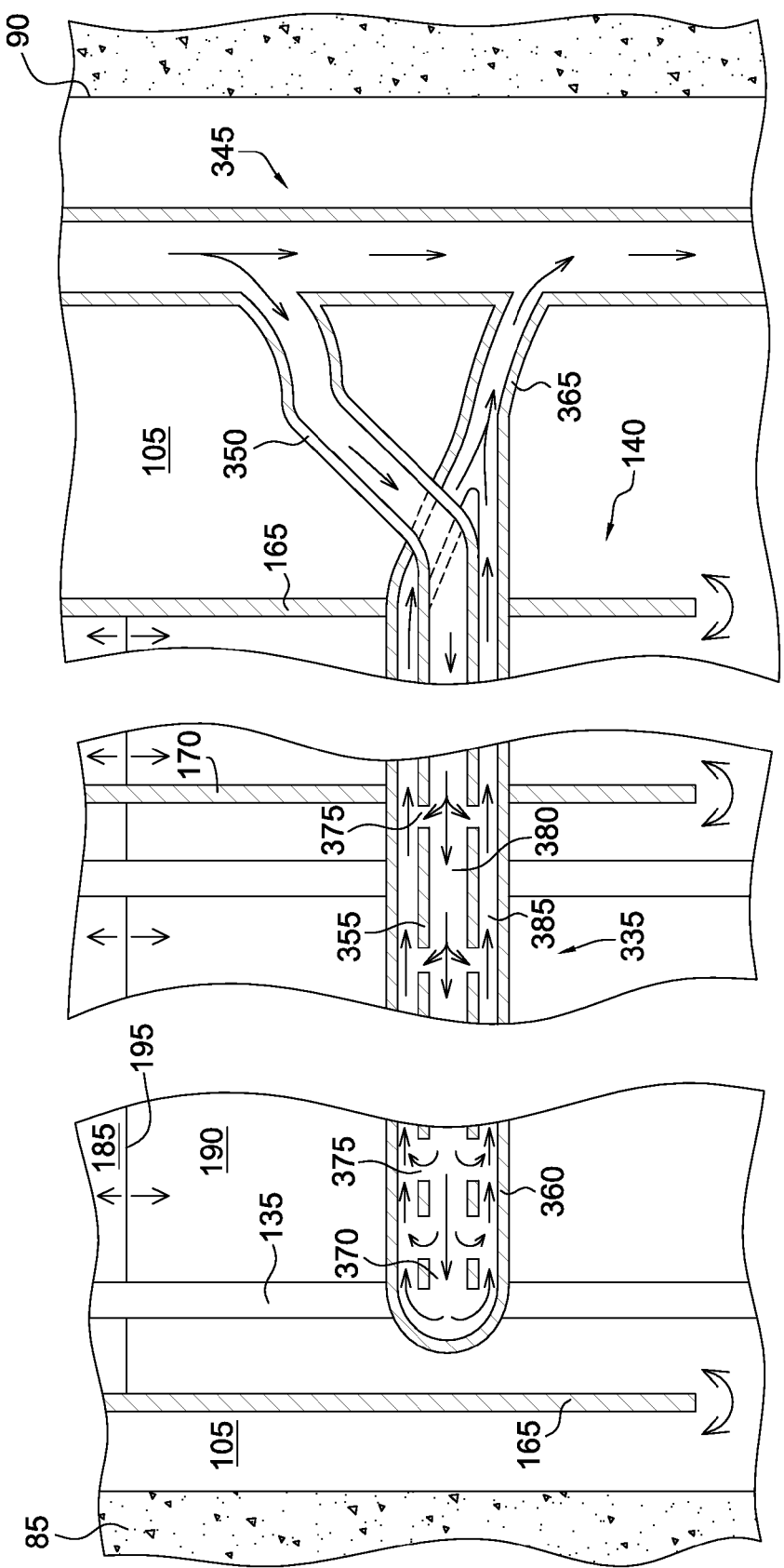
FIG. 14 is a sectional view of an exemplary passageway of the reactor coolant subsystem.

FIG. 14 illustrates an exemplary detailed illustration of passageway 335 as it passes through control cavities 140 for facilitating heat exchange from control cavities 140. Passageway 335 may be connected to cold reactor coolant passageway 320 and/or hot reactor coolant passageway 325 of transfer subsystem 305 either directly or via an intermediate passageway 345. Passageway 335 may include an entry member 350, an interior member 355, an exterior member 360, and an exit member 365. Entry member 350 may fluidly connect intermediate passageway 345 with interior member 355. Interior member 355 may be disposed within an interior of exterior member 360. For example, interior member 355 and exterior member 360 may be an arrangement of concentric tubes. Exit member 365 may fluidly connect exterior member 360 with intermediate passageway 345. Entry member 350 may pass through an aperture in a wall of exit member 365, and may be partially disposed within exit member 365. Interior member 355 may have an end portion 370 that may be open. A plurality of apertures 375 may be formed through a wall of interior member 355. Apertures 375 may increase in size, and a spacing between apertures 375 may decrease, in a direction moving toward end portion 370 of interior member 355. Reactor coolant may flow from entry member 350 and through a channel 380 of interior member 355. Some reactor coolant may pass through apertures 375 and into a channel 385, before reaching open end portion 370 of interior member 355. A size and frequency of apertures 375 may increase, in a direction moving toward end portion 370, and an amount of mixing of reactor coolant between channels 380 and 385 may increase in a direction moving toward end portion 370. Channel 385 may be formed between interior member 355 and exterior member 360, and may be an annular-shaped channel. After passing through apertures 375 and/or open end portion 370, reactor coolant may flow through channel 385 and into intermediate passageway 345, via exit member 365. Reactor coolant disposed in channel 385 may be heated by thermal conduction from the warmer moderator in control cavity 140 through the wall of exterior member 360. By allowing some flow of relatively cooler coolant from channel 380 to channel 385 via apertures 375, the temperature of coolant in channel 385 may be relatively constant along its length. Heat transfer fins (not shown) may be added to the inner and/or outer surfaces of exterior member 360 to facilitate the heat transfer.

Referring back to FIG. 13, pump subsystem 30 may include a coolant pump 390, an $H_2O$ pump 395, and a motor 400. Motor 400 may drive coolant pump 390 and $H_2O$ pump 395.

Coolant pump 390 may be any suitable type of pump for pressurizing flow of reactor coolant in transfer subsystem 305. For example, coolant pump 390 may be a positive displacement pump such as a rotary-type pump, a reciprocating-type pump, or a linear-type pump. Also, for example, coolant pump 390 may be a steam pump, an impulse pump, a hydraulic ram pump, or a centrifugal pump. Coolant pump 390 may pressurize a flow of reactor coolant in cold reactor coolant passageway 320 from heat exchanger 20 to reactor 15, and within hot reactor coolant passageway 325 from reactor 15 back to heat exchanger 20. Coolant pump 390 may pressurize the same reactor coolant in transfer subsystem 305 for both fuel coolant subsystem 310 and moderator coolant subsystem 315, or one or more coolant pumps 390 may separately pressurize reactor coolant for fuel coolant subsystem 310 and cool moderator for moderator coolant subsystem 315.

$H_2O$ pump 395 may be of a type similar to coolant pump 390 and may pressurize a flow of water ($H_2O$) and steam ($H_2O$) in turbine steam subsystem 65. $H_2O$ pump 395 may pressurize a flow of hot steam ($H_2O$) in passageway 70 from heat exchanger 20 to turbine 45, a flow of surplus or dead steam ($H_2O$) in passageway 75 from turbine 45 to turbine cooling subsystem 60, and a flow of water ($H_2O$) in passageway 80 from turbine cooling subsystem 60 to heat exchanger 20.

Motor 400 may be any suitable type of motor for driving coolant pump 390 and $H_2O$ pump 395 such as, for example, a fixed or variable-displacement motor, a bent-axis type hydraulic motor, a linear hydraulic motor, a hydraulic cylinder or an electric motor. Motor 400 may drive coolant pump 390 and $H_2O$ pump 395 in any suitable manner such as, for example, via one or more mechanical shafts 405. For example, motor 400 may drive both coolant pump 390 and $H_2O$ pump 395 via a single mechanical shaft 405. Mechanical shaft 405 may include a flywheel that operates to mitigate rapid flow changes as motor 400 drives coolant pump 390 and $H_2O$ pump 395. Motor 400 may also drive coolant pump 390 and $H_2O$ pump 395 separately. It is also contemplated that motor 400 may drive pump 390 and $H_2O$ pump 395 by other suitable techniques such as, for example, hydraulically. Motor 400 may be configured to drive both coolant pump 390 and $H_2O$ pump 395 at an optimized level when nuclear reactor system 5 is operating at full power. Motor 400 may drive both coolant pump 390 and $H_2O$ pump 395 when motor 400 is shut down or stops operating, and both coolant pump 390 and $H_2O$ pump 395 may also simultaneously shut down. It is also contemplated that each pump may have a separate motor.

Figure 16:
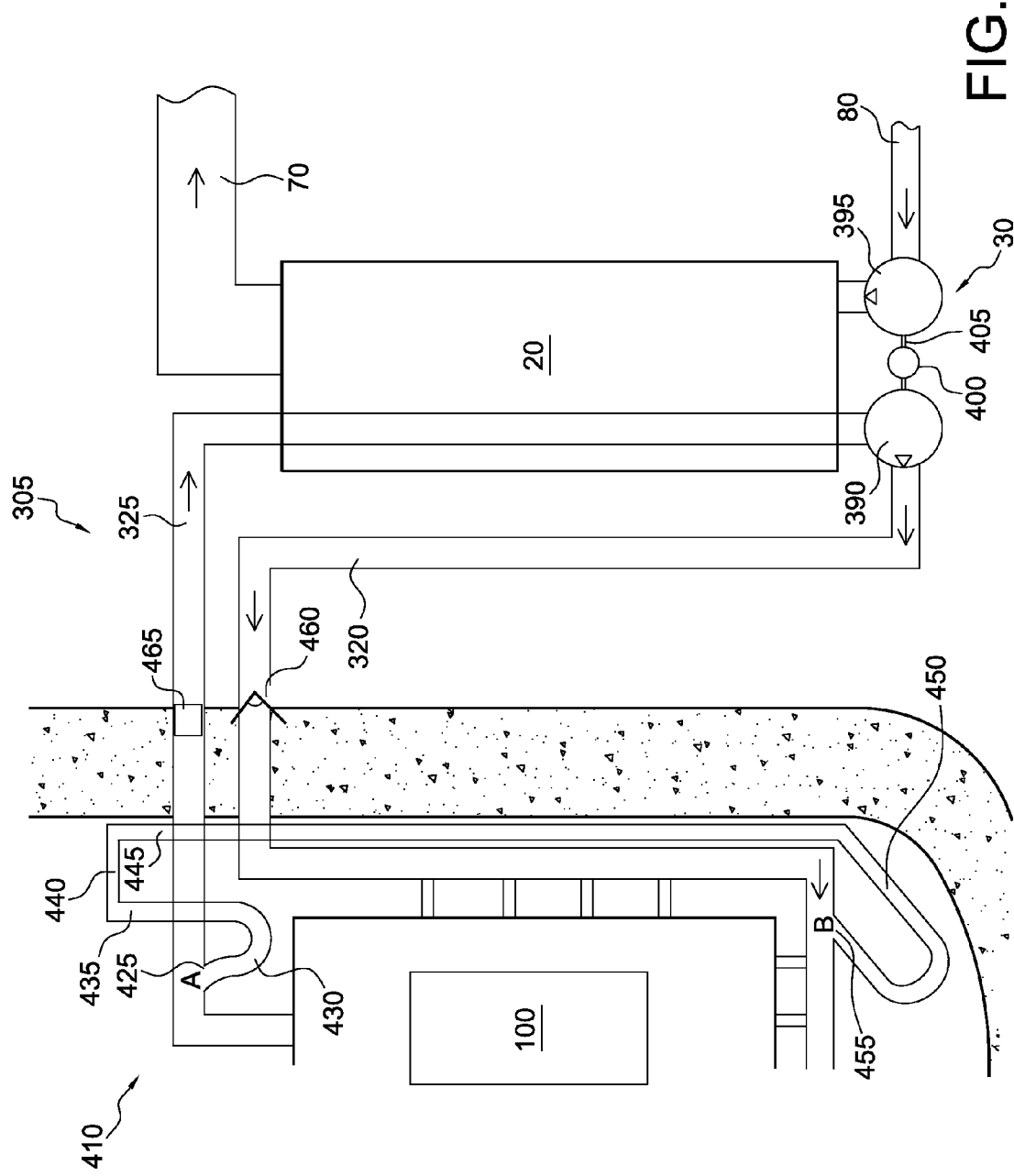
FIG. 16 is a schematic illustration of a first exemplary auxiliary coolant subsystem.
Figure 17:
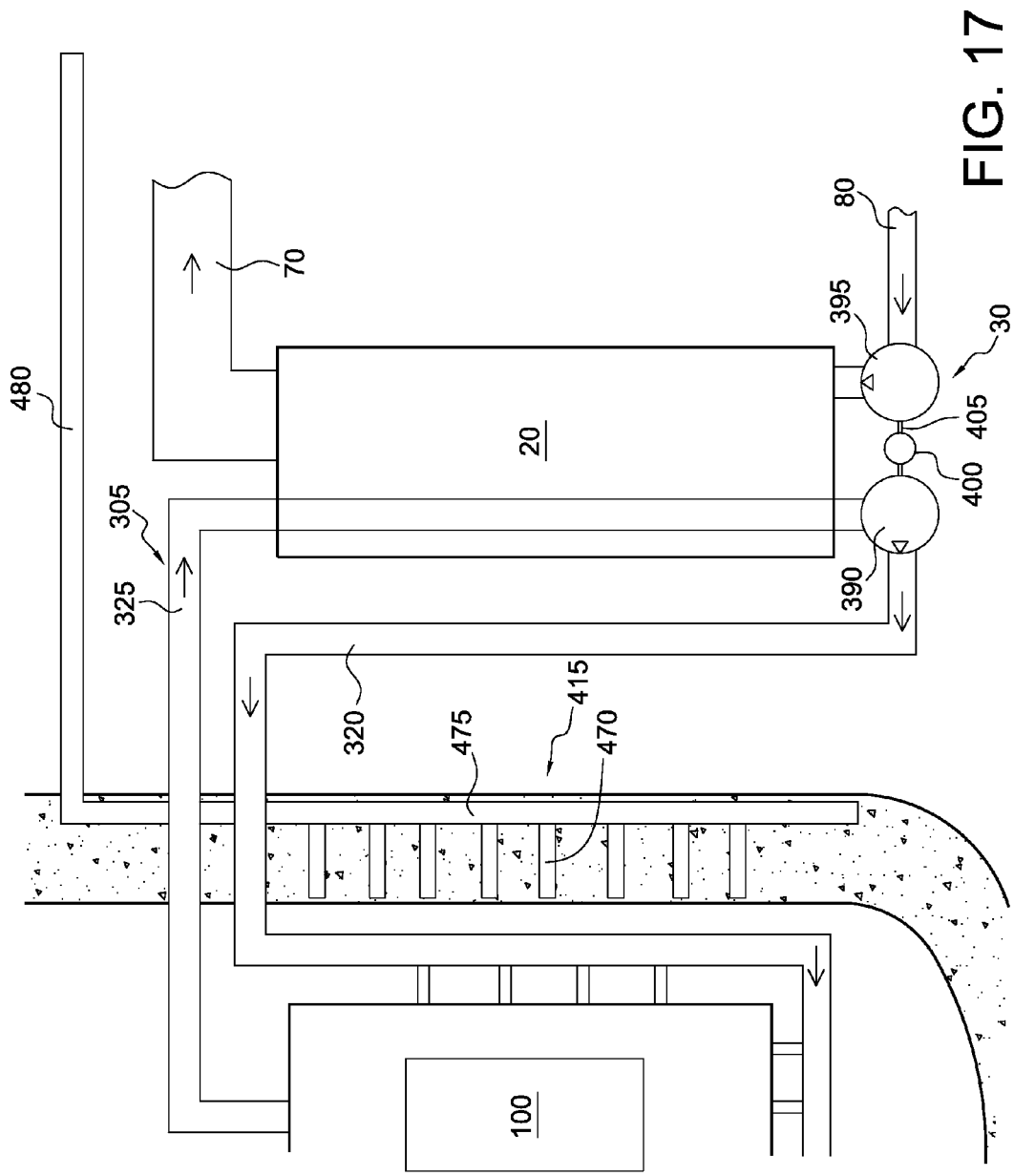
FIG. 17 is a schematic illustration of a second exemplary auxiliary coolant subsystem.
Figure 18:
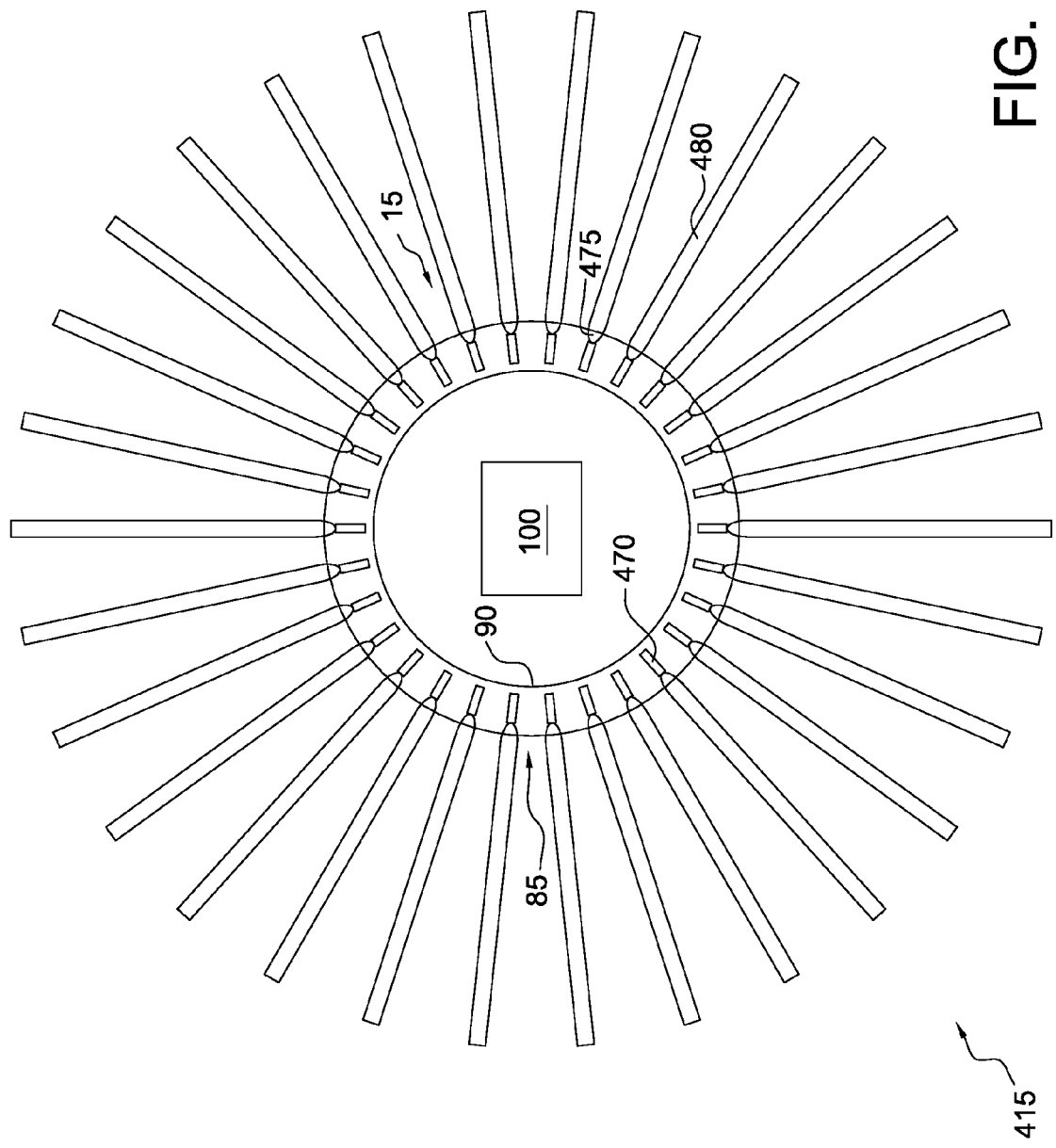
FIG. 18 is a plan view of the second auxiliary coolant subsystem of FIG. 17.

As illustrated in FIGS. 16-18, auxiliary coolant subsystem 35 may include a convection loop subsystem 410 and an auxiliary heat exchange subsystem 415. Convection loop subsystem 410 and auxiliary heat exchange subsystem 415 may provide auxiliary systems for facilitating heat exchange from reactor 15.

As illustrated in FIG. 16, convection loop subsystem 410 may include a junction 425, a passageway 430, a passageway 435, a plurality of passageways 440 and 445, a merging portion 450, a junction 455, a valve 460, and valve 465. Junction 425, passageway 430, passageway 435, the plurality of passageways 440 and 445, merging portion 450, and junction 455 may be formed from any material suitable for transferring reactor coolant, and may be in fluid communication to provide an auxiliary reactor coolant path. Junction 425 may be configured to maintain a pressure A at an inlet of passageway 430. A portion of reactor coolant flowing through hot reactor coolant passageway 325 may flow into passageway 430 at junction 425. Passageway 430 may guide reactor coolant flow downward, below boundary 115 of reflector zone 95, thereby guiding flow below a top surface of reflecting pool 105. Reactor coolant may flow from passageway 430, upward through passageway 435, and then toward containment structure 85 and pressure vessel 90 via the plurality of passageways 440. The plurality of passageways 440 may be in fluid communication with the plurality of passageways 445. The plurality of passageways 440 and 445 may be sized to be smaller than passageways 430 and 435, and may be, for example, a plurality of small tubes. The plurality of passageways 445 may be disposed adjacent to a surface of pressure vessel 90 so as to have good heat exchange with pressure vessel 90. For example, the plurality of passageways 445 may be welded to pressure vessel 90. The plurality of passageways 445 may transfer reactor coolant downward along pressure vessel 90, to a position near or below a bottom of reactor core 100, 100', 100a, and/or 100b.

The plurality of passageways 445 may be fluidly connected with and merge into one or more merging portions 450, which may be larger than the plurality of passageways 445. For example, several passageways 445 may merge into each of a plurality of larger merging portions 450. One or more merging portions 450 may fluidly connect to cold reactor coolant passageway 320 at junction 455. Junction 455 may be configured to maintain a pressure B at an outlet of one or more merging portions 450 such that when coolant pump 390 is providing a flow of coolant for full power operation, the pressure A at passageway 430 may balance the pressure B so that relatively little coolant passes between junction 425 and junction 455 via passageways 430, 435, 440, 445, and merging portion 450. When pump 390 is not operating and reactor core 100 is still producing heat, the hot coolant in fuel tubes 135 may rise and flow into passageway 430 because passageway 325 may be substantially blocked by pump 390. The hot coolant may continue through passageways 435 and 440 to the plurality of passageways 445. In passageways 445, the coolant may transfer heat to reflector zone 95 and pressure vessel 90, and may become denser as it cools. This relatively denser moderator may fall through passageway 445 and junction 455 and displace relatively hotter moderator in fuel tubes 135, thus creating a convection circuit which may cool fuel tubes 135.

Valves 460 and 465 may be provided to isolate a flow of reactor coolant within convection loop subsystem 410 in the case of an interruption of flow and/or loss of coolant, external to reactor 15, of reactor coolant subsystem 25. Valve 460 may be disposed in cold reactor coolant passageway 320, and may be any suitable valve for substantially blocking flow of reactor coolant out of reactor 15. For example, valve 460 may be a one-way valve or a reverse blocking valve that may allow reactor coolant to flow into reactor 15 via cold reactor coolant passageway 320, but may substantially block a flow of reactor coolant out of reactor 15 via cold reactor coolant passageway 320. For example, valve 460 may be disposed in cold reactor coolant passageway 320 at a position at or near an exterior surface of containment structure 85. Valve 465 may be disposed in hot reactor coolant passageway 325, and may be any suitable valve for substantially blocking flow of reactor coolant out of reactor 15 when the amount of reactor coolant is less than a threshold amount. For example, valve 465 may be a floating valve that may allow reactor coolant to flow out of reactor 15 via hot reactor coolant passageway 325 when the level of reactor coolant is greater than the threshold amount, but may substantially block a flow of reactor coolant out of reactor 15 via hot reactor coolant passageway 325 when the level of reactor coolant is less than the threshold amount. For example, valve 465 may substantially block the flow of reactor coolant out of reactor 15 when hot reactor coolant passageway 325 is less than half-full of reactor coolant. Valve 465 may be disposed in hot reactor coolant passageway 325 at a position at or near an exterior surface of containment structure 85.

As illustrated in FIGS. 17 and 18, auxiliary heat exchange subsystem 415 may include one or more heat exchange members 470, one or more heat exchange members 475, and one or more heat exchange members 480. Heat exchange member 470, heat exchange member 475, and heat exchange member 480 may facilitate heat exchange for heat produced by reactor core 100, 100', 100a, or 100b to a location away from reactor 15.

Heat exchange member 470 may be an elongated element for housing a material. Heat exchange member may be disposed in containment structure 85 (e.g., cast inside of a wall of containment structure 85), and may be disposed near pressure vessel 90 or in contact with an exterior surface of pressure vessel 90. Heat exchange member 470 may be disposed radially in containment structure 85, so that one end of heat exchange member 470 may be adjacent to or in contact with pressure vessel 90, and another end of heat exchange member 470 may be near an exterior portion of containment structure 85. For example, heat exchange member 470 may be an elongated cavity that houses a state-changing material. For example, heat exchange member 470 may include a cavity that houses a metal alloy. For example, heat exchange member 470 may be a steel tube that is filled with a metal alloy. The state-changing metal alloy may be a material that has a melting point that is slightly higher than a normal operating temperature of the moderator of reflector zone 95. For example, heat exchange member 470 may be a hollow steel tube that is substantially entirely filled with lead, tin, and/or any other material with a suitable melting point. If the temperature of the moderator within reflector zone 95 exceeds its normal operating temperature, the state-changing material housed within heat exchange member 470 may be heated from a solid state into a liquid state. For example, heat exchange member 470 may include lead as a state-changing material, which may be melted into molten lead when the moderator within reflector zone 95 exceeds its normal operating temperature. When the state-changing material changes states (e.g., when the lead melts), the conductivity properties of the state-changing material may improve. Therefore, the state-changing material of heat exchange member 470 may efficiently transfer heat (for example, by convection) away from pressure vessel 90, and toward an exterior of containment structure 85 (which may have low thermal conductivity), as the state-changing material melts. It is also contemplated that the state-changing material housed within heat exchange member 470 may be in a liquid state at normal moderator operating temperatures, and may be heated into a gaseous state when the temperature of the moderator exceeds a normal operating temperature.

Heat exchange member 475 may also be an elongated cavity that houses a state-changing material, similar to heat exchange member 470. The state-changing material of heat exchange member 475 may be a material with a lower melting and/or boiling point than the state-changing material of heat exchange member 470. For example, the state-changing material may be a material in a liquid state, and may have a boiling point that is less than the temperature at which heat exchange member 470 undergoes a state change (e.g., the melting point of lead or any other suitable state-changing material of heat exchange member 470). For example, heat exchange member 475 may be a steel tube that is filled with water ($H_2O$) or any other suitable material in a liquid state. Heat exchange member 475 may be disposed substantially vertically within containment structure 85 (e.g., cast within a wall of containment structure 85). As illustrated in FIGS. 17 and 18, heat exchange member 475 may be in contact with or disposed near an end portion of one or more heat exchange members 470, and may be disposed near an exterior surface of containment structure 85. The state-changing material of heat exchange member 475 may be heated by heat transferred from heat exchange member 470, and may undergo a state change. For example, heat transferred from an end portion of heat exchange member 470 to heat exchange member 475 may cause the state-changing material to change states (e.g., may cause water housed in the steel tube to boil). It is also contemplated that the state-changing material of heat exchange member 475 may be in a solid state at normal moderator operating temperatures, and may be heated into a liquid state when the temperature of the moderator exceeds a normal operating temperature.

Heat exchange member 480 may be similar to heat exchange member 475, and may be in fluid communication with heat exchange member 475. The state-changing material of heat exchange member 475 may thus flow from heat exchange member 475 into heat exchange member 480. Heat exchange member 480 may be disposed at a slight angle from a substantially horizontal plane. Heat exchange member 480 may be disposed at a slight grade such as, for example, 1 in 20 (rise over run) or 1 in 50 (rise over run). As illustrated in FIG. 18, heat exchange members 480 may fan out from reactor 15, thereby transferring heat away from reactor 15. Heat exchange members 480 may be disposed under a ground surface, thereby transferring heat from reactor 15 under any suitable amount of ground surface. For example, heat exchange members 480 may be disposed under a large field and/or parking lot, thereby utilizing the large thermal capacity of the ground to absorb heat, and utilizing the ground surface to dissipate heat. Because heat exchange member 480 may be at a slight slope, the state-changing material housed within heat exchange member 480 may be cooled at a given distance from reactor 15 into the previous state. For example, heat exchange member 475 may include water that may be heated into steam ($H_2O$) and transferred into heat exchange member 480. At an outer end, heat exchange member 480 may terminate in a small tank or reservoir of water so that heat exchange members 475 and 480 are substantially always full of water. Heat exchange member 480 may be a corrugated pipe configured to increase a contact area of the pipe (e.g., increase the contact area per unit of distance along the ground), and also increasing the contact area of any steam ($H_2O$) in the pipe with the pipe interior surface. Because the steam ($H_2O$) traveling outward along the upper surface of the water ($H_2O$) in the pipe fills the upper portion of each corrugation in the pipe before any steam ($H_2O$) can travel further out in the pipe, the corrugation increases the surface area of water ($H_2O$) in the pipe that is in contact with the steam ($H_2O$). After a given distance, enough heat may be dissipated such that the steam ($H_2O$) condenses into water ($H_2O$).

Figure 19:
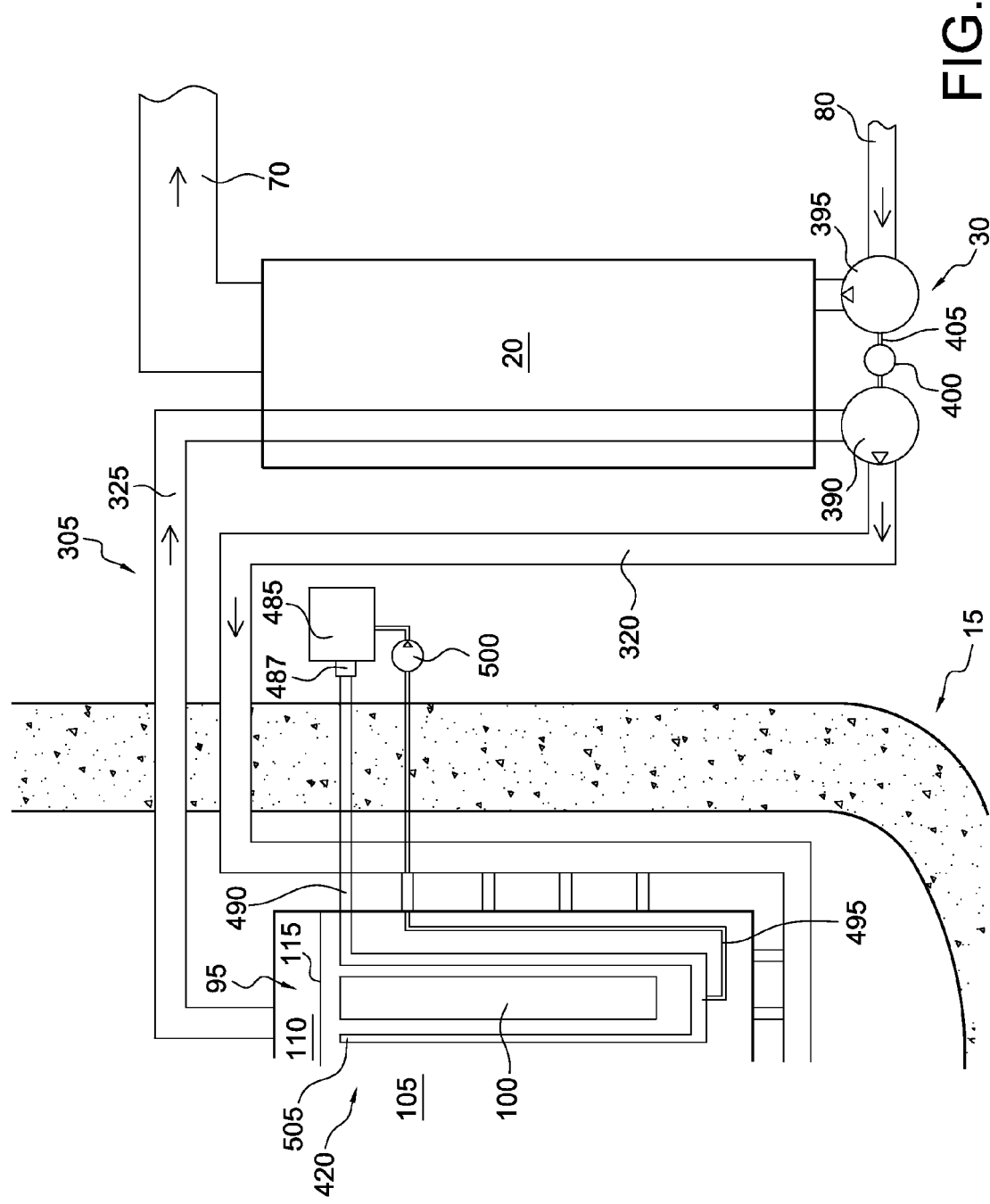
FIG. 19 is a schematic illustration of a third exemplary auxiliary coolant subsystem.

As illustrated in FIG. 19, an auxiliary reactor shutdown subsystem 420 may include a pressurized reservoir 485, one or more passageways 490, a drain passageway 495, and a pump 500. Pressurized reservoir 485 may supply pressurized water ($H_2O$) into passageway 490. Pump 500 may pressurize water ($H_2O$) in drain passageway 495.

Pressurized reservoir 485 may be any suitable container for storing pressurized liquid such as, for example, a pressurized steel vessel. Any suitable neutron-absorbing material may be stored in pressurized reservoir 485 such as, for example, water ($H_2O$). Also, borated water ($H_2O$), having boron absorbed mixed into the water ($H_2O$), may be stored in pressurized reservoir 485. Pressurized reservoir 485 may be disposed on an exterior side of containment structure 85, and may include a valve 487 that may be opened and closed to flow to selectively allow and block flow of pressurized material from pressurized reservoir 485 into one or more passageways 490.

Passageway 490 may be any suitable passageway for transferring a pressurized material. Passageway 490 may be fluidly connected to pressurized reservoir 485, and may transfer pressurized material from pressurized reservoir 485, through an aperture of containment structure 85, and may split into one or more U-shaped tubes that pass down through the core area into reflector zone 95 below reactor core 100, 100', 100a, or 100b, and then back up through reactor core 100, 100', 100a, or 100b. Passageway 490 may transfer pressurized material through reflector zone 95 and reactor core 100, 100', 100a, or 100b in any suitable manner. For example, as illustrated in FIG. 19, passageway 490 may enter an upper portion of reflecting pool 105 and form a substantially U-shaped configuration. Passageway 490 may be formed in any suitable configuration within reflector zone 95. When valve 487 is blocking flow of pressurized material from pressurized reservoir 485 into passageway 490, passageway 490 may already be filled with steam ($H_2O$). When a fast shutdown of the reactor is desired (e.g., SCRAM), valve 487 is opened and pressurized neutron-absorbing material such as, for example, borated water ($H_2O$) fills passageway 490, the pressurized neutron-absorbing material may increasingly pressurize the steam ($H_2O$) that was previously disposed in passageway 490. Therefore, the steam ($H_2O$) previously disposed in passageway 490 may be increasingly pressurized at an end portion 505 of each of the one or more passageways 490, slowing and gradually stopping further flow.

Drain passageway 495 may disposed at a lower portion of reflecting pool 105 and may fluidly connect any portion (e.g., a lower portion) of passageway 490 with pressurized reservoir 485. Pump 500 may be disposed in drain passageway 495 and may pressurize the neutron-absorbing material to flow from the lower portion of passageway 490 back to pressurized reservoir 485 when it is desired to restart reactor 15. Pump 500 may also pressurize neutron-absorbing material disposed in pressurized reservoir 485. Pump 500 may thereby pump the neutron-absorbing material such as, for example, borated water ($H_2O$), from passageway 490 back to pressurized reservoir 485.

Figure 20:
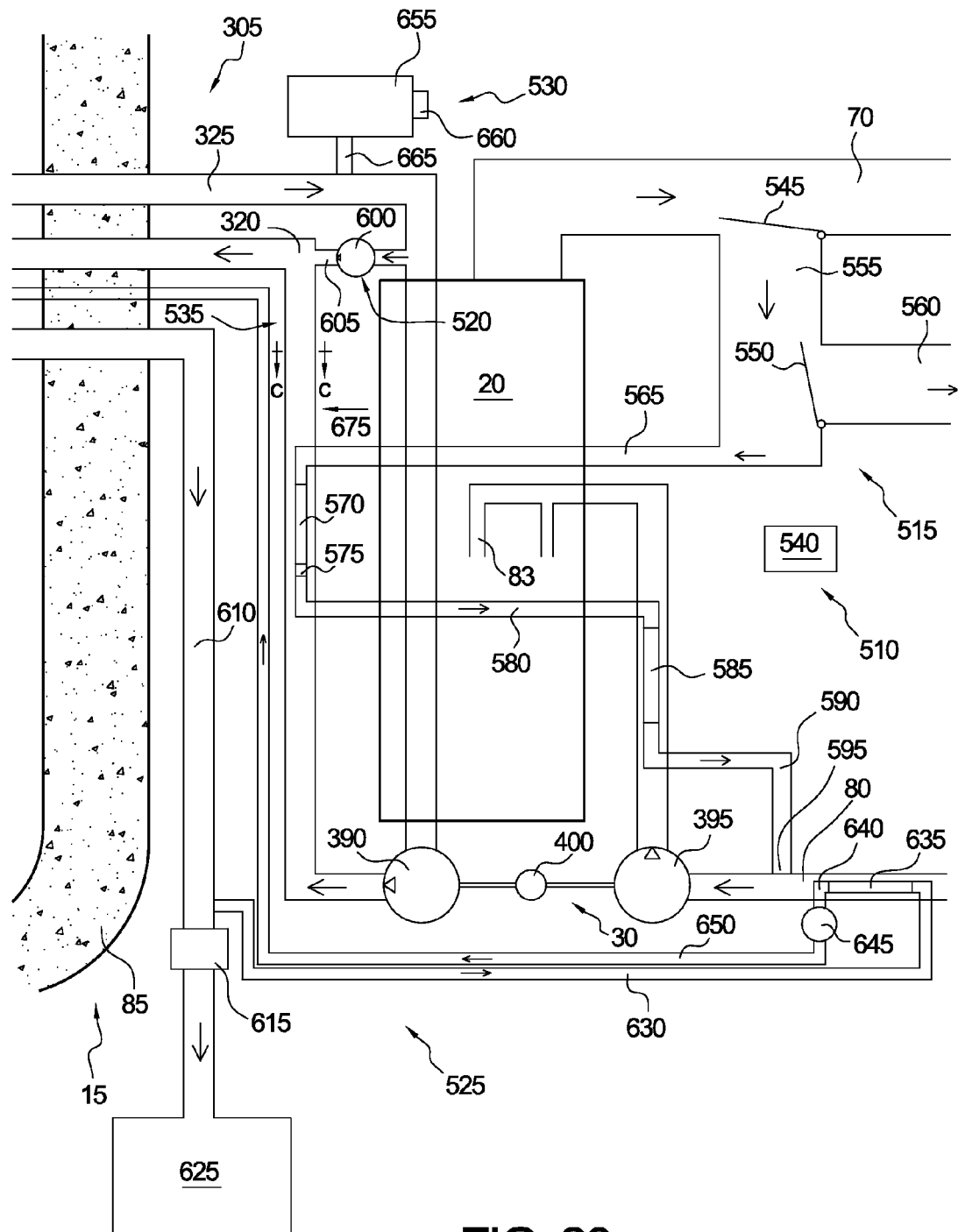
FIG. 20 is a schematic illustration of an exemplary reactor control subsystem.

As illustrated in FIG. 20, reactor control subsystem 40 may include a control subsystem 510, a load-following subsystem 515, a bypass subsystem 520, a moderator stabilization subsystem 525, a reactor coolant stabilization subsystem 530, and a differential flow subsystem 535. Control subsystem 510, load-following subsystem 515, bypass subsystem 520, moderator stabilization subsystem 525, reactor coolant stabilization subsystem 530, and differential flow subsystem 535 may control and/or stabilize an operation of nuclear reactor system 5.

Control subsystem 510 may include a controller 540 that may be any type of programmable logic controller suitable for automating machine processes. Controller 540 may be connected to the components of nuclear reactor system 5 via electrical lines (not shown), and may control an operation of any suitable component of nuclear reactor system 5 via the electrical lines. For example, controller 540 may be electrically connected to and control components of power generation subsystem 10, reactor 15, heat exchanger 20, reactor coolant subsystem 25, pump subsystem 30, auxiliary coolant subsystem 35, and/or reactor control subsystem 40. Control subsystem 510 may also include input and/or output components that are in electrical communication with controller 540 such as, for example, displays, monitors, keyboards, and other devices for use by operators of nuclear reactor system 5. Control subsystem 510 may also include sensors that are disposed in the various passageways and components of nuclear reactor system 5. The sensors may measure any suitable parameter such as, for example, a temperature and/or pressure of, e.g., $H_2O$ or reactor coolant. The sensors may be electrically connected to controller 540, and may input sensed data to controller 540 for use in the control of nuclear reactor system 5.

Load-following subsystem 515 may include gates 545 and 550, passageways 555, 560, 565, 580, and 590, a condenser 570, a valve 575, a heat exchanger 585, and a junction 595, which may be any suitable elements for transferring steam ($H_2O$) and water ($H_2O$).

Gate 545 may be disposed in passageway 70 and may selectively allow flow from passageway 70 into passageway 555. Gate 545 may be selectively moved from a closed position that substantially blocks flow of steam ($H_2O$) from passageway 70 into passageway 555, an open position that allows substantially full flow from passageway 70 into passageway 555, and a partially open position positioned at any desired interval between the closed position and the open position and thereby allowing a partial flow, proportional to the amount by which gate 545 is opened, of steam ($H_2O$) from passageway 70 into passageway 555. Gate 545 may thereby selectively reduce a flow of steam ($H_2O$) through passageway 70 by diverting steam ($H_2O$) through passageway 555.

Gate 550 may be disposed in passageway 555 and may selectively allow flow from passageway 555 into passageway 560 in a manner similar to the operation of gate 545. Gate 550 may thereby selectively block, partially allow, or fully allow flow of steam ($H_2O$) from passageway 555 into passageway 560. Passageway 560 may bypass turbine 45 and transfer steam ($H_2O$) directly to turbine cooling subsystem 60. Therefore, gate 550 may be operated to selectively allow steam ($H_2O$) to be directly transferred to turbine cooling subsystem 60 in certain situations such as, for example, when a rapid shut-down of turbine 45 is desired.

Passageway 555 may be in fluid communication with passageway 565. Passageway 565 may transfer steam ($H_2O$) from passageway 555 to condenser 570. Passageway 565 may pass by an exterior of heat exchanger 20, rather than passing through an interior of heat exchanger 20.

Condenser 570 may be disposed in contact with or adjacent to cold reactor coolant passageway 320. Condenser 570 may be any suitable condenser for condensing steam ($H_2O$) into water ($H_2O$). Valve 575 may be disposed in condenser 570 at any suitable location such as, for example, at a bottom portion of condenser 570. Valve 575 may be any suitable valve for allowing water ($H_2O$) to flow out of condenser 570 while substantially blocking a flow of steam ($H_2O$) out of condenser 570. For example, valve 575 may be a float valve. Condenser 570 and valve 575 may serve as a pressure reduction system, reducing the high pressure of the steam ($H_2O$) in passageway 565 to a relatively low pressure of water ($H_2O$) in passageway 580.

Passageway 580 may be in fluid communication with condenser 570. Passageway 580 may transfer water ($H_2O$) from condenser 570 to heat exchanger 585. Passageway 580 may pass by an exterior of heat exchanger 20, rather than passing through an interior of heat exchanger 20.

Heat exchanger 585 may be any suitable device for facilitating heat exchange from the water ($H_2O$) transferred through passageway 580. Heat exchanger 585 may be disposed in or near a passageway of turbine steam subsystem 65 that transfers water ($H_2O$) from an outlet of $H_2O$ pump 395 to heat exchanger 20. Heat exchanger 585 may cool a temperature of the water ($H_2O$) to a substantially same temperature as the water ($H_2O$) being transferred by passageway 80 of turbine steam subsystem 65. Passageway 590 may transfer water ($H_2O$) from heat exchanger 585 to passageway 80 via junction 595. The water ($H_2O$) transferred by passageway 590 into passageway 80 may have a substantially same temperature as the temperature of water ($H_2O$) already flowing in passageway 80. Passageway 80 may then transfer the water ($H_2O$) to an inlet of $H_2O$ pump 395 of pump subsystem 30.

Bypass subsystem 520 may include a pump 600 and a passageway 605. Passageway 605 may fluidly connect cold reactor coolant passageway 320 and hot reactor coolant passageway 325 of transfer subsystem 305. Pump 600 may be disposed in passageway 605. Pump 600 may have a relatively small capacity such as, for example, between about 2% and about 20% of the capacity of pump 390. Pump 600 may operate to pressurize reactor coolant in passageway 605 to pump reactor coolant from hot reactor coolant passageway 325 into cold reactor coolant passageway 320, thereby bypassing heat exchanger 20 and pump 390. Pump 600 and passageway 605 may allow relatively hot reactor coolant flowing through hot reactor coolant passageway 325 to bypass heat exchanger 20 and flow directly into cold reactor coolant passageway 320, thereby allowing hot coolant to mix with the relatively cold coolant and raise the temperature of the coolant flowing in cold reactor coolant passageway 320. Bypass subsystem 520 may operate, for example, during a shut-down and/or initial reactor coolant loading of nuclear reactor system 5. Bypass system 520 may also serve to adjust the effective flow ratios of pumps 390 and 395 (e.g. pump subsystem 30 may be designed to provide the correct ratio of reactor coolant flow to turbine steam flow at full power, but a slightly different ratio may be desirable at lower power operation).

Moderator stabilization subsystem 525 may include passageways 610, 630, 640, and 650, a valve 615, a reservoir 625, a condenser 635, and a pump 645, which may be any suitable elements for transferring steam ($H_2O$) and water ($H_2O$).

Passageway 610 may be a relatively large passageway that may fluidly connect steam area 110 of reflector zone 95 with reservoir 625. Valve 615 may be disposed in passageway 610. Valve 615 may be in a closed position, substantially blocking flow of steam moderator during normal operation. When valve 615 is opened, steam moderator may flow into reservoir 625 via passageway 610. Reservoir 625 may be a low pressure reservoir that may be maintained at a pressure that is less than a pressure of steam area 110 of reflector zone 95. Reservoir 625 may be a relatively large and cold storage area. For example, reservoir 625 may be cooled with a relatively large amount of water ($H_2O$). For example, reservoir 625 may be cooled with water ($H_2O$) of turbine steam subsystem 65. Upon entering reservoir 625 via passageway 610, the steam moderator may expand and condense on relatively cold surfaces of interior walls of reservoir 625. When valve 615 is opened, the rapid flow of moderator steam out of steam area 110 of reflector zone 95 may reduce the pressure of the steam moderator in steam area 110 and the pressure of moderator in reflector zone 95, thus allowing the rapid flow of moderator out of control cavities 140, 140', 140a, and/or 140b, thereby reducing the mass of moderator in the control cavities, reducing the number of thermal (slow) neutrons available to cause fission, thus leading to a rapid shutdown of reactor 15.

Passageway 630 may fluidly connect passageway 610 with condenser 635. Passageway 630 may be a relatively small passageway. For example, passageway 630 may be a pipe that has a significantly smaller diameter than passageway 610.

Passageway 630 may fluidly connect passageway 610 to condenser 635. Condenser 635 may be disposed in contact with or adjacent to passageway 80, which may transfer relatively cold water ($H_2O$), of turbine steam subsystem 65. Condenser 635 may be any suitable condenser for condensing steam moderator into liquid moderator. Steam moderator transferred from passageway 610 via passageway 630 may be condensed into liquid moderator by condenser 635. Passageway 640 may fluidly connect condenser 635 with pump 645.

Pump 645 may selectively block a flow of condensed liquid moderator from passageway 640 into passageway 650. Pump 645 may also selectively allow the condensed liquid moderator to flow into passageway 650, and may operate to pressurize the condensed liquid moderator to flow through passageway 650. Passageway 650 may transfer condensed liquid moderator back into reactor 15. For example, passageway 650 may fluidly connect passageway 650 with an upper portion of reflector zone 95, e.g., steam area 110. The condensed liquid moderator transferred into steam area 110 via passageway 650 may cause additional steam moderator in steam area 110 to condense. Reflector zone 95 may be heated by neutrons escaping from reactor core 100, 100', 100a, and/or 100b, and moderator in reflector zone 95 may evaporate into steam moderator in steam area 110. Pump 645 may be operated to condense excess steam moderator from steam area 110 so as to maintain a stable pressure in steam area 110 and reflector zone 95.

Reactor coolant stabilization subsystem 530 may include a reservoir 655, a heating element 660, and a passageway 665. Reservoir 655 may be a pressurized storage tank that may store reactor coolant. Reservoir 655 may be supplied with reactor coolant from reactor coolant subsystem 25 via passageway 665 from hot reactor coolant passageway 325. Reservoir 655 may include liquid reactor coolant in a bottom portion and gaseous reactor coolant at an upper portion. Heating element 660 may selectively heat reservoir 655 to maintain the reactor coolant stored within reservoir 655 at a desired temperature and/or pressure. Heating element 660 may be any suitable device for selectively heating reservoir 655 such as, for example, an electric heater. Cold reactor coolant from cold reactor coolant passageway 320 may be selectively pumped into reservoir 655 by a pump and supply line (not shown) from cold reactor coolant passageway 320. For example, the pump (not shown) may include an injector that sprays cold pressurized reactor coolant from cold reactor coolant passageway 320 into the top (steam) portion of reservoir 655. For example, relatively cold reactor coolant may be sprayed by the pump (not shown) into reservoir 655 to condense a portion of the steam reactor coolant in reservoir 655 to cause some of the steam reactor coolant to condense and thereby reduce a pressure in reservoir 655 and hot reactor coolant passageway 325.

Figure 15:
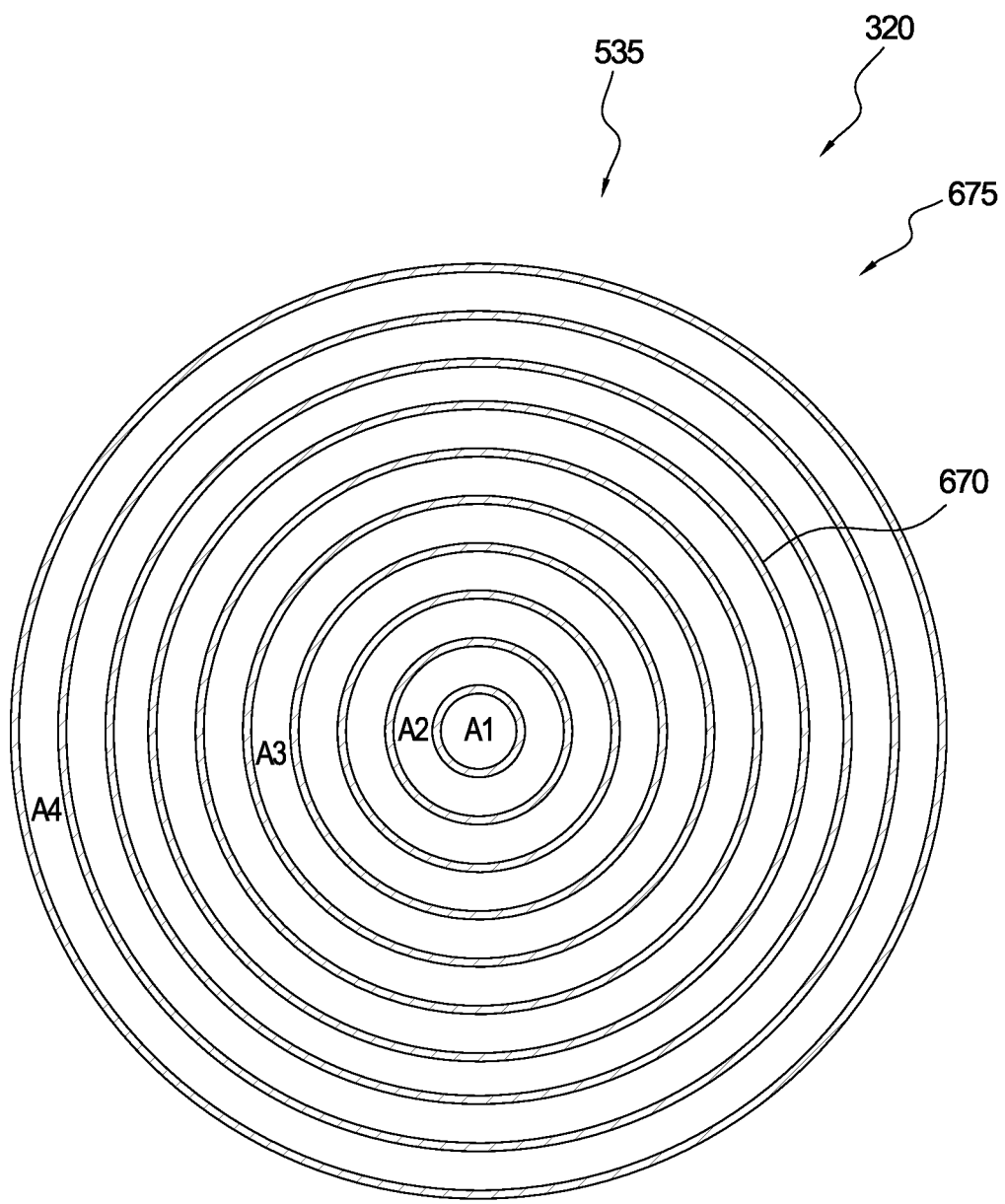
FIG. 15 is a sectional view taken through section C-C of the reactor control subsystem shown in FIG. 20.

As illustrated in FIGS. 15 and 20, differential flow subsystem 535 may include a plurality of concentric passageways 670 disposed in a portion 675 of cold reactor coolant passageway 320. Concentric passageways 670 may replace portion 675 of cold reactor coolant passageway 320, and may be fluidly connected at both ends of portion 675 to the other portions of cold reactor coolant passageway 320. Portion 675 may be a rising portion of cold reactor coolant passageway 320 that may be disposed downstream of pump 390. Any suitable number of concentric passageways 670 such as, for example, about ten concentric passageways 670, may be disposed within cold reactor coolant passageway 320. Concentric passageways 670 may be, for example, concentric steel pipes. The area between concentric passageways may increase, moving from the innermost passageway 670 to the outermost passageway 670. For example, an area A2 between the first and second concentric passageways 670 may be twice as large as an area A1 formed within the first concentric passageway 670, an area A3 between the fourth and fifth concentric passageways 670 may be five times larger than area A1 formed within the first concentric passageway 670, and an area A4 between the ninth and tenth concentric passageways 670 may be ten times larger than area A1 formed within the first concentric passageway 670. Portions of each area between each successive concentric passageway 670 may be blocked at each end to maintain the substantially same flow rate into and out of each of the concentric passageways 670. Concentric passageways 670 may thereby take a proportionately longer amount of time to transfer the same amount of fluid in the outer concentric passageways relative to the inner concentric passageways, and rapid temperature changes in cold reactor coolant passageway 320 may therefore be mitigated.

INDUSTRIAL APPLICABILITY

In at least some exemplary embodiments of the disclosed nuclear reactor system, a reactor control method may be used having control cavities that enclose a moderator in a core of a reactor. In at least some exemplary embodiments, the moderator in the reactor may be divided into three areas: a core area that may be disposed anywhere in the reactor less than about 1 foot from any part of a fuel source, a reflector zone that may include any moderator outside of the core area but less than three or four feet from any part of a fuel source, and a moderator pool which may include any moderator outside of the core area and reflector zone. One function of the moderator in the core area is to slow the high speed neutrons emitted by the fissioning fuel to relatively slow speeds at which the neutrons are much more likely to cause new fissions. One function of the moderator in the reflector zone is to reflect neutrons that escape from the core area back into the core to decrease the number of neutrons which are lost from the reactor. The moderator in the moderator pool may have little effect on the reactor (e.g., the moderator may go to the moderator pool when it is displaced from the core moderator control cavities or may come from the moderator pool when the moderator returns to the core). In at least some exemplary embodiments, the disclosed control cavities may enclose most of the moderator in the reactor core area, and may be closed at the top but allow the free movement of moderator between the bottom of the control cavity and the reflector and moderator pool areas.

In at least some exemplary embodiments of the disclosed nuclear reactor system, when the disclosed nuclear reactor system is producing power at a steady rate, the fuel may be in a state of nuclear equilibrium and the control cavities may be in a state of thermal equilibrium. The two equilibrium states are coupled by negative feedback such that any change from equilibrium in one causes a change in the equilibrium of the other, which will act to counter the change in the first. The disclosed control cavities are provided with a moderator cooling system that cools the control cavities at about the same rate (or proportional to the volume of each control cavity if the control cavities are not all the same volume) by either pumping cool moderator into the control cavities, which mixes with the warmer moderator in the control cavity while an equal mass of the warmer moderator passes out of the control cavity into the reflector and moderator pool areas, or by passing cooler fluid through one or more tubes in the control cavity that then cool the control cavity by conduction. Heat may enter the control cavity by thermal conduction from the hot fuel tubes and by energy deposited in the moderator by fast neutrons and gamma radiation from the fuel. When more heat enters the control cavity than leaves the control cavity, the liquid moderator in the cavity evaporates and rises into a steam bubble at the top of the control cavity, while displacing liquid moderator out the bottom of the control cavity and reducing the total mass of moderator in the reactor core because the steam may be much less dense than the liquid moderator. When less heat enters the cavity than is extracted by the moderator cooling system, some of the steam in the steam bubble condenses, reducing the size of the steam bubble and drawing liquid moderator into the cavity from the reflector zone and moderator pool, thereby increasing the total mass of moderator in the core.

In at least some exemplary embodiments of the disclosed nuclear reactor system, high speed neutrons are emitted with each fission of an atom in the fuel. Most of these high speed neutrons may escape from the fuel into the moderator (along with gamma radiation emitted by the fuel) and are slowed by collisions with the moderator. These slower neutrons diffuse from the moderator back into the fuel. There, some of the slower neutrons may be absorbed by the fissile atoms in the fuel and cause new fissions, some may be absorbed by the fertile atoms in the fuel (e.g., uranium 238, plutonium 240, and/or thorium 232, if present) and create new atoms of fissile fuel, and some may be absorbed in the fuel without causing either fission or creation of new fissile atoms or may diffuse back into the moderator. The reaction rate may be stable when, on the average, exactly one neutron released by each fission causes a new fission. The probability that a neutron re-entering the fuel from the moderator will cause a fission decreases when the speed is relatively high, and the probability that the neutron will create new fuel increases when the speed is relatively high. Neutrons leaving the moderator may have a higher average speed when there is less moderator mass in the cavity, and may have a lower average speed when there is more moderator mass in the cavity. Accordingly, as the steam bubble increases in size (and therefore the mass of moderator in the cavity decreases), the average speed of the neutrons entering the fuel increases, which increases the number of neutrons that are effectively diverted from causing new fissions and decreases the number of neutrons that are diverted to the production of new fissile fuel. This effect lowers the fission rate, reducing the energy transferred to the moderator, reducing the size of the steam bubble, and thereby provides negative feedback that maintains a stable size of the steam bubble and maintains a fission rate that is stable and roughly proportional to the moderator cooling rate.

Collectively, in at least some exemplary embodiments of the disclosed nuclear reactor system, the control cavities maintain the total power output stable and proportional to the total moderator cooling rate. The moderator cooling rate may be controlled by keeping the moderator coolant temperature relatively constant and by varying the pumping rate to control the total cooling rate. Individually, each cavity may influence the fission rate of the fuel near it, which causes the reaction rate to be nearly the same at all points in the reactor instead of higher in the center of the core and lower near the edges of the core. This may minimize hot spots in the fuel and suppress xenon waves, leading to higher desirable rates of extraction of heat from the fuel.

During normal reactor operation in at least some exemplary embodiments of the disclosed nuclear reactor system, heat is extracted from the fuel tubes by the primary coolant. When the reaction rate is increased, the primary coolant pumping rate is also increased, so that the temperature of the fuel tubes does not vary with the reaction rate. Under abnormal conditions, the flow of primary coolant may be insufficient and the fuel tubes may become hotter. In such conditions, there may be more conduction of heat from the fuel tubes into the control cavities, which may increase the rate of evaporation of moderator in the control cavities and increase the size of the steam bubbles in the control cavities. This may cause liquid moderator to be displaced from the bottom of the cavities, reducing the average density of the moderator and increasing the average speed of neutrons diffusing from the moderator into the fuel, and thereby decreasing the fission rate.

In at least some exemplary embodiments of the disclosed nuclear reactor system, because the steam bubble in the control cavities may be very much less dense than the liquid moderator in the control cavities and the steam bubble may vary in size from substantially non-existent to nearly the size of the entire control cavity, the system may allow the average density of the moderator in the core to vary from the full density of the liquid moderator to less than 15% of the full density. This may allow control of the reactor under varying fuel reactivity conditions ranging from enriched new fuel with no xenon load to moderately-used fuel with an equilibrium xenon load to fuel with a high burnout and consequent high load of neutron absorbing fission byproducts. This may be achieved with substantially no loss of neutrons to control absorbers and provide substantially maximum production of new fissile fuel and a substantially maximum fuel conversion ratio at all points in the fuel life cycle.

The disclosed nuclear reactor system may be utilized in any application using nuclear-generated power. For example, the disclosed nuclear reactor system may be used in any application using steam ($H_2O$) generated by using power from a nuclear reaction. The operation described below may generally apply to an operation of all of the disclosed embodiments of nuclear reactor system 5. Additionally, as described below, some subsystems of the disclosed nuclear reactor system may be used in additional applications other than nuclear-generated power.

Referring to FIG. 3, an operation of nuclear reactor system 5 may be initiated when fuel is provided in fuel assembly 125, 125', 125a, or 125b having fuel tubes 135, 135', 135a, and/or 135b. When reactor 15 is started with fresh fuel in tubes 135, 135', 135a, and/or 135b, the level of moderator in control cavity array 130, 130', 130a, and/or 135b may stabilize at the equilibrium level based on the reactor design and reactivity of the fuel included in fuel tubes 135, 135', 135a, and/or 135b. Over an initial period (e.g., a few days), the levels of neutron-absorbing xenon-135 and samarium-149 rise to equilibrium levels, and the cooling rate of the moderator may be kept substantially constant by an operation of reactor coolant subsystem 25 (the general operation of reactor coolant subsystem will be described in more detail below). While reactor coolant subsystem 25 is operated to provide a constant rate of cooling of the moderator in control cavity array 130, 130', 130a, and/or 130b, the level of xenon and samarium in the fuel will rise and the reactivity of reactor 15 will drop slowly below one, causing the reaction rate to decrease and the energy deposited in the moderator to decrease so that some of the moderator steam condenses. Therefore, more moderator is drawn into control cavities 140, 140', 140a, and/or 140b, which raises the level of the moderator and the average moderator density. This will decrease the number of neutrons undergoing resonance capture, and thereby compensate for the neutrons that are absorbed by the gradually increasing amounts of neutron-absorbing xenon and samarium in the fuel of reactor 15. Thus, using control cavity array 130 as an example, the size of liquid zones 190 and 275 in control cavity array 130 may be increased, and the size of gaseous zones 185 and 280 in control cavity array 130 may be decreased. A similar effect occurs in the other disclosed embodiments.

If reactor 15 has a conversion ratio greater than one, or is fueled primarily with U235 and U238, during steady state operation there may be a period of time during which the reactivity of the fuel may increase either because more fissile fuel is created than used or because Pu239 is being created from U238 as U235 is burned (because Pu239 is more reactive than U235). If this occurs, the fission rate will rise while the cooling remains constant, more neutrons will deposit energy in the moderator, the rate of evaporation in control cavities 140, 140', 140a, and/or 140b will be greater than the rate of condensation, and liquid moderator will be displaced from control cavities 140, 140', 140a, and/or 140b by the excess steam moderator. This causes less moderation of the neutrons and an increase in the number of neutrons absorbed in the fertile U238 (or Th232), decreasing the number of thermal neutrons available to cause fission and reducing the reaction rate to the rate where as much energy is deposited in control cavities 140, 140', 140a, and/or 140b as is removed by reactor coolant subsystem 25. The level of liquid moderator will decrease gradually as long as the reactivity of the fuel continues to rise (e.g., over a period that may last from days to years). During this period, the fissile content of the fuel may increase, and may continue to increase into the next time period (discussed below).

Over the next time period (e.g., the next few months or years), as the fissile content of the fuel is decreased by burnout and the level of neutron-absorbing fission byproducts rises, the negative feedback mechanism of control cavities 140, 140', 140a, and/or 140b may operate to cause the level of moderator in control cavity array 130, 130', 130a, and/or 130b to rise very slowly to compensate for the reactivity of the fuel being decreased by burnout. Eventually, the moderator level will rise to the top of control cavity array 130, 130', 130a, and/or 130b, and reactor 15 will become subcritical and will stop producing power. Thus, using control cavity array 130 as an example, there will be substantially no gaseous zones 185 and 280 in control cavity array 130 at this time. A similar effect occurs in the other disclosed embodiments. When reactor 15 stops, the xenon-135 that has been produced thus far by reactor 15 continues to decay, so that in a relatively brief period of time (e.g., one or two days), enough xenon-135 will decay so that reactor 15 can be restarted again. When reactor 15 is restarted, reactor 15 may be run until the concentration of xenon-135 rises again in a relatively short period of time (e.g., a few days). Because the xenon-135 equilibrium concentration changes proportionally to the power level, operation of reactor 15 may continue for relatively longer durations as the power level of reactor 15 is reduced.

Following the initiation procedure described above, reactor 15 may be maintained at a steady state operation. In the steady state operation, energy is produced by fission of fuel atoms in fuel tubes 135, 135', 135a, and/or 135b. Most of this energy is deposited in the fuel rods disposed in the fuel tubes 135, 135', 135a, and/or 135b as heat, which is extracted from the fuel rods of fuel tubes 135, 135', 135a, and/or 135b by a flow of reactor coolant through fuel tubes 135, 135', 135a, and/or 135b that is provided by an operation of reactor coolant subsystem 25 and pump subsystem 30. Before continuing with the description of the steady state operation of reactor 15 and reactor core 100, the operation of reactor coolant subsystem 25 and pump subsystem 30 will be described.

Referring to FIGS. 2, 3, and 13, transfer subsystem 305 of reactor coolant subsystem 25 transfers reactor coolant between heat exchanger 20 and reactor core 100, 100', 100a, or 100b. Coolant pump 390 of pump subsystem 30 may pressurize a flow of reactor coolant in cold reactor coolant passageway 320 of transfer subsystem 305 to transfer cold reactor coolant from heat exchanger 20 to reactor 15. Cold reactor coolant flowing in passageway 320 may thereby flow through apertures of containment structure 85 and into reflector zone 95.

The cold reactor coolant flowing in cold reactor coolant passageway 320 may flow into passageways 330 of fuel coolant subsystem 310. The cold reactor coolant flowing in passageways 330 passes through fuel tubes 135, 135', 135a, and/or 135b to facilitate heat exchange with fuel tubes 135, 135', 135a, and/or 135b. Fuel tubes 135, 135', 135a, and/or 135b impart heat via heat transfer to the cold reactor coolant flowing through passageways 330, thereby turning the cold reactor coolant into hot reactor coolant. Thus, the reactor coolant leaves fuel tubes 135, 135', 135a, and/or 135b with more energy per pound than the reactor coolant had when entering fuel tubes 135, 135', 135a, and/or 135b, either by increasing the temperature of the reactor coolant or by changing the reactor coolant from a liquid to a gaseous state, or both. Passageways 330 may then transfer the hot reactor coolant to hot reactor coolant passageway 325 of transfer subsystem 305.

In the first described embodiment, some of the cold reactor coolant flowing in cold reactor coolant passageways 330 also flows into passageways 335 of moderator coolant subsystem 315. The cold reactor coolant flowing in passageways 335 passes through control cavities 140 to facilitate heat exchange with control cavities 140. The cold reactor coolant flowing in passageway 335 is heated somewhat by heat exchange by moderator confined within control cavities 140, and is transferred out of control cavities 140 via passageways 335 and back into passageways 330. The cold reactor coolant flowing in passageways 330 passes through reflecting pool 105. The cold reactor coolant flowing through passageways 330 is heated somewhat by heat exchange by the moderator of reflecting pool 105. The reactor coolant flowing in passageways 330 may then pass through fuel tubes 135 and thereby be heated from cold reactor coolant into hot reactor coolant. Passageways 330 may then transfer the hot reactor coolant to hot reactor coolant passageway 325 of transfer subsystem 305.

The reactor coolant flowing through passageway 335 of moderator coolant subsystem 315 may flow, for example, in the arrangement depicted in FIG. 14. Reactor coolant from cold reactor coolant passageway 320 of transfer subsystem 305 may flow into passageway 335 via intermediate passageway 330 and entry member 350. Reactor coolant then flows through channel 380 of interior member 355. Some of the reactor coolant may flow along a full length of channel 380 until reaching end portion 370. However, some of the reactor coolant may also flow directly from channel 380 into channel 385, via apertures 375, before reaching end portion 370. Because some of the relatively cold reactor coolant passes directly into channel 385 via apertures 375, and mixes with the relatively hot reactor coolant in channel 385, a temperature of the reactor coolant in channel 385 may remain relatively constant along the length of passageway 335. Sizes and/or spacings of apertures 375 may be designed to maximize the maintenance of a generally constant temperature in channel 385. For example, the amount of mixing of reactor coolant between channels 380 and 385 may increase in a direction moving toward end portion 370. The reactor coolant then flows through channel 385, and back into reactor coolant passageway 330 of transfer subsystem 305, via exit member 365.

Coolant pump 390 of pump subsystem 30 may pressurize a flow of cold reactor coolant in cold reactor coolant passageway 320 of transfer subsystem 305 through the fuel tubes 135, and a flow of hot reactor coolant from reactor 15 back to heat exchanger 20 via hot reactor coolant passageway 325.

Fission of the fuel in fuel tubes 135, 135', 135a, and/or 135b produces energetic higher speed neutrons (e.g., neutrons traveling at a relatively intermediate or high speed). These energetic higher speed neutrons deposit energy in the moderator of control cavity array 130, 130', 130a, and/or 130b by colliding with moderator atoms. The energetic higher speed neutrons are slowed to a low energy state ("slow neutrons") by these collisions with moderator atoms, and some of the slow neutrons then cause fission of the fuel atoms. The reactor may be considered stable (e.g., at a constant power production) when, for each fission of a fuel atom, one of the neutrons produced causes a new fission. Thus, the reactor may be considered stable when, on average, exactly one of the neutrons produced by the fission of a fuel atom causes a new fission.

As the moderator in control cavity array 130, 130', 130a, and/or 130b is heated by energetic neutrons, some of the moderator may evaporate into steam moderator (e.g., boil into a gaseous state). Steam moderator in the gaseous state is less dense than liquid moderator (e.g., in a liquid state) and will rise to the upper portion of control cavities 140, 140', 140a, and/or 140b in which it is confined because control cavities 140, 140', 140a, and/or 140b are closed at an upper portion and may therefore confine the moderator at an upper portion. Because the volumes of control cavities 140, 140', 140a, and/or 140b may be constant, low density gaseous steam moderator that is confined and that accumulates in upper portions of control cavities 140, 140', 140a, and/or 140b will displace higher density liquid moderator out of the lower portions of control cavities 140, 140', 140a, and/or 140b. Thus, the overall average density of the moderator in control cavities 140, 140', 140a, and/or 140b is reduced. To keep substantially all of the moderator in control cavities 140, 140', and 140a from turning into steam moderator, control cavities 140, 140', 140a, and/or 140b are cooled by reactor coolant subsystem 25. Reactor coolant subsystem 25 may cause some of the gaseous steam moderator to condense into the denser liquid moderator. Less steam moderator will therefore be confined in the upper portions of control cavities 140, 140', 140a, and or 140b, so less relatively high density liquid moderator will be displaced out of control cavities 140, 140', 140a, and/or 140b. Accordingly, liquid moderator will flow back into control cavities 140, 140', 140a, and/or 140b through the open lower portions and/or side portions of control cavities 140, 140', 140a, and/or 140b.

Referring to FIGS. 7 and 8 and using control cavity array 130 as an example, reactor coolant subsystem 25 may remove less energy by heat transfer from the moderator confined in control cavity array 130. Accordingly, an increasing amount of moderator will be heated by energetic neutrons into steam moderator. Thus, as an increasing amount of steam moderator is confined and accumulates in upper portions of control cavities 140, boundary 195 will drop as an increasing amount of liquid moderator is displaced out of control cavities 140 (e.g., displaced under intermediate member 170 and end member 165). Thus, gaseous zone 185 will increase in size, and liquid zones 190 will decrease in size. Similarly in cone assembly 150, as reactor coolant subsystem 25 removes less energy by heat transfer, an increasing amount of steam moderator is confined and accumulates in upper portions of inner cone assemblies 200 and outer cone assemblies 205. Thus, boundary 290 will drop as an increasing amount of liquid moderator is displaced out of inner cone assemblies 200 and outer cone assemblies 205 (e.g., displaced under interior cone 235 and exterior cone 240). Thus, gaseous zone 280 will increase in size, and liquid zones 190 and 275 will decrease in size. A similar effect occurs in the other disclosed embodiments of reactor 15.

The converse effect also occurs. Again using control cavity array 130 as an example, reactor coolant subsystem 25 may remove more energy by heat transfer from the moderator confined in control cavity array 130. Accordingly, a decreasing amount of moderator will be heated by energetic neutrons into steam moderator. Thus, as a decreasing amount of steam moderator is confined and accumulates in upper portions of control cavities 140, boundary 195 will rise as liquid moderator re-enters control cavities 140 (e.g., re-enters under intermediate member 170 and end member 165). Thus, gaseous zone 185 will decrease in size, and liquid zone 190 will increase in size. Similarly in cone assembly 150, as reactor coolant subsystem 25 removes more energy by heat transfer, a decreasing amount of steam moderator is confined and accumulates in upper portions of inner cone assemblies 200 and outer cone assemblies 205. Thus, boundary 290 will rise as an increasing amount of liquid moderator re-enters inner cone assemblies 200 and outer cone assemblies 205 (e.g., re-enters under interior cone 235 and exterior cone 240). Thus, gaseous zone 280 will decrease in size, and liquid zones 190 and 275 will increase in size. Steam moderator may also condense along the sides of control cavities 140 and drip back into liquid zones 190 and 275. A similar effect occurs in the other disclosed embodiments of reactor 15.

When reactor coolant subsystem 25 operates to extract substantially as much energy from control cavity arrays 130, 130', 130a, and/or 130b as is deposited from the fuel in fuel tubes 135, 135', 135a, and/or 135b, the rate of evaporation and the rate of condensation in control cavities 140, 140', 140a, and/or 140b will be substantially equal, and the size of gaseous zones 185, 185', 185a, 280, and/or 185b will remain substantially constant. Thus, there will be substantially no movement of moderator into or out of control cavities 140, 140', 140a, and/or 140b.

The higher speed neutrons may be slowed by collisions with moderator atoms when the moderator atoms are either in the liquid state (liquid moderator) or the gaseous state (steam moderator). When the average density of the moderator is decreased (e.g., by increasing a size of gaseous zones 185, 185', 185a, 280, and/or 185b), an average distance between moderator atoms is increased and an average distance that the neutrons must travel between collisions is increased. When the higher speed neutrons travel further between each collision they spend more time at the higher speeds and so the average number of neutrons traveling at relatively high and intermediate speeds is greater. While slow neutrons may have a relatively high probability of causing fission when they collide with fuel atoms disposed in fuel tubes 135, 135', 135a, and/or 135b, higher speed neutrons may have a relatively higher probability of being absorbed within reactor 15 without causing fission. Accordingly, the number of slow neutrons available to cause fission will decrease.

When reactor 15 operates at a steady state operation level, reactor coolant subsystem 25 may operate to maintain gaseous zones 185, 185', 185a, 280, and/or 185b at a desired substantially constant size. This desired size of gaseous zones 185, 185', 185a, 280, and/or 185b may provide a desired density of moderator within control cavity array 130, 130', 130a, and/or 130b so that just enough higher speed neutrons will be absorbed at intermediate and high speeds so that there are a desired amount of remaining slow neutrons traveling at relatively slow speeds to cause one new fission for each old fission in fuel assemblies 125, 125', 125a and 125b.

Gaseous zones 185, 185', 185a, 280, and/or 185b may be maintained at a desired substantially constant size by using negative feedback. As described above, reactor coolant subsystem 25 may be controlled to substantially match the cooling rate of reactor core 100, 100', 100a and 100b (e.g., by controlling the flow of coolant through control cavity arrays 130, 130', 130a, and/or 130b) with the fission rate (and thereby the heating rate of heat imparted into moderator in control cavity arrays 130, 130', 130a, and/or 130b by fission in fuel assemblies 125, 125', 125a and 125b) of reactor core 100, 100', 100a and 100b. If the heating rate of heat imparted into control cavity arrays 130, 130', 130a, and 130b by fission in fuel assembly 125, 125', 125a and 125b is higher than the cooling rate provided by reactor coolant subsystem 25, gaseous zones 185, 185', 185a, 280, and/or 185b will expand. The expansion of gaseous zones 185, 185', 185a, 280, and/or 185b decreases the average density of the moderator in control cavity arrays 130, 130', 130a, and/or 130b, which increases the percentage of neutrons lost by absorption at intermediate and high speeds (resonance capture), thus decreasing the percentage of slow neutrons available to cause fission, which decreases the heating rate of reactor 15. If the heating rate is lower than the cooling rate, gaseous zones 185, 185', 185a, 280, and/or 185b will shrink, increasing the average density of the moderator in control cavity arrays 130, 130', 130a, and/or 130b, decreasing the percentage of neutrons lost by resonance capture, thus increasing the percentage of slow neutrons available to cause fission, which increases the heating rate. Thus, reactor 15 is controlled to cause the reaction rate to follow the cooling rate of control cavity array 130, 130', 130a, and/or 130b by reactor coolant subsystem 25. Accordingly, increasing or decreasing the cooling rate of control cavity array 130, 130', 130a, and/or 130b will cause a corresponding increase or decrease in the total power output of reactor 15. Because the amount of energy deposited in the moderator may be only a small percentage (e.g., between about 1% and about 5%, such as, for example, about 3%) of the total energy produced by reactor 15, only a relatively small amount of energy (and corresponding heat) of the total energy produced by reactor 15 is adjusted by a relatively small cooling rate (relative to the total energy produced by reactor 15) to maintain control of reactor 15. Thus, controlling a relatively small cooling rate allows simple and stable control of a total power output of reactor 15 that is, for example, about 30 times greater than the amount of heat and energy that is imparted to the moderator (and that is controlled by adjusting the cooling rate).

Solely to illustrate a comparison between a relatively large total power output of reactor 15 and the relatively small amount of energy imparted to a moderator, an example of a reactor for powering a 1000 Megawatt electric power generator may be considered. The total energy produced by the exemplary power generator may be about 10,000,000,000 BTU/hour when the generator is running at full power. If the moderator is heavy water ($D_2O$) at a temperature of around 540 degrees Fahrenheit, the reactor core may contain, for example, around 100 tons of moderator. Assuming that 3% of the total energy produced by the reactor is deposited in the core moderator, then the amount of energy imparted to the moderator may be around 300,000,000 BTU/hour or 1,500 BTU/hour per pound of moderator. At this rate, even if there were no cooling provided, it may take about 25 minutes to boil away each pound of moderator. Because gaseous steam moderator may be about 20 times less dense than liquid moderator at this exemplary temperature, it may take about a minute to boil enough moderator to displace the remainder of the pound of liquid moderator from control cavities 140, 140', 140a, and/or 140b in this example. This example is purely provided to show the relative amount of energy imparted to moderator. The disclosed method and apparatus may be used in any type or size of nuclear reactor system.

Reactor 15 may provide energy from a nuclear reaction to power generation subsystem 10 at any suitable time during its operation. An example of how reactor 15 powers power generation subsystem 10 will now be provided, using steady state operation as an illustrative example. Reactor 15 may also similarly power generation subsystem 10 during other phases and operation states of nuclear reactor system 5.

Referring to FIGS. 1 and 13, coolant pump 390 pressurizes a flow of reactor coolant through cold reactant cooler passageway 320 and hot reactor coolant passageway 325 of reactor coolant subsystem 25. Reactor coolant subsystem 25 thereby transports hot reactor coolant to the steam generators disposed in heat exchanger 20 via hot reactor coolant passageway 325. The hot reactor coolant flowing through the steam generator tubes boils water ($H_2O$), which was delivered to heat exchanger 20 by turbine steam subsystem 65 (as explained further below), via heat transfer. While passing through heat exchanger 20, reactor coolant flowing through hot reactor coolant passageway 325 is cooled through heat transfer between the reactor coolant and water ($H_2O$) in heat exchanger 20. The cooled reactor coolant is then subsequently returned to reactor 15 via cold reactant coolant passageway 320 of reactor coolant subsystem 25. Reactor coolant subsystem 25 continuously repeats this cycle, transferring a desired amount of hot reactor coolant, which has been heated by reactor 15, to heat exchanger 20 and then subsequently returning the cooled reactor coolant to reactor 15. The high pressure steam ($H_2O$) generated by the steam generators of heat exchanger 20 is then transferred to turbine 45 via passageway 70 of turbine steam subsystem 65 (of power generation subsystem 10), based on a flow of steam ($H_2O$) and water ($H_2O$) produced by $H_2O$ pump 395. $H_2O$ pump 395 pressurizes a flow of steam ($H_2O$) and water ($H_2O$) in heat exchanger 20, passageway 70, passageways of turbine 45, passageway 75, turbine cooling subsystem 60, and passageway 80.

Turbine 45 converts the high pressure steam ($H_2O$) that is delivered by passageway 70 of turbine steam subsystem 65 into mechanical energy. For example, the steam ($H_2O$) urges the plurality of elements mounted on the exemplary rotatable shaft of turbine 45 described above, and expands through the series of exemplary cylinders described above to drive the shaft of turbine 45. This operation of turbine 45 merely illustrates one of any suitable methods for producing mechanical energy from steam ($H_2O$). The mechanical energy of the exemplary shaft of turbine 45 is then mechanically transferred to drive assembly 50 of power generation subsystem 10.

Drive assembly 50 then mechanically transfers the imparted mechanical energy to generator 55 of power generation subsystem 10 via the exemplary driveshaft assembly described above or via any other suitable mechanical connection. Drive assembly 50 may thereby drive generator 55 to produce electricity. As one example, generator 55 generates AC electricity at any suitable frequency such as, for example, 50 Hz (50 cycle) or 60 Hz (60 cycle) power. The electricity from generator 55 is then provided via conventional transfer techniques to a power grid or any other site or activity that uses electricity.

Passageway 75 of turbine steam subsystem 65 transfers surplus or dead steam ($H_2O$) from turbine 45 to turbine cooling subsystem 60 of power generation subsystem 10. Turbine cooling subsystem 60 uses any suitable technique such as, for example, using condensers, cooling towers, forced airflow, and/or once-through cooling to condense steam ($H_2O$) into water ($H_2O$). The relatively cold water ($H_2O$) is then transferred from turbine cooling subsystem 60 to heat exchanger 20 via passageway 80.

The relatively cold water ($H_2O$) delivered to heat exchanger 20 via passageway 80 of turbine steam subsystem 65 enters heat exchanger 20. Some of the relatively cold water ($H_2O$) enters the lower interior portion of heat exchanger 20 and some of the relatively cold water ($H_2O$) enters heat exchanger 20 at the central and/or upper portion of heat exchanger 20. The relatively cold water ($H_2O$) entering the lower interior portion is heated and is boiled by heat transfer with the hot reactor coolant transferred into heat exchanger 20 via hot reactor coolant passageway 325 of reactor coolant subsystem 25. The relatively cold water ($H_2O$) entering at the upper portion is injected into the lower interior portion of heat exchanger 20 via the plurality of nozzles 83 disposed at the central and/or upper portion of heat exchanger 20, on interior walls of heat exchanger 20. The plurality of nozzles 83 inject the water ($H_2O$) into the boiling water ($H_2O$) already contained within the interior portion of heat exchanger 20. The relatively cold water ($H_2O$) mixes with the boiling water ($H_2O$) to help reduce the magnitude of the temperature gradient of $H_2O$ contained inside heat exchanger 20.

The above exemplary illustration of transfer of water ($H_2O$) to heat exchanger 20 is provided merely as an example, and any suitable known technique for heat exchange may be used in heat exchanger 20.

The above-described process of using energy from a nuclear reaction in reactor 15 to produce steam ($H_2O$) in heat exchanger 20, using the steam ($H_2O$) to drive turbine 45, and driving generator 55 by turbine 45 is continuously repeated to produce a desired amount of electricity. Similarly, the process of condensing steam ($H_2O$) into water ($H_2O$) and returning the water ($H_2O$) to heat exchanger 20 is continuously repeated as desired. Thus, this process is repeated continuously as desired as reactor 15 powers power generation subsystem 10 to produce energy such as, for example, electricity.

As nuclear reactor system is operated in a steady state operation, power demands may fluctuate. Power demands may fluctuate on a daily basis. Depending on the time of the day or during the night, average power demands may change (e.g., power demands may be lower in the middle of the night on a weeknight as compared with during a weekday morning or a night during the weekend). Controller 540 of reactor control subsystem 40 may be operated to vary a power output of nuclear reactor system 5. Controller 540 may be operated to control reactor control subsystem 40 and pump subsystem 30 to vary a cooling rate of reactor coolant and or moderator coolant in reactor 15, thereby varying a power output of nuclear reactor system 5 by using negative feedback.

When it is desired for nuclear reactor system 5 to generate a greater amount of power, controller 540 is operated to control reactor control subsystem 40 and pump subsystem 30 to increase a cooling rate of moderator in reactor 15 so that the cooling rate of moderator is greater than the heating rate of the moderator by fuel tubes 135, 135', 135a, and/or 135b. Controller 540 controls coolant pump 390 to cause a relatively greater amount of reactor coolant to flow through reactor 15. If the cooling rate provided by reactor coolant subsystem 25 to the moderator in control cavity arrays 130, 130', 130a, and/or 130b is greater than the heating rate of heat imparted into moderator in control cavity array 130, 130', 130a, and/or 130b by fission in fuel assembly 125, 125', and 125a, gaseous zones 185, 185', 185a, 280, and/or 185b will shrink. The shrinking of gaseous zones 185, 185', 185a, 280, and/or 185b increases the average density of the moderator in control cavity arrays 130, 130', 130a, and/or 130b, which decreases the percentage of neutrons lost by resonance capture, thus increasing the percentage of slow neutrons available to cause fission, and increasing the heating rate of reactor 15. By increasing the heating rate of reactor 15, a greater amount of heat will be imparted into the reactor coolant flowing in hot reactor coolant passageway 325, and a greater amount of heat will therefore be transferred by reactor coolant subsystem 25 into heat exchanger 20. Heat exchanger 20 will thereby produce a greater amount of steam ($H_2O$), and a greater amount of steam ($H_2O$) will be transferred from heat exchanger 20 to turbine 45 via passageway 70. Controller 540 is also operated to cause $H_2O$ pump 395 to cause a greater flow of steam ($H_2O$) to be transferred to turbine 45. The greater amount of steam ($H_2O$) will cause turbine 45 to produce a greater amount of mechanical energy, which when transferred from turbine 45 to generator 55 via drive assembly 50, will cause generator 55 to produce a relatively greater amount of power (e.g., electricity).

When it is desired for nuclear reactor system 5 to generate a lesser amount of power, controller 540 is operated to control reactor control subsystem 40 and pump subsystem 30 to decrease a cooling rate of moderator in reactor 15 so that the cooling rate of moderator is less than the heating rate of the moderator by fuel tubes 135, 135', 135a, and/or 135b. Controller 540 controls coolant pump 390 to cause a relatively lesser amount of reactor coolant to flow through reactor 15. If the cooling rate provided by reactor coolant subsystem 25 to the moderator in control cavity arrays 130, 130', 130a, and/or 130b is less than the heating rate of heat imparted into moderator in control cavity array 130, 130', 130a, and/or 130b by fission in fuel assembly 125, 125', and 125a, gaseous zones 185, 185', 185a, 280, and/or 185b will expand. The expansion of gaseous zones 185, 185', 185a, 280, and/or 185b decreases the average density of the moderator in control cavity arrays 130, 130', 130a, and/or 130b, which increases the percentage of neutrons lost by resonance capture, thus decreasing the percentage of slow neutrons available to cause fission, and decreasing the heating rate of reactor 15. By decreasing the heating rate of reactor 15, a lesser amount of heat will be imparted into the reactor coolant flowing in hot reactor coolant passageway 325, and a lesser amount of heat will therefore be transferred by reactor coolant subsystem 25 into heat exchanger 20. Heat exchanger 20 will thereby produce a lesser amount of steam ($H_2O$), and a lesser amount of steam ($H_2O$) will be transferred from heat exchanger 20 to turbine 45 via passageway 70. Controller 540 is also operated to cause $H_2O$ pump 395 to cause a lesser flow of steam ($H_2O$) to be transferred to turbine 45. The lesser amount of steam ($H_2O$) will cause turbine 45 to produce a lesser amount of mechanical energy, which when transferred from turbine 45 to generator 55 via drive assembly 50, will cause generator 55 to produce a relatively lesser amount of power (e.g., electricity).

The shrinking and/or expansion of gaseous zones 185, 185', 185a, 280, and/or 185b may be very gradual and/or slight and still provide sufficient control of nuclear reactor system 5. So, even a small change in the volume of gaseous zones 185, 185', 185a, 280, and/or 185b may provide a large enough difference to affect resonance capture and to sufficiently control reactor 15 by negative feedback.

The operation of reactor core 100b may generally follow the operation of reactor cores 100, 100', and 100a described above. As depicted in FIGS. 12I, 12J, and 12K, reactor 100b provides additional features for confining moderator in control cavity array 130b that may be used with, for example, a higher percentage of fast fission.

As illustrated in FIGS. 12I, 12J, and 12K, relatively cool moderator is free to move from reflecting pool 105 and into moderator coolant inflow tube 335b. Moderator disposed in moderator coolant inflow tube 335b is then free to move into control cavities 140b via holes 336b, thereby cooling moderator in control cavities 140b. A substantially equal volume of warmer moderator moves out of control cavity 140b and into moderator outflow tube 337b via holes 338b. Moderator in moderator outflow tube 337b is free to move from moderator outflow tube 337b into reflector zone 95. Because control cavities 140b have closed upper portions, moderator may not be free to move between the upper portions of control cavities 140b and reflector zone 95.

Referring to FIG. 12N, the disclosed embodiment may operate when, for example, moderator is cooled by circulation of relatively cool moderator through and into reflecting pool 105 and/or control cavity 140b (and/or 140' and/or 140a). The embodiment of FIG. 12N may operate based on the stability of the pressure of steam moderator at substantially all points in the system, and stability of the height of boundary 115 disposed at the top of reflecting pool 105 above fuel rods 127b (and/or similar fuel rods disposed in reactor core 100' and 100a). Moderator coolant tube 327b (and/or similar moderator coolant tubes disposed in reactor core 100' and 100a) allows the flow of moderator from reflector zone 95 and control cavities 140b (and/or control cavities 140' and/or 140a) into moderator heat exchange tubes 390b that pass through tank 377b to passageway 355b and moderator coolant pump 350b. The moderator cooling rate may be, for example, the pump flow rate multiplied by the difference in temperature between the water ($H_2O$) temperature in tank 377b and the moderator temperature in reflecting pool 105. Because the temperature difference may be maintained at a constant level, the moderator control cavity cooling rate and thus the reactor total power output are proportional to the pump flow rate. Thus, an improper operation of moderator coolant pump 350b and/or a disruption of pump power will shut down the reaction in reactor 15. The cooled moderator flows from moderator coolant pump 350b via passageway 322b (and/or similar passageway disposed in reactor cores 100' and/or 100a) to moderator coolant inflow tubes 335b (and/or similar tubes disposed in reactor cores 100' and/or 100a). A condenser and differential flow portion similar in form and function to condenser 570 and differential flow portion 675 of load-following subsystem 515 may be inserted into passageway 322b adjacent to pump 350b.

The operation of reactor control subsystem 40 will now be described, beginning with a description of an exemplary operation of load-following subsystem 515. The operation of reactor control subsystem is controlled via controller 540 of control subsystem 510.

As illustrated in FIG. 20, gate 545 of load-following subsystem 515 selectively reduces a flow of steam ($H_2O$) from heat exchanger 20 to turbine 45 via passageway 70 by diverting steam ($H_2O$) from passageway 70 into passageway 555. To divert steam ($H_2O$) into passageway 555, gate 545 is moved from the closed position to the partially open position or the fully open position. When gate 545 is in the closed position, substantially all of the flow of steam ($H_2O$) flows from passageway 70 to turbine 45. When gate 545 is moved to the partially open position, (e.g. when the desired flow of steam to turbine 45 must decrease to meet a lower electrical power demand) the excess steam ($H_2O$), which is proportional to the amount by which gate 545 is opened, flows from passageway 70 into passageway 555. Thus, the operation of gate 545 controls the amount of steam ($H_2O$) that is diverted from passageway 70 into passageway 555. An operation of gate 550, which is similar to the operation of gate 545, controls an amount steam ($H_2O$) that is diverted from passageway 555 into passageway 560. Steam ($H_2O$) that flows into passageway 560 is transferred directly to turbine cooling subsystem 60 via passageway 560. Thus, an operation of gate 550 controls the amount of flow of steam ($H_2O$) that bypasses turbine 45 and is transferred directly to turbine cooling subsystem 60. Depending on its position, and operating similarly to gate 545, gate 550 may divert substantially all flow, substantially no flow, or some flow of steam ($H_2O$) from passageway 555 to turbine cooling subsystem 60 via passageway 560. When a rapid shut-down of turbine 45 is desired, gate 545 is moved to the open position to transfer substantially all flow of steam ($H_2O$) from passageway 70 into passageway 555, and gate 550 is moved to the open position to transfer substantially all flow of steam ($H_2O$) from passageway 555 into passageway 560. Thus, substantially all flow of steam ($H_2O$) from heat exchanger 20 is diverted to turbine cooling subsystem 60, facilitating the rapid shut-down of turbine 45.

The steam ($H_2O$) flowing through passageway 555, which is not diverted to turbine cooling subsystem 60 via passageway 560, flows to condenser 570 via passageway 565 or may flow to a similar condenser (not shown) in passageway 322b, as depicted in FIG. 12N. Because of heat exchange between the steam ($H_2O$) disposed in condenser 570 and cold reactor coolant flowing through cold reactor coolant passageway 320, some or substantially all of the steam ($H_2O$) disposed in condenser 570 condenses into water ($H_2O$). Valve 575 operates to allow water ($H_2O$) to flow out of condenser 570 while substantially blocking a flow of steam ($H_2O$) out of condenser 570. Water ($H_2O$) then flows from condenser 570 to heat exchanger 585 via passageway 580. Heat exchanger 585 cools a temperature of the water ($H_2O$) to a desired temperature (e.g., a substantially same temperature as the water ($H_2O$) being transferred by passageway 80 of turbine steam subsystem 65). Passageway 590 then transfers water ($H_2O$) from heat exchanger 585 to passageway 80 via junction 595. Passageway 80 then transfers the water ($H_2O$) to an inlet of pump 395 of pump subsystem 30.

Therefore, load-following subsystem 515 allows control of turbine 45 by adjusting gate 545 to direct more or less of the steam ($H_2O$) from heat exchanger 20 to pass through turbine 45 as power demand fluctuates. In some cases of normal operation, the excess steam ($H_2O$) is used to pre-heat the input feedstock from turbine cooling subsystem 60 to heat exchanger 20. Also, some of the excess steam ($H_2O$) may be used to heat primary moderator control cavity coolant via a heat exchanger (e.g., a small heat exchanger) disposed in passageway 322b or passageway 320, thus reducing the cooling of control cavities 140, 140', 140a, and/or 140b and the reactor power output when the amount of excess steam ($H_2O$) increases (or increasing the power output when the amount of excess steam ($H_2O$) decreases).

An exemplary operation of bypass subsystem 520 will now be described. Pump 600 is controlled by controller 540 to selectively pressurize reactor coolant in passageway 605 to pump reactor coolant from hot reactor coolant passageway 325 into cold reactor coolant passageway 320, thereby bypassing heat exchanger 20 and pump 390. Thus, pump 600 and passageway 605 allow relatively hot reactor coolant flowing through hot reactor coolant passageway 325 to bypass heat exchanger 20 and flow directly into cold reactor coolant passageway 320, thereby allowing hot coolant to mix with the relatively cold coolant and raise the temperature of the coolant flowing in cold reactor coolant passageway 320 at desired times during operation of reactor 15 (e.g., during a shutdown, low power operation, and/or initial reactor coolant loading).

Therefore, bypass subsystem 520 allows a relatively small amount of primary coolant to be forced from the normal coolant path, bypassing heat exchanger 20 and/or reactor core 100, 100', 100a, and/or 100b. Bypass subsystem 520 may operate when coolant pump 390 and/or $H_2O$ pump 395 are driven by a single motor, and proportional amounts of fluid are pumped through transfer subsystem 305 to balance the amount of heat entering heat exchanger 20 via the hot reactor coolant passageway 325 and the amount of heat leaving heat exchanger 20 via steam ($H_2O$) flow through passageway 70 to turbine 45 during normal operation. At low power, significant temperature deviations may occur (e.g., larger temperature deviations than at full power), and these temperature deviations may change the flow ratio between a primary coolant flow rate through hot reactor coolant passageway 325 and a turbine feedstock flow rate through passageway 70 away from a desired flow ratio. The operation of bypass subsystem 520 compensates for these temperature deviations and maintains the flow ratio between a primary coolant flow rate through hot reactor coolant passageway 325 and a turbine feedstock flow rate through passageway 70 at a desired flow ratio. In responding to these temperature deviations, pump 600 may operate at a relatively low capacity. For example, the capacity of pump 600 may be 3% of the capacity of pump 390 at full power, which may correspond to 30% of the capacity of pump 390 at 10% power, which may be enough capacity for pump 600 to compensate for a significant imbalance in desired flow ratio. Pump 600 may also operate in situations when it is not desirable to run any turbine feedstock through passageway 70 to turbine 45, but it is desirable to maintain a small flow of primary reactor coolant through reactor core 100, 100', 100a, and/or 100b (e.g., at reactor startup to bring reactor core 100, 100', 100a, and/or 100b uniformly up to operating temperature).

An exemplary operation of moderator stabilization subsystem 525 will now be described. During normal operation of reactor 15, valve 615 is in a closed position, substantially blocking flow of steam moderator from steam area 110 of reflector zone 95 into reservoir 625 via passageway 610. When controller 540 controls valve 615 to open, steam moderator flows from steam area 110 into reservoir 625 via passageway 610. Upon entering reservoir 625 via passageway 610, the steam moderator condenses on relatively cold surfaces of interior walls of reservoir 625. Valve 615 may be open when a rapid shutdown of the reactor is desired. Steam moderator flowing through passage 610 also flows into condenser 635 via passageway 630. Because of heat exchange with relatively cold water ($H_2O$) flowing through passageway 80, steam moderator disposed in condenser 635 condenses into liquid moderator. Pump 645 selectively pressurizes a flow of liquid moderator in passageways 640 and 650, thereby pumping condensed liquid moderator back into reactor 15, e.g., into steam area 110. The condensed liquid moderator transferred into steam area 110 via passageway 650 causes additional steam moderator in steam area 110 to condense, and reduces a temperature of moderator in reflector zone 95. Pump 645 may be operated at a flow rate that maintains a constant steam pressure in steam area 110 and reflector zone 95. This function is also served by steam pressure control valve 380b, depicted in FIG. 12N.

Therefore, moderator stabilization subsystem 525 operates to condense excess steam moderator and pump it back into reflecting pool 105 when a pressure of the steam moderator in steam area 110 rises above a desired value. Maintaining the pressure of steam moderator in steam area 110 at a desired pressure range provides for a normal operation of control cavities 140, 140', 140a, and/or 140b, because moderator stabilization subsystem 525 operates to maintain stability of the steam pressure in steam zone 110, to maintain stability of a temperature of the steam moderator near boundary 115 of reflector zone 95, and to maintain stability of a temperature of liquid moderator near boundary 115 of reflector zone 95.

An exemplary operation of reactor coolant stabilization subsystem 530 will now be described. Substantially free passage of reactor coolant between reservoir 655 and hot reactor coolant passageway 325 occurs via passageway 665. Heating element 660 selectively heats reservoir 655 to maintain the reactor coolant stored within reservoir 655 at a desired temperature and/or pressure when the pressure drops below the desired value. When the pressure rises above a desired value, cold reactor coolant from cold reactor coolant passageway 320 is selectively injected into reservoir 655 by a pump (not shown). The relatively cold reactor coolant sprayed into reservoir 655 condenses a portion of the steam reactor coolant in reservoir 655, thereby selectively reducing a pressure in reservoir 655 and hot reactor coolant passageway 325.

Referring to FIGS. 15 and 20, an exemplary operation of differential flow subsystem 535 will now be described. Because portions of each area (e.g., area A1, A2, A3, and/or A4) at the entry and exit ends of each successive concentric passageway 670 may be blocked, a substantially same flow rate in each of the concentric passageways 670 is maintained through the portions of cold reactor coolant passageway 320 in which concentric passageways 670 are disposed. Thus, because the areas of the concentric passageways may vary, the time for fluid to traverse the different concentric passageways may vary, and rapid temperature changes in cold reactor coolant passageway 320 are spread out over time.

Nuclear reactor system 5 may operate over any suitable time period such as, for example, a period of years or of decades of continuous operation. As nuclear reactor system operates over this period of years or decades, a size of gaseous zones 185, 185', 185a, 185b, 280, and/or 185b will be caused to gradually shrink and substantially disappear toward the end of the operation time period. Gaseous zones 185, 185', 185a, 185b, 280, and/or 185b will be caused to shrink and eventually substantially disappear because the amount of fissile content of the fuel in fuel tubes 135, 135', 135a, and/or 135b will decrease over time, and thus a higher density of moderator in control cavity arrays 130, 130', 130a, and/or 130b will be used to compensate for decreased fissile content and to maintain a desired fission rate. Gaseous zones 185, 185', 185a, 185b, 280, and/or 185b will also be caused to shrink and eventually substantially disappear because neutron-absorbing fission by-products will continuously accumulate over the period of operation of nuclear reactor system 5. Accordingly, gaseous zones 185, 185', 185a, 185b, 280, and/or 185b will also be caused to shrink and eventually substantially disappear because of the increase in neutron-absorbing fission by-products over time, and thus a higher density of moderator in control cavity arrays 130, 130', 130a, and/or 130b will also be used to compensate for increased neutron capture and to maintain a desired fission rate.

Over time, after gaseous zones 185, 185', 185a, 185b, 280, and/or 185b have been caused to substantially disappear, the amount of fissile content of the fuel in fuel tubes 135, 135', 135a, and/or 135b may eventually become small enough and/or the amount of neutron-absorbing fission by-products produced in reactor 15 will eventually become large enough so that reactor 15 becomes sub-critical and the fission rate in nuclear reactor system 5 may become insignificant. Thus, reactor 15 will shut down. At this point, new fuel may be provided to reactor 15, or reactor 15 may be operated for brief periods after shut-down following xenon decay.

Nuclear reactor system 5 may also be shut down, if desired, prior to the shut-down at the end of the operation time period described above. Nuclear reactor system may be intentionally shut down by reactor control subsystem 40. In the case of intentional shut-down, the operation of reactor coolant subsystem 25 may be controlled to supply a relatively small amount or substantially no reactor coolant and/or moderator coolant to reactor 15. In this case, the moderator in control cavity arrays 130, 130', 130a, and/or 130b will become very hot, causing gaseous zones 185, 185', 185a, 185b, 280, and/or 185b to expand to fill substantially all of control cavities 140, 140', 140a, and/or 140b. As described above, when gaseous zones 185, 185', 185a, 185b, 280, and/or 185b fill substantially all of control cavities 140, 140', 140a, and/or 140b, the average density of the moderator in control cavity arrays 130, 130', 130a, and/or 130b decreases. This decrease in moderator density increases the percentage of neutrons lost by absorption at intermediate and high speeds (resonance capture), thus decreasing the percentage of slow neutrons available to cause fission, which decreases the heating rate of reactor 15. Accordingly, if the flow of reactor coolant and moderator coolant to reactor 15 remains small or substantially stopped, gaseous zones 185, 185', 185a, 185b, 280, and/or 185b will continue to fill substantially all of control cavities 140, 140', 140a, and/or 140b, and reactor 15 will shut down. Similar to intentional shut-down, if reactor coolant subsystem 25 does not operate properly and does not provide reactor coolant and/or moderator coolant to reactor 15, gaseous zones 185, 185', 185a, 185b, 280, and/or 185b will expand to fill substantially all of control cavities 140, 140', 140a, and/or 140b, and reactor 15 will eventually shut down on its own in the same manner as described above for intentional shut-down.

The operation of auxiliary coolant subsystem 35 will now be described, beginning with a description of an exemplary operation of convection loop subsystem 410.

Referring to FIG. 16, junctions 425 and 455 may be configured so that at substantially full coolant flow (full power operation) the pressure A in passageway 430 and the pressure B in junction 455 oppose and balance each other so that there is substantially no fluid flow through passageways 430, 435, 440, and 445, merging portion 450, and junction 455. If coolant pump 390 stops pumping cold reactor coolant through cold reactor coolant passageway 320, through reactor core 100, 100', 100a, and/or 100b, and out hot reactor coolant passageway 325 to heat exchanger 20, then hot reactor coolant exiting reactor core 100, 100', 100a, and/or 100b may flow into passageway 430 of convection loop subsystem 410 at junction 425. The hot reactor coolant flows downward via passageway 430, below an elevation of the top surface of reflecting pool 105. The hot reactor coolant then flows upward from passageway 430 into passageway 435, and then toward containment structure 85 and pressure vessel 90 via the plurality of passageways 440. The hot reactor coolant flows from the plurality of passageways 440 into the corresponding plurality of passageways 445. The hot reactor coolant flows through the plurality of passageways 445, imparting heat by heat exchange to pressure vessel 90. The reactor coolant flows via the plurality of passageways 445 to a position near or below the bottom of reactor core 100, 100', 100a, and/or 100b. The reactor coolant then flows into cold reactor coolant passageway 320 via junction 455. Reactor coolant entering cold reactor coolant passageway 320 then enters reactor core 100, 100', 100a, and/or 100b. After exiting reactor core 100, 100', 100a, and/or 100b, some of the reactor coolant re-enters convection loop subsystem 410 at junction 425.

Pressure A opposes and balances pressure B when pump 390 is circulating cold moderator coolant at a rate corresponding to maximum power operation of the reactor so that very little coolant flows through the convection loop at full power. At less than full power (which may be at much less than full reactor coolant flow or at substantially no reactor coolant flow), a convection loop operates to circulate reactor coolant through convection loop subsystem 410. Thus, if desired, convection loop subsystem 410 operates to circulate reactor coolant through reactor 15 even when reactor coolant subsystem 25 is not operating. Convection loop subsystem 410 and valves 460 and 465 may be autonomous systems that operate independently of controller 540 and of any electrical power supply. For example, valves 460 and 465 may operate to isolate a flow of reactor coolant within convection loop subsystem 410 in the case of an interruption of flow of reactor coolant subsystem 25 or a leak in any of the coolant subsystem components outside containment structure 85. Valve 460 operates to substantially block a flow of reactor coolant out of reactor 15 via cold reactor coolant passageway 320 in any case when the external pressure is less than the pressure in cold reactor coolant passageway 320 inside pressure vessel 90. Also, valve 465 operates to substantially block flow of reactor coolant out of reactor 15, when the amount of reactor coolant in reactor 15 is less than a desired threshold amount. Thus, convection loop subsystem 410 operates to maintain circulation of reactor coolant through reactor 15, independently of an operation of reactor coolant subsystem 25, if desired.

Referring to FIGS. 17 and 18, an exemplary operation of auxiliary heat exchange subsystem 415 will now be described. When the temperature of the moderator within reflector zone 95 exceeds its normal operating temperature, pressure vessel 90 is also heated to about the same temperature by conduction from the moderator and the moderator steam. The state-changing material housed within heat exchange member 470 is increasingly heated. If heated beyond a threshold level, the state-changing material disposed in heat exchange members 470 will be caused to change states (e.g., heated from a solid state into a liquid state, or heated from a liquid state into a gaseous state), which improves the conductivity properties of the state-changing material disposed in heat exchange members 470. The state-changing material of heat exchange member 470 will efficiently transfer heat away from pressure vessel 90 by convection or steam transfer, and toward an exterior of containment structure 85 (which may have low thermal conductivity).

The state-changing material of heat exchange member 475 is then heated by heat transferred from heat exchange member 470. If heated beyond a threshold level, the state-changing material disposed in heat exchange members 475 will be caused to change states (e.g., heated from a solid state into a liquid state, or heated from a liquid state into a gaseous state), which improves the conductivity properties of the state-changing material disposed in heat exchange members 475.

The state-changing material of heat exchange members 475 will then flow from heat exchange member 475 into heat exchange member 480. When heat exchange members 480 extend under a large area of terrain (e.g., field and/or parking lot), heat transferred by the state-changing material disposed and/or flowing in heat exchange members 480 will dissipate into the adjacent terrain and ground surface. Also, when heat exchange members 480 are disposed at a slight angle upward from a substantially horizontal plane, state-changing material disposed and/or flowing within heat exchange member 480 increasingly dissipates heat as the distance from reactor 15 increases.

When cooled beyond the threshold level, the state-changing material disposed in heat exchange members 480 will be caused to change states again (e.g., cooled from a gaseous state into a liquid state, or cooled from a liquid state into a solid state). For example, if the state-changing material disposed in heat exchange members 475 and 480 is $H_2O$, steam ($H_2O$) condenses into water ($H_2O$). When heat exchange members 480 are disposed at a slight angle upward from a substantially horizontal plane, the state-changing material, e.g., water ($H_2O$), will form steam bubbles in heat exchange members 475 that rise rapidly to the top of heat exchange members 475 and then flow outward along the tops of heat exchange members 480 until they condense into the colder water ($H_2O$) in heat exchange members 480 and flow due to gravity back toward reactor 15. As the state-changing material flows back through heat exchanging members 480 due to gravity toward reactor 15 and heat exchange members 475, the state-changing material again becomes increasingly heated. If heated beyond a threshold level, the state-changing material disposed in heat exchange members 475 will be caused to change states (e.g., heated from a liquid state into a gaseous state, or heated from a solid state into a liquid state). The state-changing material may be iteratively heated and cooled, thereby changing back and forth between states in a cycle, and continuously transferring heat away from reactor 15 to be dissipated over the large area of terrain (e.g., field and/or parking lot) under which heat exchange members 480 extend. It is contemplated that in addition to operating within nuclear reactor system 5, auxiliary heat exchange subsystem 415 may be used in conjunction with any suitable heat transfer application in which heat is transferred away from a central source (e.g., any type of power plant, any type of heat-producing structures such as commercial buildings, military applications, residential structures and complexes, and/or sports complexes).

Referring to FIG. 19, an exemplary operation of auxiliary reactor shutdown subsystem 420 will now be described. During normal operation of reactor 15, valve 487 may remain closed. When an influx of neutron-absorbing material into reactor 15 is desired (e.g., when a shut-down of reactor 15 is desired), controller 540 controls valve 487 to open to allow flow of pressurized neutron absorbing material from pressurized reservoir 485 into one or more passageways 490. The neutron-absorbing material flows through one or more passageways 490, thereby flowing through reactor core 100, 100', 100a, and/or 100b. As the neutron-absorbing material flows toward end portion 505, the steam ($H_2O$) previously disposed in passageway 490 becomes increasingly pressurized at closed end portion 505, which serves as a buffer and reduces the possibility of the flow of neutron absorbing material bursting out of end portion 505 due to the force from the pressurized flow from pressurized reservoir 485 into passageway 490. Due to the presence of neutron-absorbing material in passageways 490, an increased amount of neutrons are absorbed from reactor 15, which decreases the fission rate of reactor 15. Controller 540 controls pump 500 to pump the neutron-absorbing material from passageway 490 back to reservoir 485 via drain passageway 495 when it is desired to restart the reactor. When substantially no neutron-absorbing material is desired in passageway 490, controller 540 controls valve 487 to substantially fully close, and controls pump 500 to evacuate neutron-absorbing material from passageway 490 into pressurized reservoir 485. Pump 500 maintains pressurized reservoir 485 in a pressurized state, and the above-described process may be repeated as desired.

The disclosed nuclear reactor system may be used to make control of a nuclear reactor easier. For example, reactor 15 may be constructed with no moving parts within containments structure 85. The disclosed control method has a relatively large range (e.g., over 250 mk), which allows the use of fuels having widely differing reactivities, while achieving a substantially maximum conversion ratio for each different fuel at substantially all points in the fuel life cycle. The disclosed nuclear reactor system also greatly increases the conversion ratio and thus increases fuel life. Also, because of the relatively large range of the disclosed control method, reactor 15 may use higher reactivity fuels such as, for example, low enriched uranium, MOX fuel, used light water reactor fuel, and combinations of fuel which include thorium.

Because the disclosed control cavities react independently of each other to control the local neutron flux, xenon waves may be naturally suppressed, which increases efficiency of reactor 15. Also, the neutron flux across reactor core 100, 100', 100a, and/or 100b is greatly flattened, allowing a relatively higher total power output of nuclear reactor system 5. Also, fuel burnout across reactor core 100, 100', 100a, and/or 100b may be relatively even.

The disclosed nuclear reactor system may not have to use continuous or partial refueling because the excess neutrons may be used to extend the life of higher conversion ratio fresh fuel, instead of being used to less effectively extend the life of older fuel having a lower conversion ratio. Because reactor 15 may use natural uranium for fuel, reactor 15 may not utilize isotope (e.g., uranium) enrichment capability, thus decreasing the possibility of nuclear proliferation. Because of the high conversion ratio of reactor 15, much of the power output is produced by fission of plutonium isotopes (mostly Pu239) produced from U238 in reactor 15, thus significantly increasing the total KWH of power produced per ton of mined uranium and significantly decreasing the amount of nuclear waste generated per KWH of power produced.

The disclosed control cavities may provide reactor 15 with a simple structure for efficiently controlling nuclear reactor system 5. The disclosed control cavities may provide for a reduced temperature difference between reactor coolant and moderator, so that the heat loss from the hot coolant to the moderator is reduced, allowing higher output coolant temperatures and more efficient steam turbines. Also, the disclosed control cavities may provide for a reduced pressure difference across reactor 15, allowing the coolant pressure tubes to be made with less structural material, which absorbs fewer neutrons and may increase the conversion ratio of the fuel.

The disclosed fuel assemblies may provide inner fuel rods in the disclosed fuel tubes that are relatively less shaded from thermal neutrons by outer fuel rods so that temperatures are relatively even across the fuel tubes, which allows the fuel tubes and fuel assemblies to contain more fuel rods and/or larger diameter fuel rods. Accordingly, the power output per reactor volume may be increased.

Auxiliary heat exchange system 415 may provide a method for efficiently transferring heat from reactor 15, or from any other suitable heat source. Auxiliary heat exchange system 415 provides an efficient heat transfer system that may operate without moving mechanical parts.

The disclosed nuclear reactor system may also provide for automatically and/or intentionally shutting down reactor 15 when desired. The disclosed reactor system may also provide methods for controlling an amount of steam that is delivered to turbine 45 via a bypass system, which may make control of power production more efficient.

It will be apparent to those skilled in the art that various modifications and variations can be made to the disclosed nuclear reactor system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A method for controlling a nuclear reactor, comprising:
providing a reactor core that includes a fuel assembly, the fuel assembly including a plurality of fuel elements;
providing a reflector zone that surrounds the reactor core;
providing a plurality of housings, each having a cavity, adjacent to the fuel elements;
allowing movement of a moderator into and out of each cavity of the plurality of housings at a lower portion of the plurality of housings; and
confining moderator in each cavity of the plurality of housings at an upper portion of the plurality of housings;
wherein the moderator moves from at least one of the plurality of housings to the reflector zone through the lower portion of at least one of the plurality of housings, and the moderator moves from the reflector zone to at least one of the plurality of housings through the lower portion of at least one of the plurality of housings.

2. The method of claim 1, wherein the moderator is $D_2O$.

3. A method for controlling a nuclear reactor, comprising:
providing a reactor core that includes a fuel assembly, the fuel assembly including a plurality of fuel elements;
providing a reflector zone that surrounds the reactor core;
providing a plurality of housings adjacent to the fuel elements, each housing having a cavity;
allowing movement of a moderator into and out of each cavity at a lower portion of the housing;
blocking a movement of the moderator into and out of each cavity at an upper portion of the housing;
removing an amount of heat from the moderator in each cavity that is substantially equal to an amount of heat imparted by conduction of heat, neutrons, or gamma radiation from the fuel assembly into the moderator in each cavity; and
maintaining a substantially constant or slowly changing amount of the moderator in a gaseous state in each cavity at an upper portion of the housing;
wherein the moderator moves from at least one of the plurality of housings to the reflector zone through the lower portion of at least one of the plurality of housings, and the moderator moves from the reflector zone to at least one of the plurality of housings through the lower portion of at least one of the plurality of housings.

4. The method of claim 3, wherein the moderator is $D_2O$.

5. A method for controlling a nuclear reactor, comprising:
providing a reactor core that includes a fuel assembly, the fuel assembly including a plurality of fuel elements;
providing a reflector zone that surrounds the reactor core;
providing a plurality of housings adjacent to the fuel elements, each housing having a cavity;
allowing movement of a moderator into and out of each cavity at a lower portion of each housing;
blocking a movement of the moderator in a gaseous state out of each cavity at an upper portion of each housing;
removing an amount of heat from the moderator in each cavity; and
controlling an amount of moderator that is held in the gaseous state in each cavity at the upper portion of each housing by varying the amount of heat removed from the moderator in each cavity;
wherein the moderator moves from at least one of the plurality of housings to the reflector zone through the lower portion of at least one of the plurality of housings, and the moderator moves from the reflector zone to at least one of the plurality of housings through the lower portion of at least one of the plurality of housings.

6. The method of claim 5, wherein the moderator is $D_2O$.

7. A method for controlling a reaction rate of a nuclear reactor core, comprising:
providing a reactor core that includes a fuel assembly, the fuel assembly including a plurality of fuel elements;
providing a reflector zone that surrounds the reactor core;
providing a plurality of housings adjacent to the fuel elements, each housing having a cavity;
allowing movement of a moderator into and out of each cavity;
using neutrons or gamma radiation released from the fuel elements to heat a portion of the moderator in each cavity into a gaseous state, each of the plurality of housings having a closed upper portion and an open lower portion;
retaining the moderator in the gaseous state in each cavity at each closed upper portion;
varying an amount of moderator in each cavity held in the gaseous state by varying an amount of heat removed from the moderator in each cavity; and
varying an amount of neutrons caught by the fuel assembly with resonance capture by displacing a portion of the moderator in each cavity in a liquid state based on the amount of moderator in each cavity held in the gaseous state;
wherein the moderator moves from at least one of the plurality of housings to the reflector zone through the open lower portion of at least one of the plurality of housings, and the moderator moves from the reflector zone to at least one of the plurality of housings through the open lower portion of at least one of the plurality of housings.

8. The method of claim 7, wherein the moderator is $D_2O$.

9. The method of claim 7, wherein when the reaction rate is higher than a desired value, the higher reaction rate increases the neutron flux in each cavity, increases the deposition of heat into the moderator in each cavity, increases the amount of moderator in each cavity in the gaseous state, and displaces some of the moderator in the liquid state in each cavity downward out of each respective cavity, which decreases the mass of moderator in each cavity, increases an amount of neutrons captured with resonance capture, and decreases the amount of neutrons reaching thermal energy and causing fission.

10. The method of claim 7, wherein when the reaction rate is lower than a desired value, the lower reaction rate decreases the neutron flux in each cavity, decreases the deposition of heat into the moderator in each cavity, increases the rate of condensation of gaseous moderator in each cavity to the liquid state, decreases the amount of moderator in each cavity in the gaseous state, and allows displacement of some of the liquid moderator in the moderator zone upward into each respective cavity, which increases the mass of moderator in each cavity, decreases an amount of neutrons captured with resonance capture, and increases the amount of neutrons reaching thermal energy and causing fission.

11. An apparatus for a nuclear reactor, comprising:
a containment structure, with the following being disposed in the containment structure:
- a reactor core that includes a fuel assembly, the fuel assembly including a plurality of fuel elements;
- a reflector zone that surrounds the reactor core;
- neutron moderating material, wherein at least some of the neutron moderating material is a fluid and the fluid neutron moderating material is disposed in both the reactor core and the reflector zone; and
- a plurality of housings disposed adjacent to the fuel elements, each housing having a cavity and wherein a lower portion of each housing is open for movement of fluid neutron moderating material into and out of the cavity and an upper portion of each housing is closed for movement of fluid neutron moderating material into or out of the upper portion of the cavity;

wherein the fluid neutron moderating material moves from at least one of the plurality of housings to the reflector zone through the lower portion of at least one of the plurality of housings, and the fluid neutron moderating material moves from the reflector zone to at least one of the plurality of housings through the lower portion of at least one of the plurality of housings.

12. The apparatus of claim 11, wherein at least some of the neutron moderating material is in a liquid state and at least some of the neutron moderating material is in a gaseous state in both the reflector zone and in at least some of the cavities.

13. The apparatus of claim 11, wherein the fluid neutron moderating material disposed in the cavities is heavy water ($D_2O$).

14. The apparatus of claim 11, wherein the fluid neutron moderating material disposed in the cavities is light water ($H_2O$).

15. The apparatus of claim 11, wherein the fuel elements are substantially vertical structures and one or more cavities surround the fuel elements and substantially fill a plurality of spaces between the fuel elements.

16. The apparatus of claim 11, further including a cooling assembly that includes a tube that passes through a bottom portion of at least one housing, the tube including one or more apertures configured to allow relatively cooler fluid neutron moderating material to flow into the cavity of the at least one housing to mix with the fluid neutron moderating material already disposed in the cavity.

17. The apparatus of claim 16, wherein when there are a plurality of housings vertically stacked around each fuel element, the tube passes through a top portion of at least one housing that is not the highest of the vertically stacked housings, the tube being sealed at an upper portion of the at least one housing and blocking the movement of a gaseous neutron moderating material from the upper portion of the at least one housing.

18. The apparatus of claim 16, wherein the plurality of housings are substantially vertically stacked and surround some or all of at least one substantially vertical fuel element.

19. The apparatus of claim 18, wherein the tube passes through more than one of the housings of the substantially vertical stack, an upper end portion of the tube being disposed below a top portion of the uppermost housing.

20. The apparatus of claim 11, wherein the fluid neutron moderating material moving from at least one of the plurality of housings to the reflector zone through the lower portion of at least one of the plurality of housings is a liquid, and the fluid neutron moderating material moving from the reflector zone to at least one of the plurality of housings through the lower portion of at least one of the plurality of housings is a liquid.

* * * * *